United States Patent
Brady et al.

(10) Patent No.: US 10,310,500 B1
(45) Date of Patent: Jun. 4, 2019

(54) AUTOMATED ACCESS TO SECURE FACILITIES USING AUTONOMOUS VEHICLES

(71) Applicant: Amazon Technologies, Inc., Seattle, WA (US)

(72) Inventors: Tye Michael Brady, Southborough, MA (US); Darren Ernest Canavor, Redmond, WA (US); Ethan Zane Evans, Sumner, WA (US); Pragyana K. Mishra, Seattle, WA (US); Hilliard Bruce Siegel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/390,009

(22) Filed: Dec. 23, 2016

(51) Int. Cl.
*G05D 1/00* (2006.01)
*G06Q 10/08* (2012.01)
(Continued)

(52) U.S. Cl.
CPC ........ *G05D 1/0027* (2013.01); *B60L 11/1861* (2013.01); *B65G 1/1373* (2013.01); *G05D 1/0022* (2013.01); *G05D 1/0278* (2013.01); *G06Q 10/08* (2013.01); *G06Q 50/28* (2013.01); *G07C 9/00182* (2013.01); *G07C 9/00571* (2013.01); *H04W 12/08* (2013.01); *G05D 2201/0213* (2013.01)

(58) Field of Classification Search
CPC .......................... G07C 9/00571; G05D 1/0027
See application file for complete search history.

(56) References Cited

U.S. PATENT DOCUMENTS

| 4,865,248 A | 9/1989 | Barth |
| 4,954,962 A | 9/1990 | Evans et al. |

(Continued)

FOREIGN PATENT DOCUMENTS

| EP | 151896610 | 10/2015 |
| EP | 151926482 | 11/2015 |

(Continued)

OTHER PUBLICATIONS http://qz.com/613277/google-wants-to-deliver-packages-from-self-driving-trucks/.

(Continued)

*Primary Examiner* — Thomas Randazzo
(74) *Attorney, Agent, or Firm* — Athorus, PLLC

(57) ABSTRACT

Autonomous vehicles may be deployed to areas where an item is in demand, and configured to fulfill orders for the item received from the areas. The autonomous vehicles are loaded with the item and dispatched to the area under their own power or in a carrier. When an order for the item is received, an autonomous vehicle delivers the item to a location in the area. Autonomous vehicles may also be equipped with a 3D printer or other equipment and loaded with materials for manufacturing the item. When an order for the item is received, the autonomous vehicle manufactures the item from such materials, and delivers the item. Autonomous vehicles may be configured for collaboration, such as to deliver or manufacture items in multiple stages and to transfer the items between vehicles. Autonomous vehicles may also be configured to automatically access locations in the area, e.g., using wireless access codes.

17 Claims, 41 Drawing Sheets

(51) Int. Cl.
*B65G 1/137* (2006.01)
*G05D 1/02* (2006.01)
*B60L 11/18* (2006.01)
*H04W 12/08* (2009.01)
*G07C 9/00* (2006.01)
*G06Q 50/28* (2012.01)

(56) References Cited

U.S. PATENT DOCUMENTS

| | | |
|---|---|---|
| 5,040,116 A | 8/1991 | Evans et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,690,997 B2 | 2/2004 | Rivalto |
| 6,694,217 B2 | 2/2004 | Bloom |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,639,386 B1 | 12/2009 | Siegel et al. |
| 7,668,404 B2 | 2/2010 | Adams et al. |
| 7,673,831 B2 | 3/2010 | Steele et al. |
| 7,693,745 B1 | 4/2010 | Pomerantz et al. |
| 7,925,375 B2 | 4/2011 | Schininger et al. |
| 7,946,530 B1 | 5/2011 | Talmage |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 * | 2/2012 | Trepagnier ............ G01S 17/023 701/423 |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,429,754 B2 | 4/2013 | Jung et al. |
| 8,511,606 B1 | 8/2013 | Lutke et al. |
| 8,577,538 B2 * | 11/2013 | Lenser ................ G05D 1/0274 701/2 |
| 8,752,166 B2 | 6/2014 | Jung et al. |
| 8,791,790 B2 * | 7/2014 | Robertson ............ G07C 9/00111 340/5.61 |
| 8,899,903 B1 | 12/2014 | Saad et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 * | 10/2015 | Chengalva ............ F41H 7/005 |
| 9,195,959 B1 | 11/2015 | Lopez et al. |
| 9,216,857 B1 | 12/2015 | Kalyan et al. |
| 9,235,213 B2 | 1/2016 | Villamar |
| 9,244,147 B1 | 1/2016 | Soundararajan et al. |
| 9,256,852 B1 * | 2/2016 | Myllymaki .......... G06Q 10/083 |
| 9,261,578 B2 | 2/2016 | Im et al. |
| 9,336,506 B2 | 5/2016 | Shucker et al. |
| 9,336,635 B2 * | 5/2016 | Robertson .......... G07C 9/00571 |
| 9,358,975 B1 | 6/2016 | Watts |
| 9,373,149 B2 | 6/2016 | Abhyanker |
| 9,381,916 B1 | 7/2016 | Zhu et al. |
| 9,510,316 B2 * | 11/2016 | Skaaksrud ............ H04W 12/06 |
| 9,545,852 B2 | 1/2017 | Streett |
| 9,561,941 B1 | 2/2017 | Watts |
| 9,600,645 B2 | 3/2017 | Fadell et al. |
| 9,623,562 B1 | 4/2017 | Watts |
| 9,652,912 B2 | 5/2017 | Fadell et al. |
| 9,682,481 B2 | 6/2017 | Lutz et al. |
| 9,718,564 B1 | 8/2017 | Beckman et al. |
| 9,733,646 B1 | 8/2017 | Nusser et al. |
| 9,741,010 B1 | 8/2017 | Heinla |
| 9,746,852 B1 | 8/2017 | Watts et al. |
| 9,786,187 B1 | 10/2017 | Bar-Zeev et al. |
| 9,858,604 B2 | 1/2018 | Apsley et al. |
| 9,959,773 B2 | 5/2018 | Raptopoulos et al. |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 * | 7/2003 | Miller .................... G07F 17/12 235/375 |
| 2003/0141411 A1 | 7/2003 | Pandya et al. |
| 2004/0002898 A1 | 1/2004 | Kuhlmann et al. |
| 2004/0162638 A1 | 8/2004 | Solomon |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0244763 A1 | 10/2007 | Williams et al. |
| 2007/0293978 A1 | 12/2007 | Wurman et al. |
| 2008/0027591 A1 | 1/2008 | Lenser et al. |
| 2008/0111816 A1 | 5/2008 | Abraham et al. |
| 2008/0150679 A1 * | 6/2008 | Bloomfield ............ B60R 25/24 340/5.7 |
| 2008/0154659 A1 | 6/2008 | Bettes et al. |
| 2008/0167817 A1 | 7/2008 | Hessler et al. |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0086275 A1 | 4/2009 | Liang et al. |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0169185 A1 | 7/2010 | Cottingham |
| 2010/0287065 A1 | 11/2010 | Alivandi |

(56) References Cited

U.S. PATENT DOCUMENTS

| | | |
|---|---|---|
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0153052 A1 | 6/2011 | Pettibone et al. |
| 2011/0246331 A1 | 10/2011 | Luther et al. |
| 2011/0264311 A1 | 10/2011 | Lee et al. |
| 2011/0282476 A1 | 11/2011 | Hegemier et al. |
| 2011/0313878 A1 | 12/2011 | Norman |
| 2012/0039694 A1 | 2/2012 | Suzanne |
| 2012/0078592 A1 | 3/2012 | Sims |
| 2012/0109419 A1 | 5/2012 | Mercado |
| 2012/0219397 A1 | 8/2012 | Baker |
| 2012/0221438 A1 | 8/2012 | Cook et al. |
| 2013/0006739 A1 | 1/2013 | Horvitz et al. |
| 2013/0073477 A1* | 3/2013 | Grinberg .............. A47G 29/141 705/332 |
| 2013/0081245 A1 | 4/2013 | Vavrina et al. |
| 2013/0126611 A1 | 5/2013 | Kangas et al. |
| 2013/0148123 A1 | 6/2013 | Hayashi |
| 2013/0218446 A1 | 8/2013 | Bradley et al. |
| 2013/0218799 A1 | 8/2013 | Lehmann et al. |
| 2013/0261792 A1* | 10/2013 | Gupta .................... G06Q 10/08 700/232 |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mandavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0283104 A1 | 9/2014 | Nilsson |
| 2014/0309813 A1 | 10/2014 | Ricci |
| 2015/0006005 A1* | 1/2015 | Yu .......................... G06Q 10/08 701/22 |
| 2015/0066178 A1 | 3/2015 | Stava |
| 2015/0069968 A1 | 3/2015 | Pounds |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0033966 A1 | 2/2016 | Farris et al. |
| 2016/0068267 A1 | 3/2016 | Liu et al. |
| 2016/0104099 A1 | 4/2016 | Villamar |
| 2016/0114488 A1 | 4/2016 | Medina et al. |
| 2016/0129592 A1 | 5/2016 | Saboo et al. |
| 2016/0144734 A1 | 5/2016 | Wang et al. |
| 2016/0144982 A1 | 5/2016 | Sugumaran |
| 2016/0200438 A1 | 7/2016 | Bokeno et al. |
| 2016/0207627 A1 | 7/2016 | Hoareau et al. |
| 2016/0236778 A1 | 8/2016 | Takayama et al. |
| 2016/0257401 A1 | 9/2016 | Buchmueller et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0334229 A1 | 11/2016 | Ross et al. |
| 2016/0364679 A1 | 12/2016 | Cao |
| 2016/0364989 A1 | 12/2016 | Speasl et al. |
| 2017/0032315 A1 | 2/2017 | Gupta et al. |
| 2017/0096222 A1 | 4/2017 | Spinelli et al. |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0164319 A1* | 6/2017 | Skaaksrud ............ H04W 12/06 |
| 2017/0167881 A1* | 6/2017 | Rander .................. G01C 21/32 |
| 2017/0345245 A1 | 11/2017 | Torresani et al. |
| 2017/0372256 A1 | 12/2017 | Kantor et al. |
| 2018/0024554 A1 | 1/2018 | Brady et al. |
| 2018/0088586 A1 | 3/2018 | Hance et al. |
| 2018/0137454 A1 | 5/2018 | Kulkarni et al. |
| 2018/0232839 A1 | 8/2018 | Heinla et al. |

FOREIGN PATENT DOCUMENTS

| | | |
|---|---|---|
| EP | 151926490 | 11/2015 |
| EP | 151980943 | 12/2015 |
| EP | 161751359 | 6/2016 |
| EP | 161869078 | 9/2016 |
| EP | 161953724 | 10/2016 |
| EP | 162041537 | 12/2016 |
| WO | 2016025047 | 1/2017 |
| WO | 2017076806 A1 | 5/2017 |
| WO | 2017076813 A1 | 5/2017 |
| WO | 2017076928 A1 | 5/2017 |
| WO | 2018024847 A1 | 2/2018 |
| WO | 2018024851 A1 | 2/2018 |
| WO | 2018024852 A1 | 2/2018 |

OTHER PUBLICATIONS http://www.geekwire.com/2016/google-pondering-drone-delivery-even-about-boxes-it-flies-to-front-doors/.
https://www.starship.xyz/.
DHL Trend Research, "Self-Driving Vehicles in Logistics," Dec., 2014, Markus Kückelhaus et al. (downloaded from http://www.dhl.com/content/dam/downloads/g0/about_us/logistics_insights/dhl_self driving_vehicles.pdf with an archived Web version available on https://web.archive.org/web/20151018154844/http://www.dhl.com/content/dam/downloads/g0/about_us/logistics_insights/dhl_selfdriving_vehicles.pdf), 39 pages.
DHL Trend Research, "Unmanned Aerial Vehicles in Logistics: A DHL perspective on implications and use for the logistics industry," 2014, Markus Kückelhaus et al., URL: http://www.dhl.com/content/dam/downloads/g0/ about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.
Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

\* cited by examiner

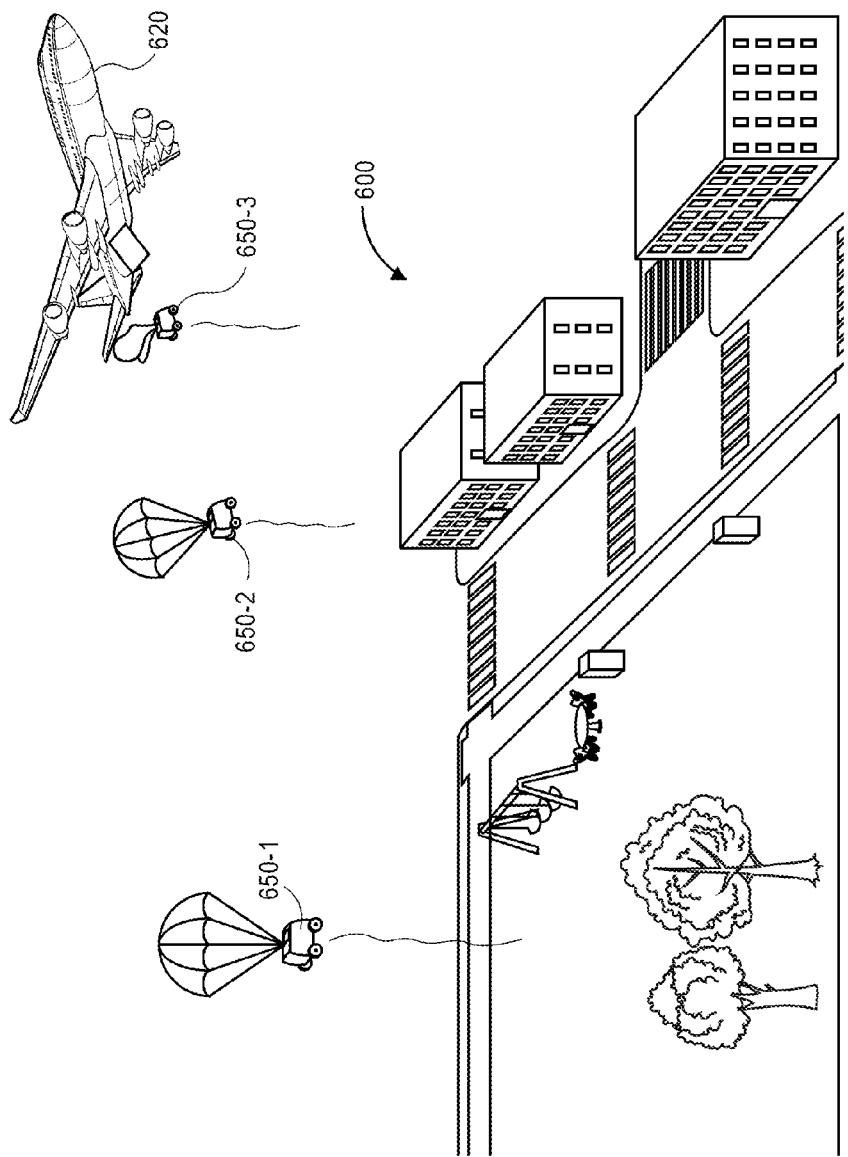

AUTOMATED ACCESS TO SECURE FACILITIES USING AUTONOMOUS VEHICLES

BACKGROUND

The advent of Internet-based electronic commerce in the 1990s spawned the development of online marketplaces, which are increasingly common electronic forums through which customers may place orders for one or more items over the Internet. Online marketplaces enable customers to visit one or more network sites from any corner of the globe, to view and evaluate items, and to place orders for the purchase of such items over the Internet. Initially, orders for items that were placed at online marketplaces over the Internet were fulfilled at the original locations of vendors (or manufacturers, merchants or other sources of the items), from which the items would be shipped to customers via first-class mail or another common carrier.

Online marketplaces soon became victims of their own successes, however, as gains in time or efficiency that were realized through the ease by which customers could place orders for items were soon consumed by losses due to delays in shipping the ordered items from their original locations to customers. Eventually, the growth of online marketplaces, and the rapid expansion in the scope and breadth of their available offerings, led to a concomitant proliferation of fulfillment centers. A fulfillment center is a facility, a warehouse or another like structure that is constructed in a distributed, centralized location and adapted to receive items from sources of the items (e.g., vendors or other fulfillment centers). Fulfillment centers may include stations for receiving shipments of items, for storing such items, and/or for preparing such items for delivery to customers. When an order for the purchase of one or more of the items stored in a fulfillment center is received from a customer, the ordered items may be retrieved from the spaces or areas in which such items are stored, and prepared for delivery to the customer, e.g., by packing the ordered items into one or more appropriate containers with a sufficient type and amount of dunnage, and delivering the containers to a destination designated by the customer.

Online marketplaces and fulfillment centers are engaged in a symbiotic growth pattern that mimics a classic causality dilemma: the popularity of online marketplaces has increased the demand for the distributed storage of items, and increases in the availability of distributed storage have in turn enabled online marketplaces to expand their available offerings. The expansion of offerings that are available at online marketplaces have continued to elevate their popularity and, therefore, have resulted in an ever-increasing demand for more distributed storage. To date, online marketplaces have traditionally responded to increases in the demand for increased storage with the construction of more and more fulfillment centers, with the intent of placing more and more items in locations that are ever closer to customers or other destinations.

The elasticity of the demand for fulfillment centers has its limits, however. In order to accommodate vast numbers and types of items of various sizes, some fulfillment centers may feature storage areas as large as one million square feet or more, and are constructed at a cost of dozens of millions of dollars or more. Because electronic commerce, like traditional commerce, is subject to seasonal fluctuations and typically peaks during year-end holiday seasons, a fulfillment center that is sized to accommodate maximum receiving, storing and distribution flows of items and capacities during peak periods is underutilized during times of reduced demand. Moreover, in locations of high population densities, e.g., cities and other urban areas, real estate values are typically at a premium, and the construction of more and larger fulfillment centers may become cost-prohibitive. Thus, at some point in time, and in many locations, online marketplaces may be forced to search for other ways to improve the distribution of items to such locations, and to respond to increased demands at such locations, at lower costs.

A reciprocal problem typically hinders the efficiency of recycling efforts. In the 1970s and 1980s, municipalities began coordinating recycling with their traditional trash collection systems and methods, with many towns and cities offering curbside collection of recyclables alongside garbage, or accommodating the receipt of recyclables, along with trash, at their transfer stations (e.g., dumps). Municipally-sponsored recycling systems typically sell or donate recyclable materials to companies that reprocess them into a usable form, which may then be resold to manufacturers of products or other end users that require such materials. While such efforts are certainly noble, most recycling systems are financially unprofitable or uneconomical at least because of the numbers of entities that receive or handle recyclable waste, the lengths of time required to process the waste into a valuable end product, or the distances over which the waste must travel before it may be used again.

BRIEF DESCRIPTION OF THE DRAWINGS

FIG. 6 is a view of aspects of one system for distributing or retrieving inventory or materials using autonomous vehicles in accordance with embodiments of the present disclosure.

DETAILED DESCRIPTION

As is set forth in greater detail below, the present disclosure is directed to distributing or retrieving inventory or materials, e.g., to or from customers or other end users of inventory or materials, or to or from locations where the inventory or materials are to be used or were used. More specifically, some embodiments of the systems and methods disclosed herein are directed to distributing inventories of consumer goods or other items to locations where demand for such items is known, observed or predicted, using an autonomous vehicle (e.g., an autonomous ground vehicle) having a predefined set of dimensions or attributes, or a fleet of such vehicles having any number of sets of dimensions or attributes. Some embodiments of the systems and methods disclosed herein are also directed to retrieving items or materials, e.g., waste products generated by the use of such items, or remnants or scraps of such items, from locations where such items or materials were used or disposed, using one or more autonomous vehicles. Some other embodiments of the systems and methods disclosed herein are directed to autonomous vehicles that are configured to manufacture or produce items using stock materials along with other materials that are retrieved from one or more locations, including but not limited to locations where items were used or disposed, and delivering items manufactured or produced thereby to customers or their intended destinations using such autonomous vehicles.

Figure 1A:
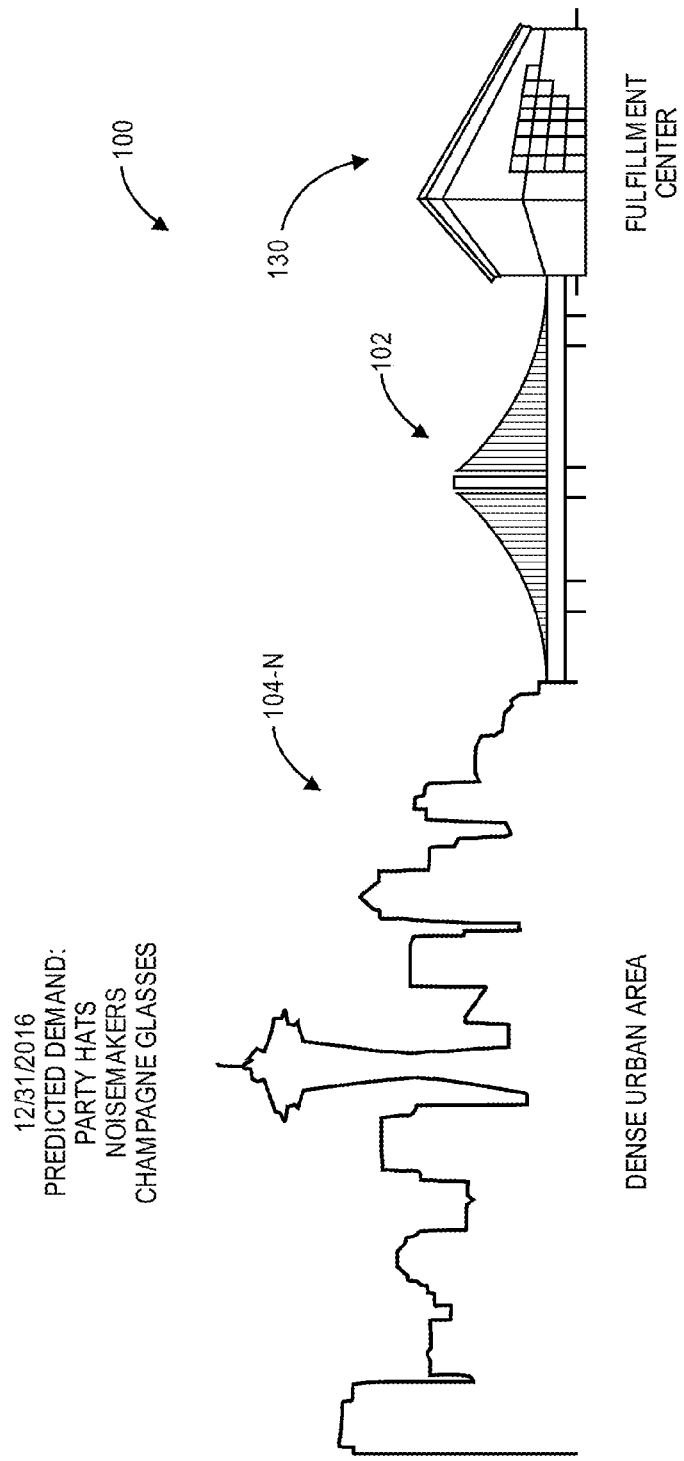
FIGS. 1A through 1H are views of aspects of one system for distributing or retrieving inventory or materials using autonomous vehicles in accordance with embodiments of the present disclosure.

Referring to FIGS. 1A through 1H, views of aspects of one system 100 for distributing or retrieving inventory or materials using autonomous vehicles in accordance with embodiments of the present disclosure are shown. As is shown in FIG. 1A, the system 100 includes a fulfillment center 130 and a plurality of customers 140-*n*, e.g., in a dense urban area. The fulfillment center 130 and the customers 140-*n* are connected by at least one road 102 (e.g., an avenue, a street, a highway or another transportation system extending therebetween). As is also shown in FIG. 1A, the customers 140-*n* are experiencing a predicted demand for a plurality of items (viz., party hats, noisemakers, champagne and glasses) at a certain time (viz., Dec. 31, 2016).

Figure 1B:
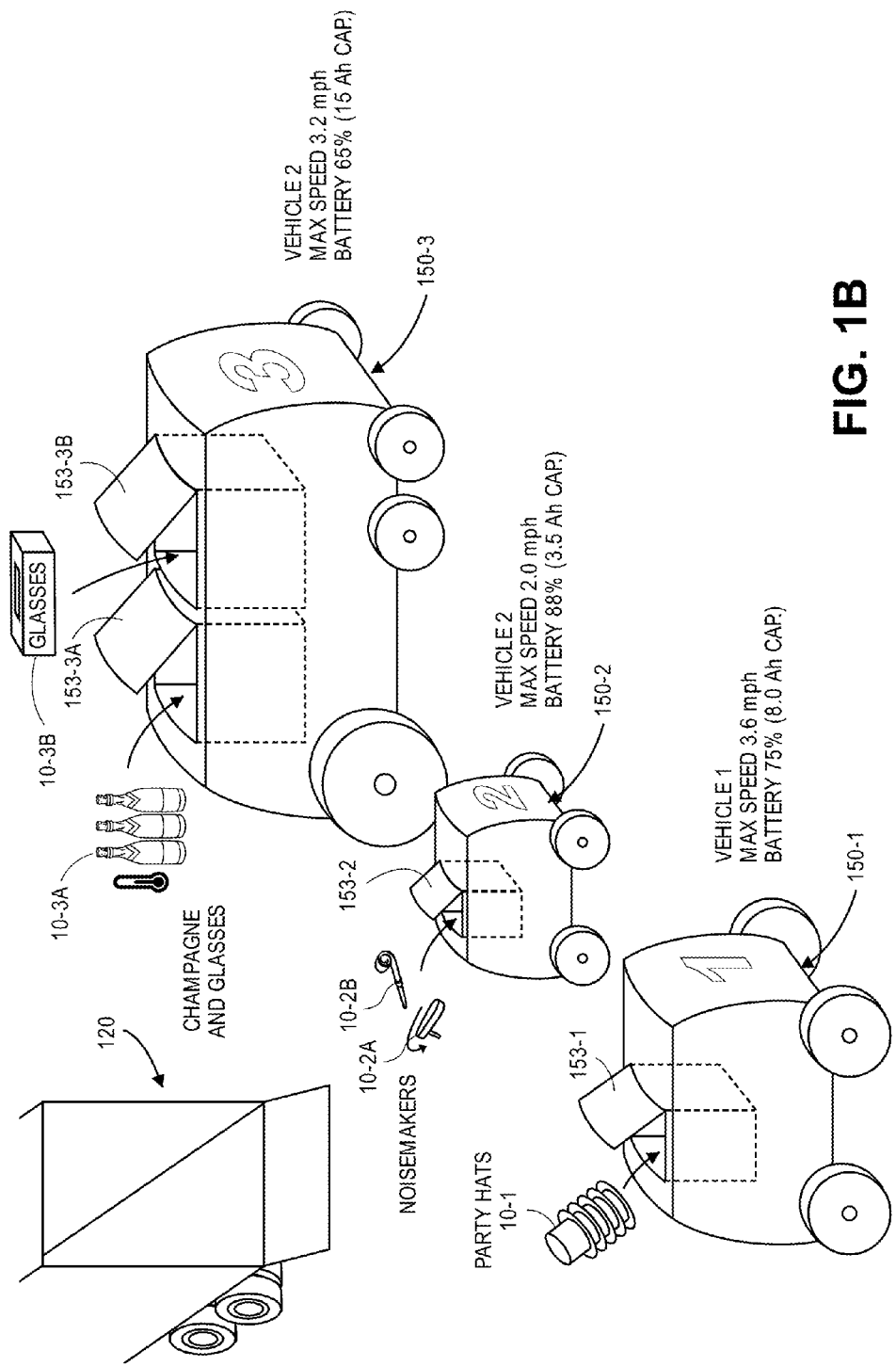
Figure 1C:
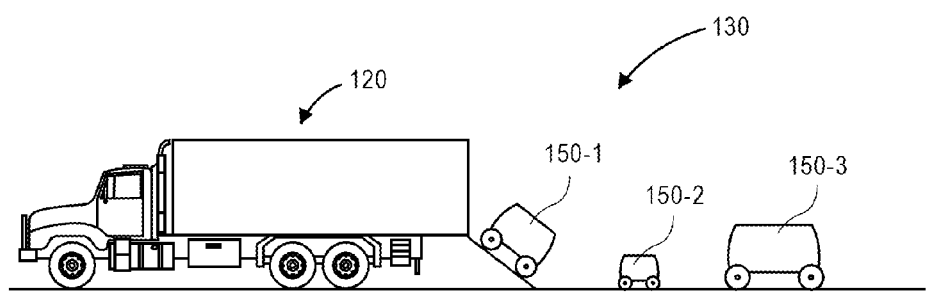

The fulfillment center 130 is a warehouse or other like facility that is adapted to receive, store, process and/or distribute items to customers, including one or more of the items that are in demand among the customers 140-*n*. As is shown in FIGS. 1B and 1C, a plurality of autonomous vehicles 150-1, 150-2, 150-3 attend the fulfillment center 130, in preparation for loading onto a carrier vehicle 120 (e.g., a large truck, such as an 18-wheeled tractor-trailer or other like vehicle). Each of the autonomous vehicles 150-1, 150-2, 150-3 is shown as receiving one or more of the items that are predicted to be in demand among the customers 140-*n*, and being loaded onto the carrier vehicle 120. For example, the autonomous vehicle 150-1 is shown in FIG. 1B as receiving a plurality of party hats 10-1 in a storage compartment that is secured by a door (or hatch, or like covering) 153-1. The autonomous vehicle 150-1 has a maximum speed of 3.6 miles per hour (mph) and includes a battery having a maximum charge of eight ampere-hours (8.0 Ah) that is presently charged to seventy-five percent (75%) of capacity.

Likewise, the autonomous vehicle 150-2 is shown in FIG. 1B as receiving a plurality of noisemakers 10-2A, 10-2B (e.g., kazoos, bells, cymbals, horns or other noise-generating devices) in a storage compartment that is secured by a door 153-2. The autonomous vehicle 150-2 has a maximum speed of 2.0 miles per hour (mph) and includes a battery having a maximum charge of three-and-one-half ampere-hours (3.5 Ah) that is charged to eighty-eight percent (88%) of capacity. The autonomous vehicle 150-3 is larger than either the autonomous vehicle 150-1 or 150-2, and has a forty-inch (40") height, a seventy-four-inch (74") length and a twenty-four-inch (24") width, and a weight of 40 pounds. The autonomous vehicle 150-3 is shown in FIG. 1B as receiving a plurality of champagne bottles 10-3A in a refrigerated storage compartment that is secured by a door 153-3A, and a plurality of champagne glasses 10-3B in an unrefrigerated storage compartment that is secured by a door 153-3B. The autonomous vehicle 150-3 has a maximum speed of 3.2 miles per hour (mph) and includes a battery having a maximum charge of fifteen ampere-hours (15 Ah) that is charged to sixty-five percent (65%) of capacity.

Figure 1D:
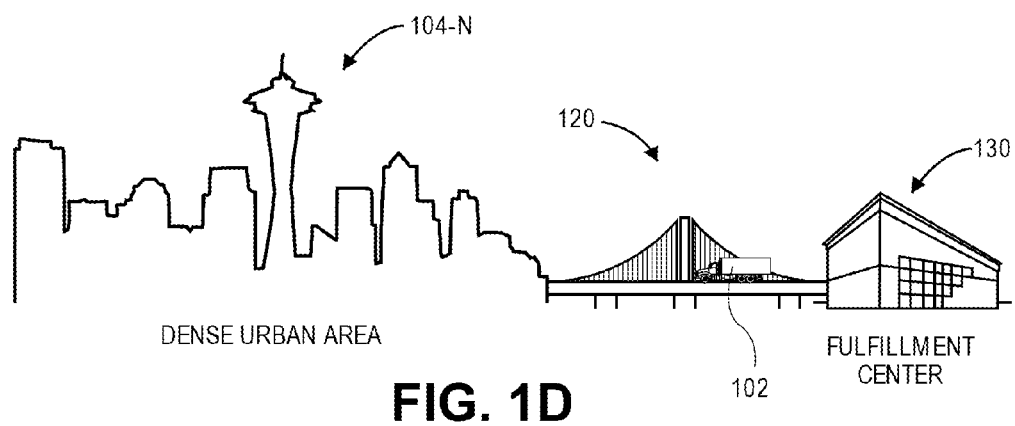
Figure 1E:
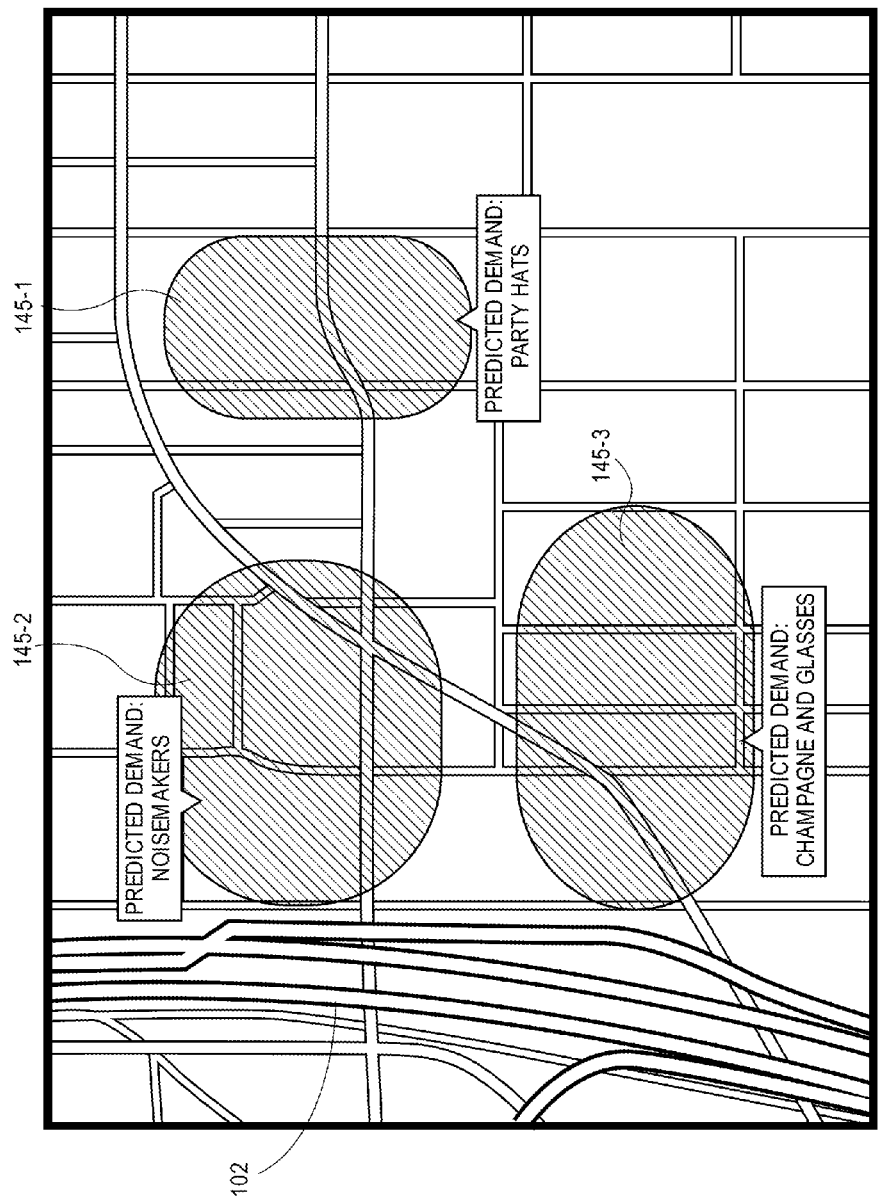

As is shown in FIG. 1D, and in accordance with some embodiments of the present disclosure, after the autonomous vehicles 150-1, 150-2, 150-3 have been loaded with the various items 10-1, 10-2A, 10-2B, 10-3A, 10-3B, as is shown in FIG. 1B, and after the autonomous vehicles 150-1, 150-2, 150-3 themselves have been loaded into the carrier vehicle 120, as is shown in FIG. 1C, the items 10-1, 10-2A, 10-2B, 10-3A, 10-3B may be distributed to locations that are closer to one or more of the customers 140-*n* for whom the items 10-1, 10-2A, 10-2B, 10-3A, 10-3B are believed to be in demand. For example, as is shown in FIG. 1E, a plurality of regions 145-1, 145-2, 145-3 of predicted demand for one or more of the items 10-1, 10-2A, 10-2B, 10-3A, 10-3B are identified. In the region 145-1, the items 10-1 (viz., party hats) are predicted to be in demand. In the region 145-2, the items 10-2A, 10-2B (viz., noisemakers) are predicted to be in demand. In the region 145-3, the items 10-3A, 10-3B (viz., champagne and glasses) are predicted to be in demand.

The regions 145-1, 145-2, 145-3 of the predicted demand may be identified on any basis. In some embodiments, the regions 145-1, 145-2, 145-3 of the predicted demand may be identified by resort to information or data regarding prior purchases of items by residents living in the respective regions, or prior deliveries of items to residents of the respective regions, which may indicate that such items, or substitutes for or complements to such items, are in demand in such regions. For example, where a particular model of smartphone that features a battery having a two-year lifespan for normal operations is popular in a particular region, demand for accessories for the smartphone such as headphones or protective cases (e.g., complementary items) may be anticipated concurrently with demand for the smartphone, while demand for replacements for the smartphone (e.g., substitutable items) may be anticipated in two years, when owners of the smartphone are expected to look to the market for such replacements. Likewise, the regions 145-1, 145-2, 145-3 of the predicted demand may also be identified based on similarities to other regions, and the demand for items that was previously observed there. For example, when a particular region is experiencing a lengthy spell of good weather, a national championship by a local sports team, a natural disaster, or other unique event, demand for items within the region may be identified based on demand for items observed in other regions that recently experienced lengthy spells of good weather, national championships, natural disasters, or other such unique events. Furthermore, the regions 145-1, 145-2, 145-3 of the predicted demand may be identified by determining information or data regarding demographics of residents in such regions, and identifying items that are in demand to members of such demographics, including not only members of such demographics who are residents of the regions 145-1, 145-2, 145-3 but also other regions. Any means, methods or techniques for determining demand for a given item, on a local or regional basis, may be utilized in accordance with embodiments of the present disclosure.

Figure 1F:
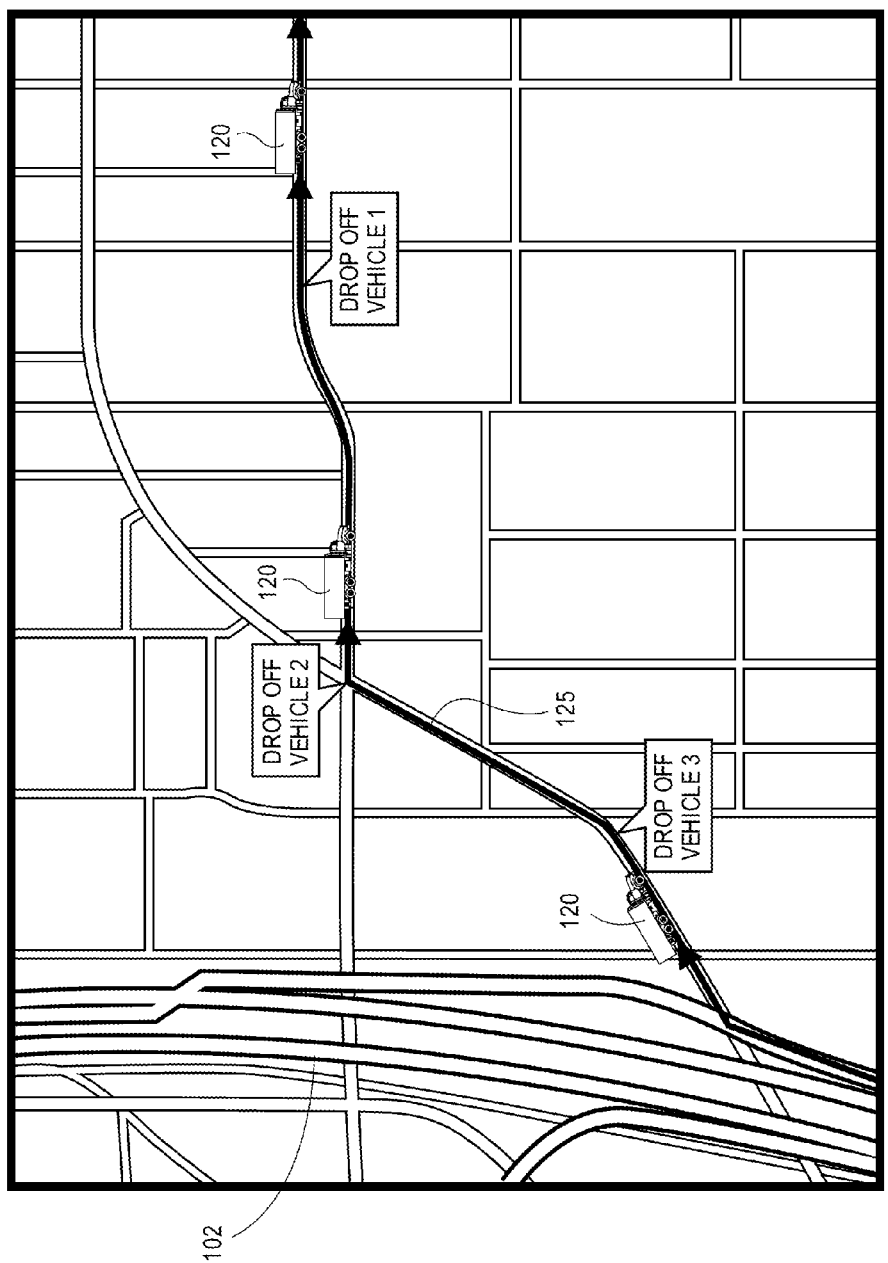

In accordance with embodiments of the present disclosure, the items 10-1, 10-2A, 10-2B, 10-3A, 10-3B may be routed to the regions 145-1, 145-2, 145-3 where demand for such items is predicted. As is shown in FIG. 1F, a route 125 for the carrier vehicle 120 is shown. The route 125 includes locations where the respective autonomous vehicles 150-1, 150-2, 150-3 may be dropped off by the carrier vehicle 120. The dropoff locations for each of the autonomous vehicles 150-1, 150-2, 150-3 are within or near the respective regions 145-1, 145-2, 145-3 where demand for the items 10-1, 10-2A, 10-2B, 10-3A, 10-3B within the autonomous vehicles 150-1, 150-2, 150-3 is predicted.

Figure 1G:
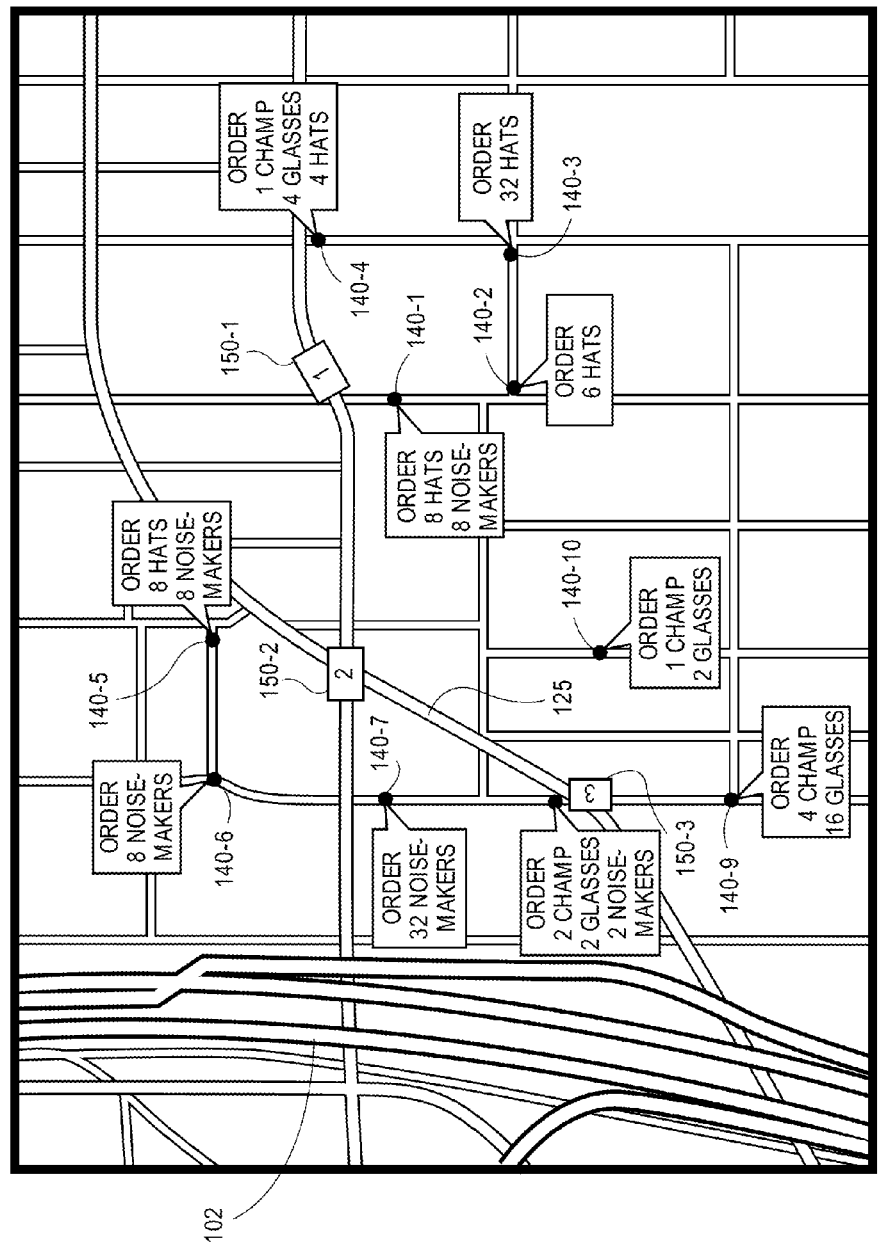
Figure 1H:
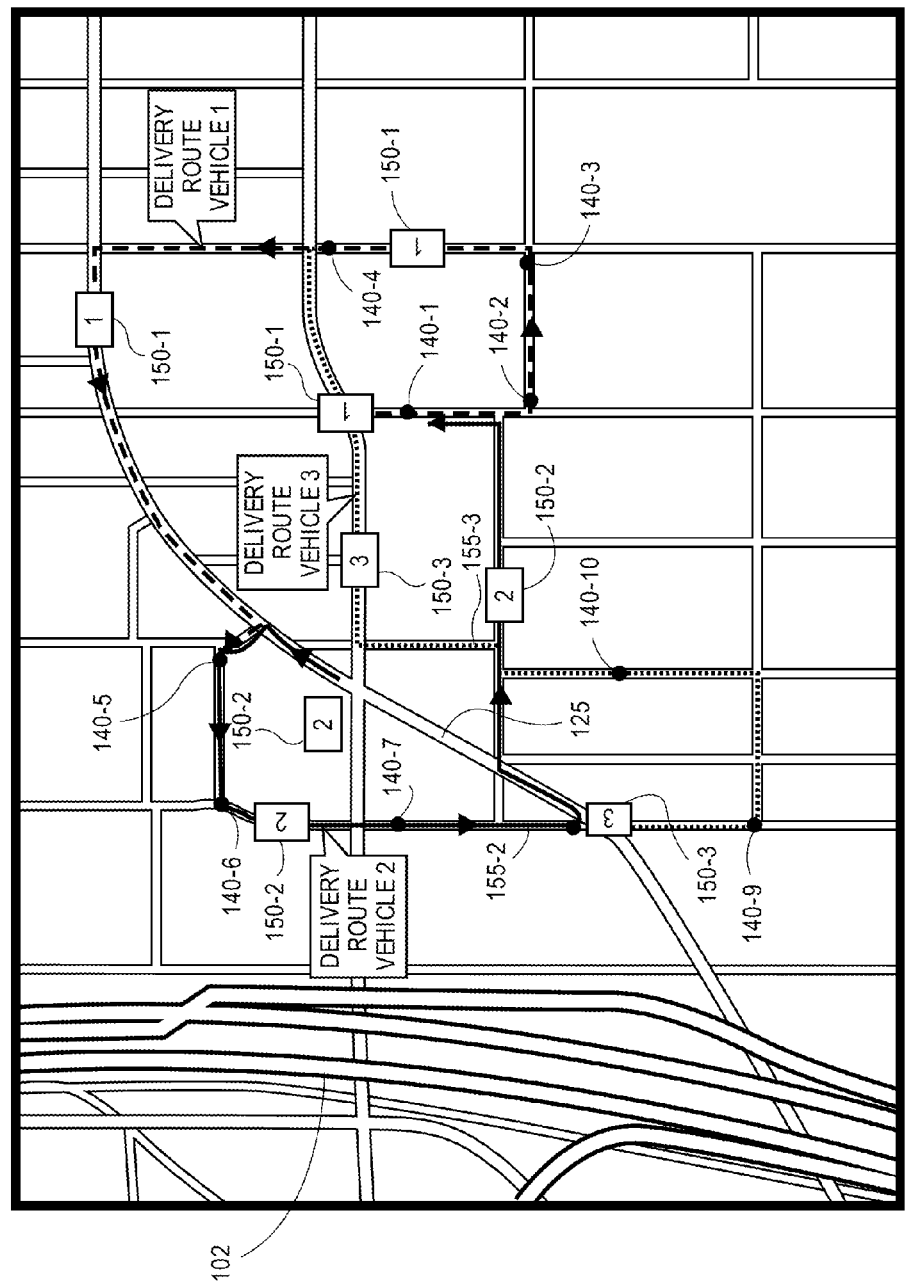

As is shown in FIG. 1G and FIG. 1H, when orders for the purchase of one or more of the items 10-1, 10-2A, 10-2B, 10-3A, 10-3B are received from customers who are located in or around areas including or near the regions 145-1, 145-2, 145-3, or where such items are to be delivered to such areas, such orders may be fulfilled using the autonomous ground vehicles 150-1, 150-2, 150-3. For example, as is shown in FIG. 1G, orders for one or more of the items 10-1, 10-2A, 10-2B, 10-3A, 10-3B are received from a plurality of customers 140-1, 140-2, 140-3, 140-4, 140-5, 140-6, 140-7, 140-8, 140-9, 140-10. As is shown in FIG. 1H, as the orders are received, or at a predetermined time, optimal routes (or shortest routes) to be traveled by each of the respective autonomous vehicles 150-1, 150-1, 150-3 in order to fulfill the respective orders may be determined according to one or more algorithms, formulas or techniques. For example, the autonomous vehicle 150-1 may be instructed to deliver the items 10-1, in series, to the customers 140-1, 140-2, 140-3, 140-4, 140-5 along a delivery route 155-1 in order to fulfill each of the orders placed by such customers. Because each of the customers 140-1, 140-2, 140-3, 140-4, 140-5 is located within a relatively short radius (e.g., approximately one to two blocks) of the dropoff location for the autonomous vehicle 150-1, the items 10-1 may be delivered to the customers 140-1, 140-2, 140-3, 140-4, 140-5 in a relatively short period of time. Similarly, the autonomous vehicle 150-2 may be instructed to deliver the items 10-2A, 10-2B, in series, to the customers 140-5, 140-6, 140-7, 140-8, 140-1 along a delivery route 155-2 in order to fulfill each of the orders placed by such customers. Likewise, the autonomous vehicle 150-3 may be instructed to deliver the items 10-3A, 10-3B, in series, to the customers 140-8, 140-9, 140-10, 140-4 along a delivery route 155-3. Because each of the customers 140-1, 140-5, 140-6, 140-7, 140-8 is located within a relatively short radius of the dropoff location for the autonomous vehicle 150-2, and because each of the customers 140-4, 140-8, 140-9, 140-10 is located within a relatively short radius of the dropoff location for the autonomous vehicle 150-3, the items 10-2A, 10-2B and the items 10-3A, 10-3B may be delivered to such customers using the autonomous vehicles 150-2, 150-3 in relatively short periods of time.

By deploying the autonomous vehicles 150-1, 150-2, 150-3 and the items 10-1, 10-2A, 10-2B, 10-3A, 10-3B therein to or within a vicinity of such regions, orders for one or more of the items 10-1, 10-2A, 10-2B, 10-3A, 10-3B included within such vehicles may be fulfilled more rapidly and efficiently than if the items 10-1, 10-2A, 10-2B, 10-3A, 10-3B remained in storage at the fulfillment center 130, such as is shown in FIG. 1D, and if delivery of the items 10-1, 10-2A, 10-2B, 10-3A, 10-3B from the fulfillment center 130 to each of the respective customers 140-1, 140-2, 140-3, 140-4, 140-5, 140-6, 140-7, 140-8, 140-9, 140-10 were required in order to fulfill the orders received from such customers.

Additionally, or alternatively, the autonomous vehicles 150-1, 150-2, 150-3 may collaborate in the performance of one or more tasks or the execution of one or more functions, including the delivery of one or more of the items 10-1, 10-2A, 10-2B, 10-3A, 10-3B to customers in the fulfillment of orders. For example, referring again to FIG. 1G and FIG. 1H, because the customer 140-4 has ordered one or more of the items 10-1 in the autonomous vehicle 150-1, and one or more of the items 10-3A, 10-3B in the autonomous vehicle 150-3, the autonomous vehicle 150-1 and the autonomous vehicle 150-3 may meet at a common location or rendezvous point where one or more of the items 10-1 may be transferred from the autonomous vehicle 150-1 into the autonomous vehicle 150-3, or where one or more of the items 10-3A, 10-3B may be transferred from the autonomous vehicle 150-3 into the autonomous vehicle 150-1, prior to delivering the items 10-1, 10-3A, 10-3B to the customer 140-4. The determination of optimal paths for the delivery of the items 10-1, 10-2A, 10-2B, 10-3A, 10-3B may take any intrinsic or extrinsic factor into consideration, including whether and how one or more orders may be fulfilled more efficiently through collaboration of the autonomous vehicles 150-1, 150-2, 150-3. Alternatively, where one or more of the customers 140-1, 140-2, 140-3, 140-4, 140-5, 140-6, 140-7, 140-8, 140-9, 140-10, or other customers, places orders for items including one or more of the items 10-1, 10-2A, 10-2B, 10-3A, 10-3B and other items, the autonomous vehicles 150-1, 150-2, 150-3 may further collaborate with one or more humans, carrier vehicles, other autonomous vehicles or the like in the fulfillment of such orders. For example, where a customer places an order for one of the items 10-1 and another item, a carrier vehicle or an autonomous vehicle transporting the other item may meet with the autonomous vehicle 150-1 at a common location or rendezvous point where the other item may be transferred to the autonomous vehicle 150-1, or where one of the items 10-1 may be received from the autonomous vehicle 150-1, prior to fulfilling the order.

After the items are delivered to the customers 140-1, 140-2, 140-3, 140-4, 140-5, 140-6, 140-7, 140-8, 140-9, 140-10 in response to their orders, the autonomous vehicles 150-1, 150-2, 150-3 may perform or execute any number of other tasks or functions. For example, one or more of the autonomous vehicles 150-1, 150-2, 150-3 may be configured to retrieve useless or expired items, items that are to be returned to the fulfillment center 130 or to another location, items that are to be discarded, or wastes generated by such items from one or more residents in the area. Alternatively, one or more of the autonomous vehicles 150-1, 150-2, 150-3 may remain in a standby condition, such as a safe or lightly traveled location, to await further orders for the items 10-1, 10-2A, 10-2B, 10-3A, 10-3B from customers, or to communicate information regarding the inventory carried thereon, or any prior travel or deliveries, to a monitoring system associated with an online marketplace and/or a fulfillment center. One or more of the autonomous vehicles 150-1, 150-2, 150-3 may also explore and evaluate its surroundings, e.g., by capturing information or data such as imaging data, or obtaining information or data from another source (e.g., information or data captured by an operating aerial vehicle, such as a drone, or a satellite) regarding such surroundings, and may report the captured information or data to a monitoring system or another computer-based system. One or more of the autonomous vehicles 150-1, 150-2, 150-3 may further request and/or await retrieval by the carrier vehicle 120, or by one or more other vehicles.

Accordingly, some embodiments of the systems and methods of the present disclosure are directed to forward-deploying, or otherwise distributing, items into regions where demand for such items is known, or has been observed or predicted, by any means, methods or techniques. The autonomous vehicles (or automated vehicles) of the present disclosure may be vehicles having any number of wheels mounted to axles that may be rotated by one or more motors, with dimensions, masses or other indicators of size that may be selected on any basis. For example, in some embodiments, such autonomous vehicles may be sized and configured to travel on roads at various times or during various levels of congestion, and at various speeds, e.g., in response to one or more computer-based instructions. Alternatively, in other embodiments, an autonomous vehicle may be sized and configured to travel on sidewalks, crosswalks, bicycle paths, trails or the like, and at various speeds. In still other embodiments, autonomous vehicles may be configured to travel on not only roads but also sidewalks, crosswalks, bicycle paths, trails or the like, at any desired speeds.

Additionally, autonomous vehicles of the present disclosure may include a cargo bay or other storage compartment, or multiple cargo bays or storage compartments, for storing items that are being delivered from an origin to a destination. Such cargo bays or storage compartments may be used to securely maintain items therein at any desired temperature, pressure or alignment or orientation, and to protect such items against the elements. Furthermore, in some embodiments, the autonomous vehicles may include various equipment or components for determining whether a cargo bay or other storage compartment is empty or includes one or more items, or for identifying specific items that are stored therein, along with equipment or components for engaging or interacting with such items. The autonomous vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous vehicles of the present disclosure may include any number of sensors such as position sensors (e.g., Global Positioning Satellite, or GPS, receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The autonomous vehicles of the present disclosure may also include communications equipment (e.g., wired or wireless means for communication such as components or systems operating Wireless Fidelity, or WiFi, Bluetooth, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous vehicle, e.g., in causing the autonomous vehicle to travel along one or more paths or routes, to search for alternate paths or routes, or to avoid expected or unexpected hazards encountered by the autonomous vehicle while traveling along such paths or routes. The autonomous vehicles of the present disclosure may further include any number of computer components (e.g., processors, data stores, transceivers or input/output devices) for performing any of the tasks or executing any of the functions described herein.

Actual or predicted demand for items may be determined on any basis. Once demand in any given region has been determined or predicted, the demand may be compared to one or more thresholds or limits to determine whether the demand is sufficiently great, on an actual or relative basis, in order to justify distributing or forward-deploying items to the given region. For example, in some embodiments, a total-market prediction of demand may be determined by defining a market, identifying drivers of demand in each of the market, predicting how such drivers may be anticipated to change, and localizing the effects of such changes to a given region or location. In some other embodiments, a prediction of local demand in a region or location may be determined based on prior sales of items in the region or location, and determining whether such sales are expected to increase, decrease or remain constant. For example, where a neighborhood includes a fixed number of homes, demand for specific items (e.g., diapers, skateboards, soccer balls, wheelchairs) may be determined based on an analysis of demographics (e.g., residents who are of varying ages, genders, ethnicities or religions), within the neighborhood, as compared to demographics in the neighborhood in previous years, or demographics in other similarly situated neighborhoods.

In some embodiments, upcoming local, regional, national or global events may be identified, and the demand for items pertaining to such events may be projected generally, or in specific locations or regions. For example, referring again to FIGS. 1A through 1H, the items 10-1, 10-2A, 10-2B, 10-3A, 10-3B are often used by consumers during celebrations or parties, such as those that occur on New Year's Eve, a holiday celebration that occurs on December 31 each year, and the demand for the items 10-1, 10-2A, 10-2B, 10-3A, 10-3B, is predicted on Dec. 31, 2016. The level of specificity or granularity associated with a projection may be selected on any basis, including but not limited to buildings, neighborhoods, villages, municipalities, counties or states. In other embodiments, demand for items in a given region may be determined based on local laws, regulations or customs in effect within the region.

Autonomous vehicles may be used to distribute items on a local basis in any manner. For example, items may be loaded into and secured within autonomous vehicles on a homogenous basis, e.g., where an autonomous vehicle includes a common type of item, such as the autonomous vehicle 150-1 of FIG. 1B, which includes the items 10-1. Alternatively, items may be loaded into and secured within autonomous vehicles on a heterogeneous basis, e.g., where an autonomous vehicle includes a variety of types of items, such as the autonomous vehicle 150-2 of FIG. 1B, which includes both the items 10-2A and the items 10-2B within a common storage compartment. Items may also be loaded into and secured within autonomous vehicles in storage compartments that are specifically tailored for such items, such as the autonomous vehicle 150-3, which includes a refrigerated storage compartment for maintaining cold items therein, as well as storage compartments that are generally provided for multiple types of items. Alternatively, an autonomous vehicle may include any number of compartments that are configured to maintain items therein at any desired temperature (e.g., hot or cold).

Moreover, once items have been loaded into and secured within autonomous vehicles, the autonomous vehicles may be delivered to selected regions based on the demand for the items maintained therein on any basis. For example, in some embodiments, autonomous vehicles may be configured to travel from a fulfillment center or other facilities within which items are maintained to specific regions based on known, observed or predicted demand for such items, e.g., by traveling on one or more roads, sidewalks, crosswalks, bicycle paths, trails or the like, and at various speeds, at various times or during various levels of congestion. In some other embodiments, autonomous vehicles may be delivered singly or in bulk to such regions in one or more other vehicles, which may be manned or unmanned. For example, autonomous vehicles that are loaded with items may be delivered to regions where such items are known, observed or predicted to be in demand in or by one or more other vehicles that may be configured to travel in the air, or on land or sea, or within the physical universe beyond the Earth's atmosphere (e.g., outer space), such as cars, trucks, trailers, freight cars, container ships, cargo aircraft or spacecraft, or other like vehicles. Likewise, autonomous vehicles may be retrieved from such regions by one or more of such vehicles, and returned to a fulfillment center or other facility, e.g., for loading, reloading or maintenance, as desired.

In accordance with other embodiments of the present disclosure, one or more of the autonomous vehicles described herein may be utilized to retrieve useless, spent or expired items, or trash, recyclable waste or other waste products generated by such items, from locations where such items were used or disposed, or where such items reside. For example, where customers have previously received shipments of milk in glass bottles, vegetables in aluminum or steel cans, or computer products in corrugated cardboard boxes with foam packing, one or more autonomous vehicles may return to locations of such customers, or locations where such items were received and/or consumed, to retrieve not only the glass bottles, the steel cans, the cardboard boxes or the foam, but also any other items that are no longer of value to such customers, such as an obsolete printer or a dated wireless router that have been replaced by a newly delivered printer or wireless router.

In some other embodiments, autonomous vehicles may be outfitted or configured with one or more automated fabricators, e.g., 3D printers, having various types or forms of tooling equipment included therein. Such tooling equipment may include, but is not limited to, one or more filaments, heads, blades, nozzles, motors, rollers, heat sources, radiation sources or other elements for molding, shaping, forming, curing, solidifying or depositing layers of materials therein and forming such materials into an end product. An autonomous vehicle that is outfitted or configured with automated fabricators and/or tooling equipment may be loaded with a variety of stock materials, and may be programmed to retrieve other raw materials (e.g., the raw materials themselves, or one or more items formed from such raw materials, which may be processed to extract the raw materials therefrom) from one or more specified locations. The autonomous vehicles may be programmed or otherwise configured to fabricate a given item, e.g., in response to an order for the item, and to deliver the item to a predetermined location. In some embodiments, the autonomous vehicles may be fabricated while the autonomous vehicle is en route from a location from which raw materials or items are retrieved to a location specified in the order.

In some other embodiments, an autonomous vehicle may be configured to collaborate in the performance of tasks or the execution of functions with one or more humans, machines or other vehicles, including but not limited to carrier vehicles or other autonomous vehicles. For example, autonomous vehicles may be configured to transfer items or materials to humans, machines or other vehicles, or to receive items or materials therefrom, in order to reduce the total number of entities or interactions involved in the performance of tasks or the execution of functions, such as delivering or retrieving one or more items or materials, or manufacturing and delivering one or more items from one or more materials. Autonomous vehicles may be selected for use in the performance of tasks or the execution of functions on any basis, including but not limited to their respective positions at dates or times when such tasks or functions are requested or required, as well as their dimensions or capacities (e.g., heights, lengths, widths, battery levels, fuel levels, power ratings, speeds or speed ratings, ranges, carrying volumes or weight limits), weather conditions, operational hazards, congestion levels or any other relevant intrinsic or extrinsic factors.

In still other embodiments, an autonomous vehicle may be programmed or otherwise configured to automatically access one or more predetermined or specified locations, e.g., to automatically deliver a distributed item to a given location or to retrieve raw materials or items formed therefrom from the given location. For example, an autonomous vehicle may be programmed or instructed to automatically open a door or other entry point at a facility (e.g., a private dwelling or business location), to access a public garage or other parking or standing area, or to activate an indicator within a home, an office or another structure. When an order for an item stored in an autonomous vehicle is received, and the order is assigned to the autonomous vehicle for fulfillment, the autonomous vehicle may be configured to transmit wireless codes, signals or other information to trigger a response from one or more devices or machines equipped with wireless transceivers, such as garage door openers, doorbells, lights, haptic feedback systems or other machines or devices.

Alternatively, requests or instructions for granting access to locations on behalf of an autonomous vehicle may be transmitted by one or more external computer devices or resources to one or more devices associated with structures at the locations, and access to such locations may be granted accordingly. Such requests or instructions may include access codes, authenticators, keys, tokens or similar information, which may be used by an autonomous vehicle to obtain access to one or more structures at a given location. For example, such access codes may be utilized to unlock locked doors or to alert one or more personnel or machines within a structure that an autonomous vehicle has arrived at the structure, or that the autonomous vehicle is requesting access to the structure. In some such embodiments, a request or an instruction to grant access to a location may be transmitted to an intermediary device at the location that is configured to receive such requests or instructions, and to grant access to the location. The intermediary device may be programmed with one or more access codes, passwords, authenticators, keys, tokens or similar information associated with a location, and may grant access to the location in response to a request or an instruction received from an autonomous vehicle and/or external computer device or resource without divulging such access codes, passwords, authenticators, keys, tokens or similar information to the autonomous vehicle or the computer device or resource.

Figure 2A:
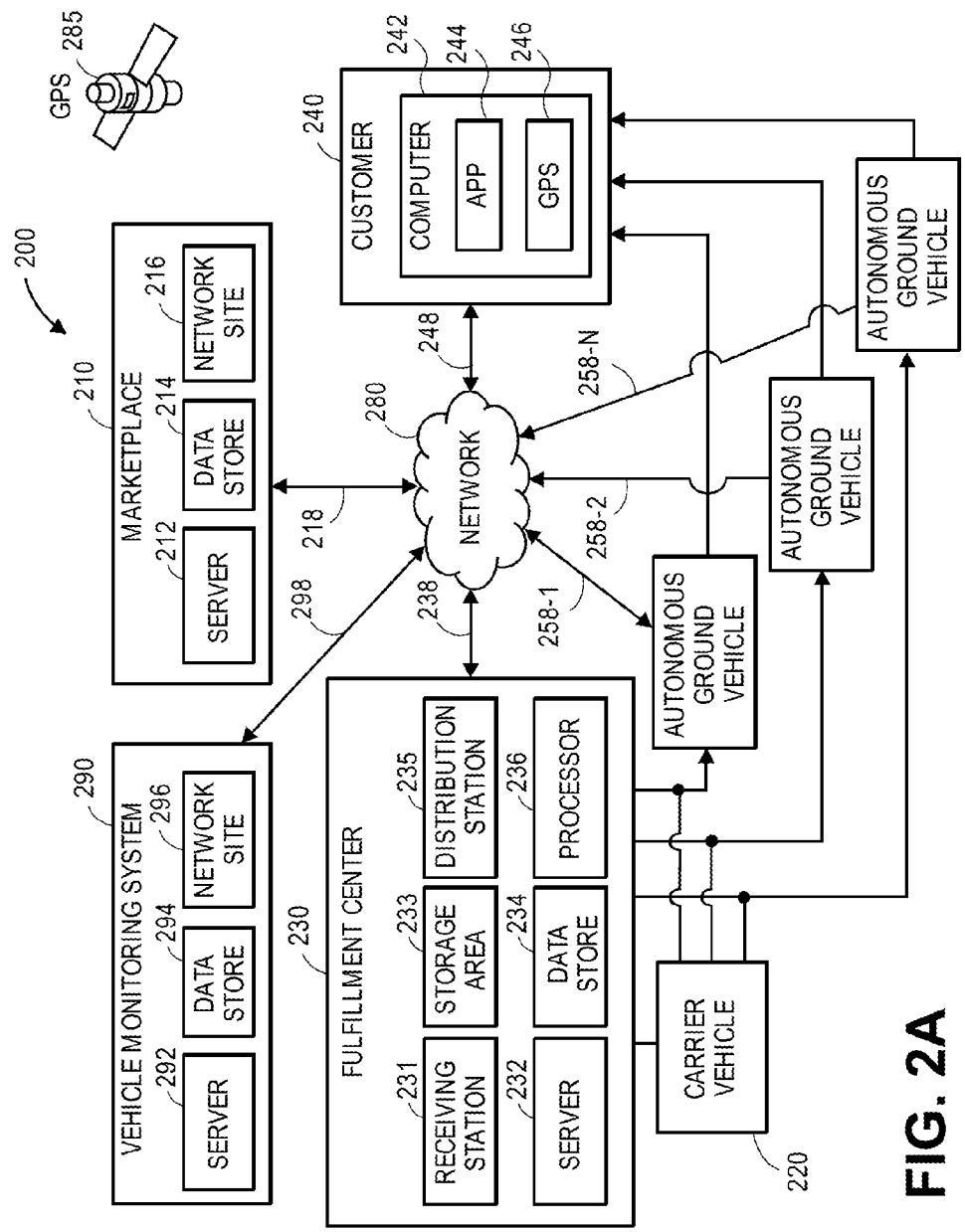
FIGS. 2A and 2B are block diagrams of components of one system for distributing or retrieving inventory or materials using autonomous vehicles in accordance with embodiments of the present disclosure.
Figure 2B:
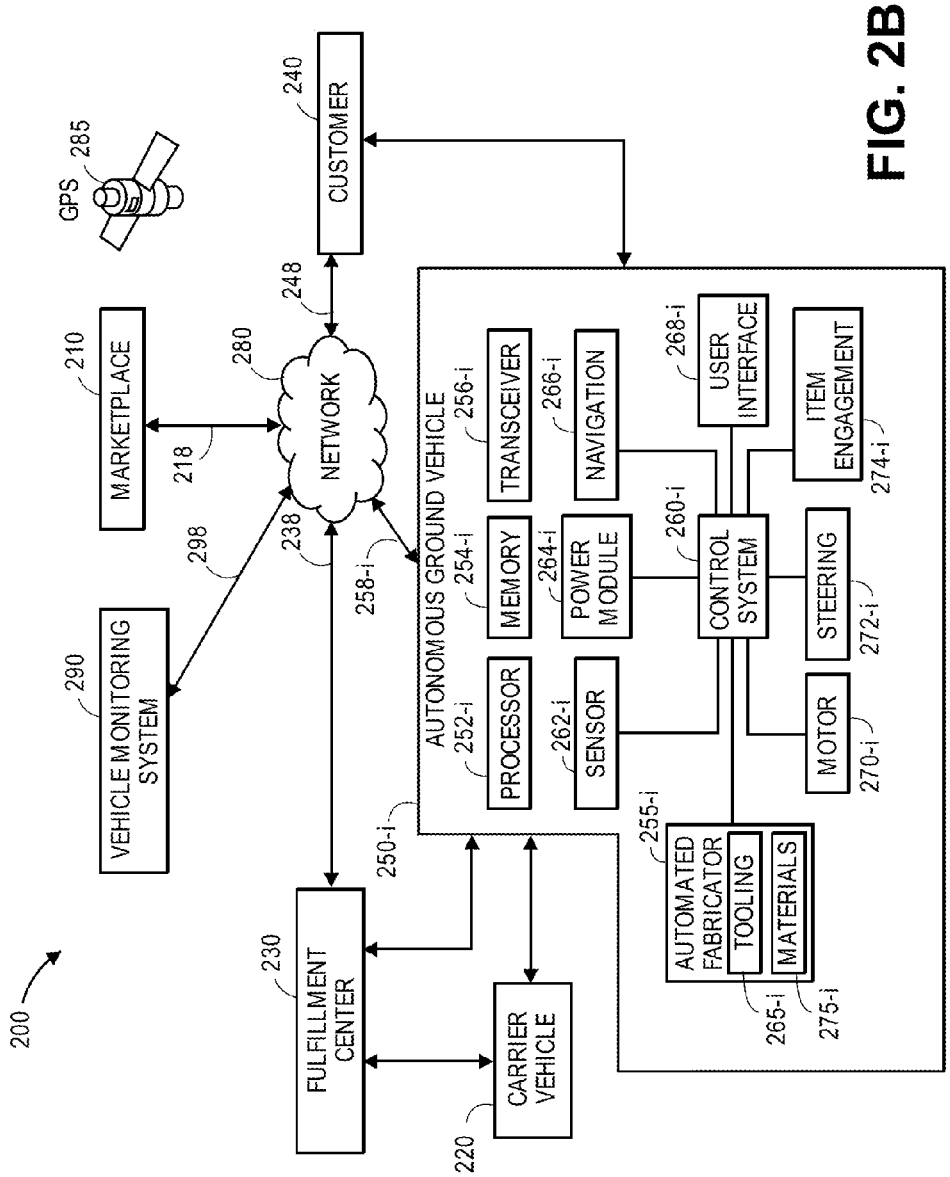

Referring to FIGS. 2A and 2B, a block diagram of components of one system 200 for distributing or retrieving inventory or materials using autonomous vehicles in accordance with embodiments of the present disclosure is shown. The system 200 includes a marketplace 210, a carrier vehicle 220, a fulfillment center 230, a customer 240, a plurality of autonomous ground vehicles 250-1, 250-2 . . . 250-n and a vehicle monitoring system 290 that are connected to one another across a network 280, which may include the Internet in whole or in part. Except where otherwise noted, reference numerals preceded by the number "2" in FIG. 2A or FIG. 2B refer to elements that are similar to elements having reference numerals preceded by the number "1" shown in FIGS. 1A through 1H.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data store 214 may include any type of information regarding items that have been made available for sale through the marketplace 210, or ordered by customers, such as the customer 240, from the marketplace 210, or any information or data regarding the delivery of such items to the customers, e.g., by one or more of the autonomous ground vehicles 250-1, 250-2 . . . 250-n.

The fulfillment center 230 may be any facility that is adapted to receive, store, process and/or distribute items. As is shown in FIG. 2A, the fulfillment center 230 includes a server 232, a data store 234, and one or more computer processors 236. The fulfillment center 230 also includes stations for receiving, storing and distributing items to customers, including but not limited to a receiving station 231, a storage area 233 and a distribution station 235.

The server 232 and/or the processors 236 may operate one or more order processing and/or communication systems and/or software applications having one or more user interfaces, or communicate with one or more other computing devices or machines that may be connected to the network 280, as indicated by line 228, for transmitting or receiving information in the form of digital or analog data, or for any other purpose. For example, the server 232 and/or the processors 236 may also operate or provide access to one or more reporting systems for receiving or displaying information or data regarding orders for items received by the marketplace 210, or deliveries made by one or more of the autonomous ground vehicles 250-1, 250-2 . . . 250-n, and may provide one or more interfaces for receiving interactions (e.g., text, numeric entries or selections) from one or more operators, users, workers or other persons in response to such information or data. The server 232, the data store 234 and/or the processor 236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 232 and/or the processors 236 may be configured to determine an optimal path or route between two locations for the execution of a given mission or task to be executed by the carrier vehicle 220 and/or one or more of the autonomous ground vehicles 250-1, 250-2 . . . 250-n on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Additionally, the server 232 and/or the processors 236 may be configured to control or direct, or to recommend or suggest, collaboration between or among one or more of the autonomous ground vehicles 250-1, 250-2 . . . 250-n and one or more other vehicles, e.g., the carrier vehicle 220, in the performance of one or more tasks or in the execution of one or more functions. For example, the server 232 and/or the processors 236 may be configured to identify levels of inventory distributed among one or more of the autonomous ground vehicles 250-1, 250-2 . . . 250-n, or aboard other vehicles or in other locations, and to identify an optimal path to be traveled in order to obtain each of the items included in an order and to deliver such items to a customer or other destination. Additionally, the server 232 and/or the processor 236 may determine which of the autonomous ground vehicles 250-1, 250-2 . . . 250-n is appropriately equipped to perform specific steps of a manufacturing or production process, based on any tooling equipment or materials installed or loaded thereon, amounts or types of items or materials that may be available nearby, proximity to one or more other autonomous vehicles, carrier vehicles or other vehicles, as well as a given destination or other location, or on any other relevant factor or basis. The server 232 and/or the processor 236 may identify appropriate locations or rendezvous points where one or more humans, vehicles or other machines may meet in order to transfer inventory or materials therebetween, or for any other purpose.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as one or more of the autonomous ground vehicles 250-1, 250-2 . . . 250-n or the carrier vehicle 220, and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to locations or destinations specified by customers, e.g., by way of one or more of the autonomous ground vehicles 250-1, 250-2 . . . 250-n, the carrier vehicle 220, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230 by any known wired or wireless means, or with the marketplace 210, the customer 240 or one or more of the autonomous ground vehicles 250-1, 250-2 . . . 250-*n* over the network 280, as indicated by line 238, through the sending and receiving of digital data.

Additionally, the fulfillment center 230 may include one or more systems or devices (not shown in FIG. 2A or FIG. 2B) for determining locations of one or more elements therein, such as cameras or other image recording devices. Furthermore, the fulfillment center 230 may also include one or more workers or staff members (not shown in FIG. 2A or FIG. 2B), who may handle or transport items within the fulfillment center 230. Such workers may operate one or more computing devices or machines for registering the receipt, retrieval, transportation or storage of items within the fulfillment center, or a general-purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

The customer 240 may be any entity or individual that wishes to download, purchase, rent, lease, borrow or otherwise obtain items (which may include goods, products, services or information of any type or form) from the marketplace 210, e.g., for delivery by one or more of the autonomous ground vehicles 250-1, 250-2 . . . 250-*n*. The customer 240 may utilize one or more computing devices 242 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 244, such as a web browser or a shopping application, and may be connected to or otherwise communicate with the marketplace 210, the fulfillment center 230 or the autonomous ground vehicles 250-1, 250-2 . . . 250-*n* through the network 280, as indicated by line 248, by the transmission and receipt of digital data.

The autonomous ground vehicles 250-1, 250-2 . . . 250-*n* may be any type or form of self-powered vehicle capable of being programmed or otherwise configured for autonomous travel between two points of along one or more paths or routes, in furtherance of the performance of one or more missions or tasks, such as the delivery of an item from the fulfillment center 230 to the customer 240, based on one or more computer instructions. For example, one or more of the autonomous ground vehicles 250-1, 250-2 . . . 250-*n* may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. Such optimal paths our routes may, in some embodiments, include one or more common locations or rendezvous points where an item or materials may be transferred between or among the autonomous ground vehicles 250-1, 250-2 . . . 250-*n*, or one or more humans, machines or other vehicles. Likewise, one or more of the autonomous ground vehicles 250-1, 250-2 . . . 250-*n* may be configured to determine whether an item may be manufactured or produced thereby, either using stock materials carried thereon, or any items, waste products generated by such items, or remnants or scraps of such items that may be located nearby, independently or in concert with one or more other autonomous ground vehicles 250-1, 250-2 . . . 250-*n*.

In some embodiments, the autonomous ground vehicles 250-1, 250-2 . . . 250-*n* may be configured to distribute, or forward-deploy, inventory from the fulfillment center 230 to regions where demand for items is known, observed or predicted, in anticipation of one or more orders for such items, and to fulfill such orders. The autonomous ground vehicles 250-1, 250-2 . . . 250-*n* may be configured to transport items from the fulfillment center 230 to such regions autonomously, or within the carrier vehicle 220, or by any other means. In some other embodiments, the autonomous ground vehicles 250-1, 250-2 . . . 250-*n* may be configured to return to the fulfillment center 230 after fulfilling orders for some or all of the items carried thereby, e.g., by traveling to the fulfillment center 230 autonomously, or within the carrier vehicle 220, or by any other means.

In some other embodiments, the autonomous ground vehicles 250-1, 250-2 . . . 250-*n* may be configured to retrieve items that are unwanted or no longer usable, items that contain materials of value and/or that may be used to manufacture or produce one or more other items, e.g., waste products generated by such items, or remnants or scraps of such items, and to deliver such items or materials to another location. In some other embodiments, the autonomous ground vehicles 250-1, 250-2 . . . 250-*n* may be equipped with one or more machines, such as the automated fabricator 255-*i*, e.g., a 3D printer, or any type or form of tooling equipment, to manufacture or produce items from stock materials, or from other materials (e.g., waste products generated by items, or remnants or scraps of items) retrieved by the autonomous ground vehicles 250-1, 250-2 . . . 250-*n*, while the autonomous ground vehicles 250-1, 250-2 . . . 250-*n* are en route from one or more destinations where such stock materials or other materials may be obtained to a destination where one or more of the manufactured or produced items is desired, e.g., a destination specified by a customer, such as the customer 240.

Each of the autonomous ground vehicles 250-1, 250-2 . . . 250-*n* shown in FIG. 2A, which are represented in FIG. 2B as an autonomous ground vehicle 250-*i*, may include one or more computer components such as a processor 252-*i*, a memory 254-*i* and a transceiver 256-*i* in communication with one or more other computer devices that may be connected to the network 280, as indicated by line 258-*i*, in order to transmit or receive information in the form of digital or analog data, or for any other purpose. For example, the autonomous ground vehicle 250-*i* may receive instructions or other information or data via the transceiver 256-*i* regarding an item that is to be delivered from the fulfillment center 230 to the customer 240 via one or more paths or routes from the marketplace server 212, the fulfillment center server 232 and/or the customer computing device 242, or from any other computing device over the network 280. The transceiver 256-*i* may be configured to enable the autonomous ground vehicle 250-*i* to communicate through one or more wired or wireless means, e.g., wired technologies such as Universal Serial Bus (or "USB") or fiber optic cable, or standard wireless protocols such as Bluetooth® or any Wireless Fidelity (or "WiFi") protocol, such as over the network 280 or directly.

The transceiver 256-*i* may further include or be in communication with one or more input/output (or "I/O") interfaces, network interfaces and/or input/output devices, and may be configured to allow information or data to be exchanged between one or more of the components of the autonomous ground vehicle 250-*i*, or to one or more other computer devices or systems (e.g., other aerial vehicles, not shown) via the network 280. For example, in some embodiments, the transceiver 256-*i* may be configured to coordinate I/O traffic between the processor 252-*i* and one or more onboard or external computer devices or components. The transceiver 256-*i* may perform any necessary protocol, timing or other data transformations in order to convert data signals from a first format suitable for use by one component into a second format suitable for use by another component. In some embodiments, the transceiver 256-*i* may include support for devices attached through various types of peripheral buses, e.g., variants of the Peripheral Component Interconnect (PCI) bus standard or the Universal Serial Bus (USB) standard. In some other embodiments, functions of the transceiver 256-*i* may be split into two or more separate components, or incorporated directly into the processor 252-*i*.

As is shown in FIG. 2B, the autonomous ground vehicle 250-*i* includes an automated fabricator 255-*i* having tooling equipment 265-*i* and having access to one or more materials 275-*i*. As is also shown in FIG. 2B, the autonomous ground vehicle 250-*i* also includes one or more control systems 260-*i*, as well as one or more sensors 262-*i*, one or more power modules 264-*i*, one or more navigation modules 266-*i*, and one or more user interfaces 268-*i*. As is also shown in FIG. 2B, the autonomous ground vehicle 250-*i* further includes one or more control systems 260-*i*, as well as one or more sensors 262-*i*, one or more power modules 264-*i*, one or more navigation modules 266-*i*, and one or more user interfaces 268-*i*. Additionally, the autonomous ground vehicle 250-*i* further includes one or more motors 270-*i*, one or more steering systems 272-*i* and one or more item engagement systems (or devices) 274-*i*.

The control system 260-*i* may include one or more software applications or hardware components configured for controlling or monitoring operations of one or more components such as the automated fabricator 255-*i*, the sensor 262-*i*, the power module 264-*i*, the navigation module 266-*i*, or the user interfaces 268-*i*, as well as the motors 270-*i*, the steering systems 272-*i* and the item engagement systems 274-*i*, e.g., by receiving, generating, storing and/or transmitting one or more computer instructions to such components. The control system 260-*i* may communicate with the marketplace 210, the fulfillment center 230 and/or the customer 240 over the network 280, as indicated by line 258-*i*, through the sending and receiving of digital data.

The sensor 262-*i* may be a position sensor such as a GPS receiver in communication with one or more orbiting satellites or other components of a GPS system 285, or any other device or component for determining geolocations (e.g., geospatially-referenced point that precisely defines an exact location in space with one or more geocodes, such as a set of geographic coordinates, e.g., a latitude and a longitude, and, optionally, an elevation that may be ascertained from signals (e.g., trilateration data or information) or geographic information system (or "GIS") data), of the autonomous ground vehicle 250-*i*. Geolocations of the sensor 262-*i* may be associated with the autonomous ground vehicle 250-*i*, where appropriate.

The sensor 262-*i* may also be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the autonomous ground vehicle 250-*i*, or for any other purpose. For example, the sensor 262-*i* may be configured to capture or detect reflected light if the reflected light is within a field of view of the sensor 262-*i*, which is defined as a function of a distance between an imaging sensor and a lens within the sensor 262-*i*, viz., a focal length, as well as a location of the sensor 262-*i* and an angular orientation of the lens. Accordingly, where an object appears within a depth of field, or a distance within the field of view where the clarity and focus is sufficiently sharp, the sensor 262-*i* may capture light that is reflected off objects of any kind to a sufficiently high degree of resolution using one or more sensors thereof, and store information regarding the reflected light in one or more data files.

The sensor 262-*i* may also include manual or automatic features for modifying a field of view or orientation. For example, the sensor 262-*i* may be a digital camera configured in a fixed position, or with a fixed focal length (e.g., fixed-focus lenses) or angular orientation. Alternatively, the sensor 262-*i* may include one or more actuated or motorized features for adjusting a position of the sensor 262-*i*, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 262-*i*, or a change in one or more of the angles defining the angular orientation of the sensor 262-*i*.

For example, the sensor 262-*i* may be an imaging device that is hard-mounted to a support or mounting that maintains the imaging device in a fixed configuration or angle with respect to one, two or three axes. Alternatively, however, the sensor 262-*i* may be provided with one or more motors and/or controllers for manually or automatically operating one or more of the components, or for reorienting the axis or direction of the sensor 262-*i*, i.e., by panning or tilting the sensor 262-*i*. Panning the sensor 262-*i* may cause a rotation within a horizontal plane or about a vertical axis (e.g., a yaw), while tilting the sensor 262-*i* may cause a rotation within a vertical plane or about a horizontal axis (e.g., a pitch). Additionally, the sensor 262-*i* may be rolled, or rotated about its axis of rotation, and within a plane that is perpendicular to the axis of rotation and substantially parallel to a field of view of the sensor 262-*i*.

Imaging data (e.g., still or moving images, as well as associated audio data or metadata) captured using the sensor 262-$i$ may be processed according to any number of recognition techniques. In some embodiments, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

The sensor 262-$i$ may further be one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

The sensor 262-$i$ may also be an item identification sensor, and may include a bar code scanner, a radiofrequency identification (or RFID) reader, or other technology that is utilized to determine an identification of an item that is being retrieved or deposited, or has been retrieved or deposited, by the autonomous ground vehicle 250-$i$. In some embodiments, the sensor 262-$i$ may be provided within a cargo bay or other storage component of the autonomous ground vehicle 250-$i$, such as a presence detection sensor and/or a motion sensor for detecting the presence or absence of one or more objects within the cargo bay or storage compartment, or movement of objects therein.

The sensor 262-$i$ may be further configured to capture, record and/or analyze information or data regarding its positions, velocities, accelerations or orientations of the autonomous ground vehicle 250-$i$, and to analyze such data or information by one or more means, e.g., by aggregating or summing such data or information to form one or more qualitative or quantitative metrics of the movement of the sensor 262-$i$. For example, a net vector indicative of any and all relevant movements of the autonomous ground vehicle 250-$i$, including but not limited to physical positions, velocities, accelerations or orientations of the sensor 262-$i$, may be derived. Additionally, coefficients or scalars indicative of the relative movements of the autonomous ground vehicle 250-$i$ may also be defined.

The power module 264-$i$ may be any type of power source for providing electrical power, mechanical power or other forms of power in support of one or more electrical or mechanical loads aboard the autonomous ground vehicle 250-$i$. In some embodiments, the power module 264-$i$ may include one or more batteries or other power cells, e.g., dry cell or wet cell batteries such as lead-acid batteries, lithium ion batteries, nickel cadmium batteries or nickel metal hydride batteries, or any other type, size or form of batteries. The power module 264-$i$ may each have any cell voltages, peak load currents, charge times, specific energies, internal resistances or cycle lives, or other power ratings. The power module 264-$i$ may also be any type, size or form of other power source, e.g., other than a battery, including but not limited to or more fuel cells, turbines, solar cells or nuclear reactors. Alternatively, the power module 264-$i$ may be another form of prime mover (e.g., electric, gasoline-powered or any other type of motor) capable of generating sufficient mechanical forces for the autonomous ground vehicle 250-$i$.

The navigation module 266-$i$ may include one or more software applications or hardware components including or having access to information or data regarding aspects of transportation systems within a given region, including the locations, dimensions, capacities, conditions, statuses or other attributes of various paths or routes in the region. For example, the navigation module 266-$i$ may receive inputs from the sensor 262-$i$, e.g., from a GPS receiver, an imaging device or another sensor, and determine an optimal direction and/or an optimal speed of the autonomous ground vehicle 250-$i$ for travelling on a given path or route based on such inputs. The navigation module 266-$i$ may select a path or route to be traveled upon by the autonomous ground vehicle 250-$i$, and may provide information or data regarding the selected path or route to the control system 260-$i$.

The user interface 268-$i$ may be configured to receive and provide information to human users of the autonomous ground vehicle 250-$i$ and may include, but is not limited to, a display, (e.g., a touch-screen display), a scanner, a keypad, a biometric scanner, an audio transducer, one or more speakers, one or more imaging devices such as a video camera, and any other types of input or output devices that may support interaction between the autonomous ground vehicle 250-$i$ and a human user. In various embodiments, the user interface 268-$i$ may include a variety of different features. For example, in one embodiment, the user interface 268-$i$ may include a relatively small display and/or a keypad for receiving inputs from human users. In other embodiments, inputs for controlling the operation of the autonomous ground vehicle 250-$i$ may be provided remotely. For example, in order to access a storage compartment, a human user may send a text message to or reply to a text message from the control system 260-$i$ and request that a door or other access portal be opened in order to enable the user to access an item therein. In various implementations, the autonomous ground vehicle 250-$i$ may have capabilities for directly receiving such signals from a user device or other device (e.g., a device inside a user's residence) that provides a signal to open the storage compartment door.

The motor 270-$i$ may be any type or form of motor or engine (e.g., electric, gasoline-powered or any other type of motor) that is capable of providing sufficient rotational forces to one or more axles, shafts and/or wheels for causing the autonomous ground vehicle 250-$i$ and any items therein to travel in a desired direction and at a desired speed. In some embodiments, the autonomous ground vehicle 250-$i$ may include one or more electric motors having any number of stators, poles and/or windings, such as an outrunner or an inrunner brushless direct current (DC) motor, or any other motors, having any speed rating, power rating or any other rating.

The steering system 272-$i$ may be any system for controlling a direction of travel of the autonomous ground vehicle 250-$i$. The steering system 272-$i$ may include any number of automatically operable gears (e.g., racks and pinions), gear boxes, shafts, shaft assemblies, joints, servos, hydraulic cylinders, linkages or other features for repositioning one or more wheels to cause the autonomous ground vehicle 250-$i$ to travel in a desired direction.

The item engagement system 274-$i$ may be any mechanical component, e.g., a robotic arm, for engaging an item or for disengaging the item, as desired. For example, when the autonomous ground vehicle 250-$i$ is tasked with delivering items or materials from an origin to a destination, the item engagement system 274-$i$ may be used to engage the items or materials at the origin and to deposit the items or materials in a cargo bay or other storage compartment prior to departing. After the autonomous ground vehicle 250-$i$ arrives at the destination, the item engagement system 274-$i$ may be used to retrieve the items or materials within the cargo bay or storage compartment, and deposit the items or materials in a desired location at the destination.

The automated fabricator 255-$i$ may be a 3D printer or any other device or component for automatically forming an end product according to one or more sets of computer instructions. As is shown in FIG. 2B, the automated fabricator 255-$i$ includes tooling equipment 265-$i$ and a plurality of materials 275-$i$. The tooling equipment 265-$i$ may include any machines or components for manipulating the raw materials 275-$i$ within the automated fabricator 255-$i$ to form the end product therefrom. The automated fabricator 255-$i$ may comprise any number of computer processors, data stores, memory components or communications equipment for controlling the operation of the tooling equipment 265-$i$ or receiving instructions for the operation thereof.

For example, in some embodiments, the tooling equipment 265-$i$ may include one or more filaments, heads, blades, nozzles, motors, rollers, heat sources, radiation sources or other elements for molding, shaping, forming, curing, solidifying or depositing layers of one or more of the materials 275-$i$, or otherwise manipulating the materials 275-$i$, and forming an end product therefrom.

The materials 275-$i$ may include any liquid, gaseous or solid materials that may be accessible to the tooling equipment 265-$i$ and molded, shaped, formed, cured, solidified or deposited into an end product. For example, the materials 275-$i$ may be maintained or stored in one or more vats, vessels, tanks, bins, platforms or other storage spaces that are within a chamber of the automated fabricator 255-$i$, or of the autonomous ground vehicle 250-$i$, or accessible thereto. In some embodiments, the materials 275-$i$ may include thermoplastic materials including but not limited to acrylonitrile-butadiene-styrene, nylon, high density polyethylene, polycarbonate, polyetherimide, polyether ether ketone, polylactic acid, poly(meth)acrylate, polyphenylene sulphone, polystyrene, as well as one or more polymers, copolymers or ionomers thereof, or combinations of any of such materials. In some embodiments, the materials 275-$i$ may include aluminum, antimony, barium, bismuth, cesium, gold, lead, iodine, steel, tantalum, tin or tungsten, or one or more oxides, nitrides or alloys thereof. In some embodiments, the materials 275-$i$ may include not only liquids, gases or solids but also gels, resins, plasmas or any other types or classes of materials.

The materials 275-$i$ may include both stock materials, or materials that have not yet been processed or formed into an end product, and are loaded onto the autonomous ground vehicle 250-$i$ for the purpose of ultimately being formed into one or more end products. Additionally, the materials 275-$i$ may include materials extracted from items retrieved by the autonomous ground vehicle 250-$i$.

In some embodiments, the autonomous ground vehicle 250-$i$ may be programmed or configured to perform one or more missions or tasks in an integrated manner. For example, the control system 260-$i$ may be programmed to instruct the autonomous ground vehicle 250-$i$ to travel to an origin, e.g., the fulfillment center 230, and to begin the performance of a task there, such as by retrieving an item at the origin using the item engagement system 274-$i$, before proceeding to a destination, e.g., the customer 240, along a selected route (e.g., an optimal route). Along the way, the control system 260-$i$ may cause the motor 270-$i$ to operate at any predetermined speed and cause the steering system 272-$i$ to orient the autonomous ground vehicle 250-$i$ in a predetermined direction or otherwise as necessary to travel along the selected route, e.g., based on information or data received from or stored in the navigation module 266-$i$. The control system 260-$i$ may further cause the sensor 262-$i$ to capture information or data (including but not limited to imaging data) regarding the autonomous ground vehicle 250-$i$ and/or its surroundings along the selected route. The control system 260-$i$ or one or more other components of the autonomous ground vehicle 250-$i$ may be programmed or configured as necessary in order to execute any actions associated with a given task, in accordance with the present disclosure.

Any combination of networks or communications protocols may be utilized in accordance with the systems and methods of the present disclosure. For example, each of the autonomous ground vehicles 250-1, 250-2 . . . 250-$n$ may be configured to communicate with one another or with the marketplace server 212, the fulfillment center server 232 and/or the customer computer 242 via the network 280, such as is shown in FIGS. 2A and 2B, e.g., via an open or standard protocol such as WiFi. Alternatively, each of the autonomous ground vehicles 250-1, 250-2 . . . 250-$n$ may be configured to communicate with one another directly outside of a centralized network, such as the network 280, e.g., by a wireless protocol such as Bluetooth, in which two or more of the autonomous ground vehicles 250-1, 250-2 . . . 250-$n$ may be paired with one another.

The carrier vehicle 220 may be any type or form of vehicle or system that is configured to transport one or more of the autonomous ground vehicles 250-1, 250-2 . . . 250-$n$ from one location to one or more other locations. In some embodiments, the carrier vehicle 220 may carry inventory of one or more items therein, and may be used to increase the number of items stored within the autonomous ground vehicles 250-1, 250-2 . . . 250-$n$ or to replace one or more items therein. Additionally, the carrier vehicle 220 may further include any equipment, material or supplies for maintaining the autonomous ground vehicles 250-1, 250-2 . . . 250-$n$ in good and serviceable conditions, including equipment, material or supplies for charging batteries, replacing tires, repairing damage or any other relevant operations on the autonomous ground vehicles 250-1, 250-2 . . . 250-$n$.

The carrier vehicle 220 may be configured to transport one or more of the autonomous ground vehicles 250-1, 250-2 . . . 250-$n$ from the fulfillment center 230 to locations where demand for one or more items contained in the autonomous ground vehicles 250-1, 250-2 . . . 250-$n$ is known, observed or predicted, or to retrieve one or more of the autonomous ground vehicles 250-1, 250-2 . . . 250-$n$ from such locations. For example, the carrier vehicle 220 may be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The carrier vehicle 220 may be further configured to control or direct the operations of one or more of the autonomous ground vehicles 250-1, 250-2 . . . 250-n, such as by identifying materials or tooling equipment that may be available to one or more of the autonomous ground vehicles 250-1, 250-2 . . . 250-n, or by determining which of the autonomous ground vehicles 250-1, 250-2 . . . 250-n is best suited to perform a given task or execute a given function, as well as one or more paths to be traveled by the autonomous ground vehicles 250-1, 250-2 . . . 250-n between two or more locations while performing the task or executing the function.

In some embodiments, the carrier vehicle 220 may be any type of carrier such as a car, a truck, a trailer, a freight car and/or locomotive, a container ship, a cargo aircraft (e.g., manned aircraft or unmanned aircraft, such as drones), a spacecraft or any other vehicle. In some embodiments, the carrier vehicle 220 may be an autonomous ground vehicle, such as one or more of the autonomous ground vehicles 250-1, 250-2 . . . 250-n, that is sufficiently large, durable and capable of transporting another autonomous ground vehicles, such as one or more of the autonomous ground vehicles 250-1, 250-2 . . . 250-n. The carrier vehicle 220 may include any type or form of component for safely accommodating an autonomous ground vehicle therein, including one or more straps, latches, brackets, tie-down devices, restraints, or like features. The carrier vehicle 220 may further include one or more of the operational components or systems described above with regard to the autonomous ground vehicle 250-i of FIG. 2B, including but not limited to computer processors, memory components, transceivers, sensors, power modules, navigation systems, control systems, user interfaces, motors, steering components or item engagement systems, and may be configured to communicate over the network 280 through the sending and receiving of digital data.

The vehicle monitoring system 290 includes one or more physical computer servers 292 having a plurality of databases 294 associated therewith, as well as one or more computer processors 296 provided for any specific or general purpose. The servers 292 may be connected to or otherwise communicate with the databases 294 and the processors 296. The databases 294 may store any type of information or data, including but not limited to acoustic signals, information or data relating to acoustic signals, or information or data regarding personnel and/or their attributes, interests or preferences, for any purpose. The servers 292 and/or the computer processors 296 may also connect to or otherwise communicate with the network 280, as indicated by line 298, through the sending and receiving of digital data. For example, the vehicle monitoring system 290 may include any facilities, stations or locations having the ability or capacity to receive and store information or data in one or more data stores, e.g., data files received from any of the autonomous ground vehicles 250-1, 250-2 . . . 250-n, one or more other external computer systems (not shown) via the network 280. In some embodiments, the data processing system 290 may be provided in a physical location. In other such embodiments, the data processing system 290 may be provided in one or more alternate or virtual locations, e.g., in a "cloud"-based environment. In still other embodiments, the vehicle monitoring system 290 may be provided onboard one or more of the autonomous ground vehicles 250-1, 250-2 . . . 250-n.

For example, the vehicle monitoring system 290 of FIG. 2 may be independently provided for the purpose of determining or predicting the demand for items in one or more locations, or comparing the demand to a predetermined threshold or limit, as well as distances between locations of known, observed or predicted demand and locations where such items are stored, e.g., a location of the fulfillment center 230, locations of one or more autonomous ground vehicles 250-1, 250-2 . . . 250-n having items stored therein, or locations of carrier vehicles, such as the carrier vehicle 220, transporting such autonomous ground vehicles 250-1, 250-2 . . . 250-n therein. The vehicle monitoring system 290 may also be provided for the purpose of determining the type of form of materials that may be available in one or more locations, e.g., locations of items, waste products generated by items, or remnants or scraps of items, and may be retrieved therefrom. The vehicle monitoring system 290 may also be provided for the purpose of determining whether one or more of the autonomous ground vehicles 250-1, 250-2 . . . 250-n may retrieve such items or materials, or is adequately configured or outfitted, e.g., with the automated fabricator 255-i or with the tooling equipment 265-i, to manufacture or produce one or more items from such items or materials, e.g., in response to an order, and to deliver the manufactured or produced item to a specific location. The vehicle monitoring system 290 may also be provided for the purpose of determining one or more access codes or rights for accessing a location such as a home, an office, a parking structure or another facility, or to trigger or initiate an indicator within such facilities.

In some embodiments, the vehicle monitoring system 290 of FIG. 2 may also be provided for the purpose of receiving, tracking and/or otherwise monitoring the operations of one or more of the autonomous ground vehicles 250-1, 250-2 . . . 250-n or the carrier vehicle 220, including but not limited to any information or data regarding attributes of the autonomous ground vehicles 250-1, 250-2 . . . 250-n or the carrier vehicle 220, or missions or tasks being performed by the autonomous ground vehicles 250-1, 250-2 . . . 250-n or the carrier vehicle 220, as well as environmental conditions, traffic conditions, ground or surface conditions, weather conditions, planned or ongoing construction or other events, or any other factors that may affect the capacity of one or more paths or routes within areas in which such autonomous ground vehicles 250-1, 250-2 . . . 250-n are operating or have operated.

The vehicle monitoring system 290 may also be configured to determine an optimal path or route between two locations for the execution of a given mission or task on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique. The vehicle monitoring system 290 may also be configured to determine whether a route being traveled by one or more of the autonomous ground vehicles 250-1, 250-2 . . . 250-n or the carrier vehicle 220 is optimal or preferred for a given mission or task, or to communicate instructions for varying the route to the autonomous ground vehicles 250-1, 250-2 . . . 250-n or the carrier vehicle 220. The vehicle monitoring system 290 may also be configured to control or direct the operations of one or more of the autonomous ground vehicles 250-1, 250-2 . . . 250-n or the carrier vehicle 220, such as by identifying materials or tooling equipment that may be available to one or more of the autonomous ground vehicles 250-1, 250-2 . . . 250-n or the carrier vehicle 220, or by determining which of the autonomous ground vehicles 250-1, 250-2 . . . 250-*n* is best suited to perform a given task or execute a given function, as well as one or more paths to be traveled by the autonomous ground vehicles 250-1, 250-2 . . . 250-*n* or the carrier vehicle 220 between two or more locations while performing the task or executing the function. The vehicle monitoring system 290 may further utilize any available information or data in determining a capacity of a given path or route, or whether such capacity may have increased or decreased. The number and/or type of information or data that may be received and/or processed or utilized by the vehicle monitoring system 290 are not limited.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "fulfillment center" a "customer," an "autonomous vehicle" (or "autonomous ground vehicle"), a "vehicle monitoring system" or like terms, may be automated steps performed by their respective computer systems, or implemented within software modules (or computer programs) executed by one or more general purpose computers. Moreover, process steps described as being performed by a "marketplace," a "fulfillment center," a "customer," an "autonomous vehicle" or a "vehicle monitoring system" may be typically performed by a human operator, but could, alternatively, be performed by an automated agent.

The marketplace 210, the carrier vehicle 220, the fulfillment center 230, the customer 240, the autonomous ground vehicles 250-1, 250-2 . . . 250-*n* or the vehicle monitoring system 290 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages, social network messages, online marketplace messages, telephone calls or the like. For example, the fulfillment center 230 and/or the server 232 may be adapted to transmit information or data in the form of synchronous or asynchronous messages to the marketplace 210 and/or the server 212, the carrier vehicle 220, the customer 240 and/or the computing device 242, the autonomous ground vehicles 250-1, 250-2 . . . 250-*n* and/or the control system 260-*i* or the vehicle monitoring system 290, or any other computer device in real time or in near-real time, or in one or more offline processes, via the network 280. Those of ordinary skill in the pertinent art would recognize that the marketplace 210, the carrier vehicle 220, the fulfillment center 230, the customer 240, the autonomous ground vehicles 250-1, 250-2 . . . 250-*n* or the vehicle monitoring system 290 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, 232, 292, the computing devices 242, the processors 252-*i*, 296, or any other computers or control systems utilized by the marketplace 210, the carrier vehicle 220, the fulfillment center 230, the customer 240, the autonomous ground vehicles 250-1, 250-2 . . . 250-*n*, the vehicle monitoring system 290, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
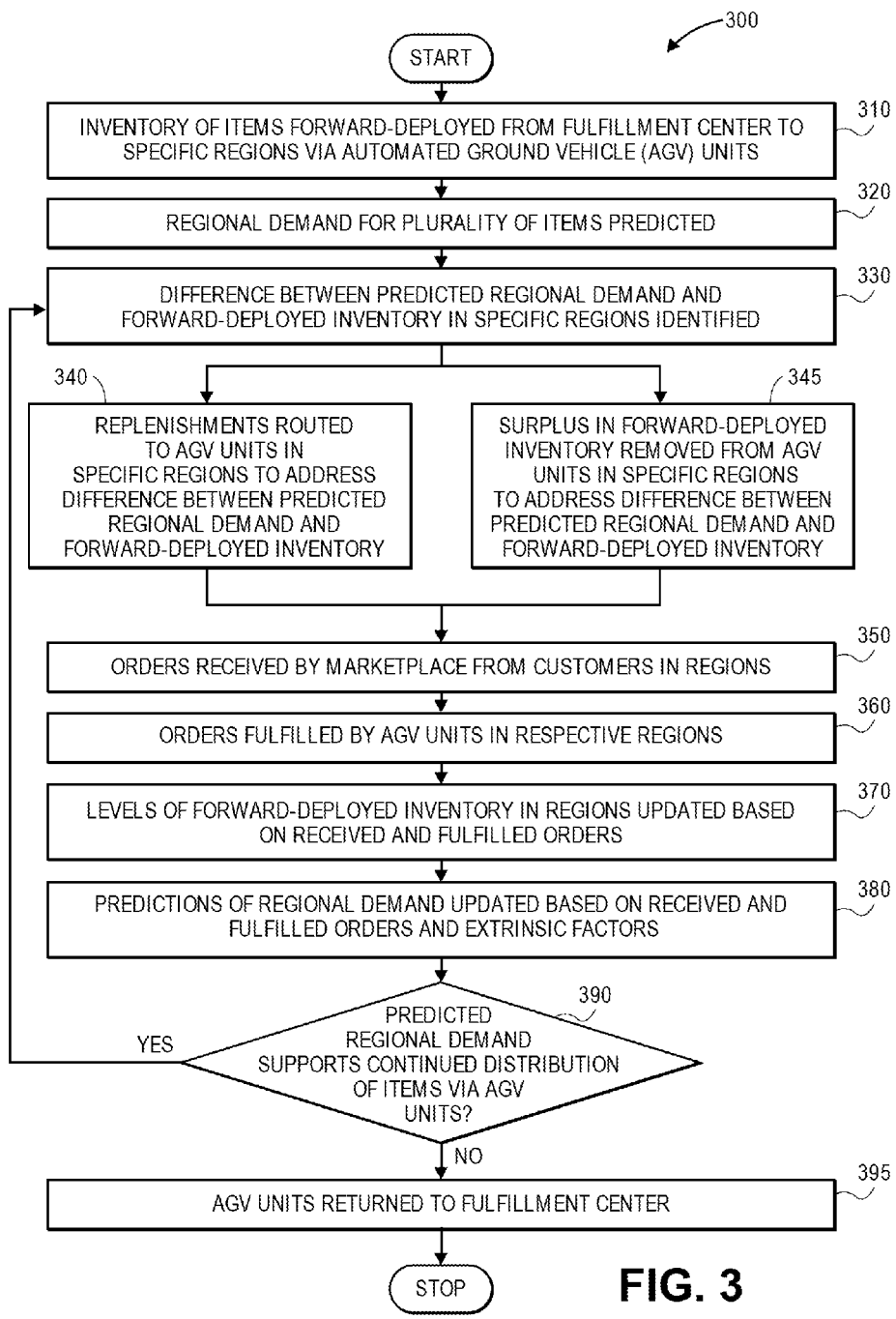
FIG. 3 is a flow chart of one process for distributing or retrieving inventory or materials using autonomous vehicles in accordance with embodiments of the present disclosure.

As is discussed above, in some embodiments, the systems and methods of the present disclosure may be used to distribute, or forward-deploy, inventory from one location to another location where demand for such items is known, observed or predicted, using one or more autonomous ground vehicles. Referring to FIG. 3, a flow chart 300 of one process for distributing or retrieving inventory or materials using autonomous vehicles in accordance with embodiments of the present disclosure is shown. At box 310, inventory of items is forward-deployed from a fulfillment center to one or more specific regions via a plurality of autonomous ground vehicle units. For example, referring again to FIG. 1B, one or more items, such as the items 10-1, 10-2A, 10-2B, 10-3A, 10-3B, may be loaded into storage compartments or other areas of autonomous vehicles, e.g., the autonomous vehicles 150-1, 150-2, 150-3, and secured therein. The autonomous ground vehicle units may then travel from the fulfillment center to one or more other locations, either independently or autonomously, by one or more carrier vehicles, or by any other means.

At box 320, a regional demand for the plurality of items is predicted on any basis. For example, the regional demand for the items may be determined based on prior purchasing histories of customers in specific regions, or demographics to which such customers belong. The regional demand may also be predicted based on attributes of the respective items, any upcoming events occurring at the local, regional, national or global events levels, or any traditional, prevailing or emerging attitudes or mores within the respective regions that may be determined on any basis and using information or data obtained from any source, including but not limited to one or more postings or comments made to social networks, or to details pages for items maintained at an online marketplace or any other locations. In some embodiments, once a level of demand is determined or predicted for a region, the level of demand may be compared to one or more thresholds or limits in order to determine whether the distribution or forward-deployment of items to the region is justifiable or necessary.

At box 330, differences between the predicted regional demand and the forward-deployed inventory in specific regions are determined. For example, in each region where a demand for items is predicted at box 320, the inventory of items that is available to respond to that inventory may be compared to that demand on an item-wide or category-wide basis. A deficit of items, or a surplus of items, may be determined for each item, or category of items, in each region.

At box 340, replenishments of items may be routed to autonomous ground vehicle units in the specific regions to address differences between predicted regional demand and forward-deployed inventory in those regions. For example, where the available inventory of a given item, or category of items, in a given region falls below the predicted (or known or observed) demand for such items, the inventory may be replenished by distributing additional items to the region, e.g., by a carrier vehicle, or by one or more other autonomous ground vehicles, from one or more fulfillment centers or other sources of such items, or other locations, including but not limited to regions where the predicted regional demand for such items is less than the predicted regional demand for such items in the given region. In parallel, and at box 345, surplus items in the forward-deployed inventory may be removed from the autonomous ground vehicle units to address differences between the predicted regional demand and the forward-deployed inventory in those regions. For example, when the available inventory of a given item, or a category of items, in a given region exceeds the predicted (or known or observed) demand for such items, the inventory may be returned to one or more fulfillment centers or other sources of such items, or other locations, including but not limited to regions where the predicted regional demand for such items exceeds the predicted regional demand for such items in the given region. Any factor may be considered in determining whether to distribute additional inventory to a region, or to remove surplus inventory from the region, including but not limited to cost-based considerations (e.g., financial costs, as well as opportunity costs).

At box 350, one or more orders are received from customers in regions, e.g., by way of a network site associated with an online marketplace, or a dedicated shopping application operating on a smartphone or other computer device, or by any other channel. At box 360, the orders are fulfilled by autonomous ground vehicle units within the respective regions where such orders are received or scheduled for delivery. For example, upon receipt of an order for one or more items from a customer, computer devices or resources operated by an online marketplace, a fulfillment center or any other commercial entity may determine that the ordered items are available onboard one or more autonomous ground vehicle units within a given region, and may dispatch or instruct one or more of such units to deliver the ordered items to the customer, or to a destination designated by the customer. An order may be completely or partially fulfilled using autonomous ground vehicle units in a given region, based on the levels of available inventory within the region, a proximity of a fulfillment center or other source of the ordered items to a customer or an intended destination, or on any other factor. Moreover, an autonomous vehicle may collaborate with one or more humans, machines or other vehicles, such as other autonomous vehicles in fulfilling an order received by the marketplace from one or more customers in the regions.

At box 370, levels of the forward-deployed inventory in such regions are updated based on the orders for such items that were received in such regions and fulfilled using autonomous ground vehicle units in such regions. The levels of the forward-deployed inventory may be updated in real time, or in near-real time, immediately upon the receipt of an order, the receipt of payment for the items included in the order, or upon the confirmed delivery of the items to a customer or a designated location. Alternatively, the levels of the forward-deployed inventory may update periodically, e.g., on an hourly, daily, weekly or monthly basis, or at any other predetermined time.

At box 380, the predictions of regional demand are updated based on the received and fulfilled orders, or on one or more external factors. For example, in anticipation of Halloween, predictions of demand for candy in a given region may be updated based on orders for candy that were fulfilled using one or more autonomous ground vehicle units, as well as known purchases of candy, or deliveries of candy, to the region. The predictions of the demand for candy may be further updated based on the day of the week on which Halloween is scheduled to occur in a given year (e.g., with greater demand for candy when October 31 falls on a weekend, and lesser demand when October 31 is a weekday), based on a weather forecast for the region (e.g., with greater demand for candy when weather is favorable for or conducive to trick-or-treating, and lesser demand for candy when adverse weather is predicted), based on local health levels or initiatives, or any other factors.

At box 390, whether the predicted regional demand supports the continued distribution of items to regions via autonomous ground vehicle units is determined. If regional demand for a given item remains strong, and orders for the given item are expected to be received in the near term, the process returns to box 330, where differences between the predicted regional demand and the forward-deployed inventory in the specific regions are determined. If the regional demand for the given item is sufficiently low, or may be fulfilled using existing, non-distributed or non-forward-deployed inventory on a cost-effective basis, then the process advances to box 395, where the autonomous ground vehicle units are instructed to return to the fulfillment center or, alternatively, to other locations where the regional demand may support their presence therein, and the process ends.

Accordingly, embodiments of the autonomous ground vehicles of the present disclosure may be used to distribute or forward-deploy inventory to regions where known, observed or predicted demand supports their presence there, and when orders for the inventory are reasonably anticipated. Alternatively, embodiments of the autonomous ground vehicles of the present disclosure may also be used to remove surplus items from a given region, and to return items to a fulfillment center or deliver the items to another region.

Figure 4:
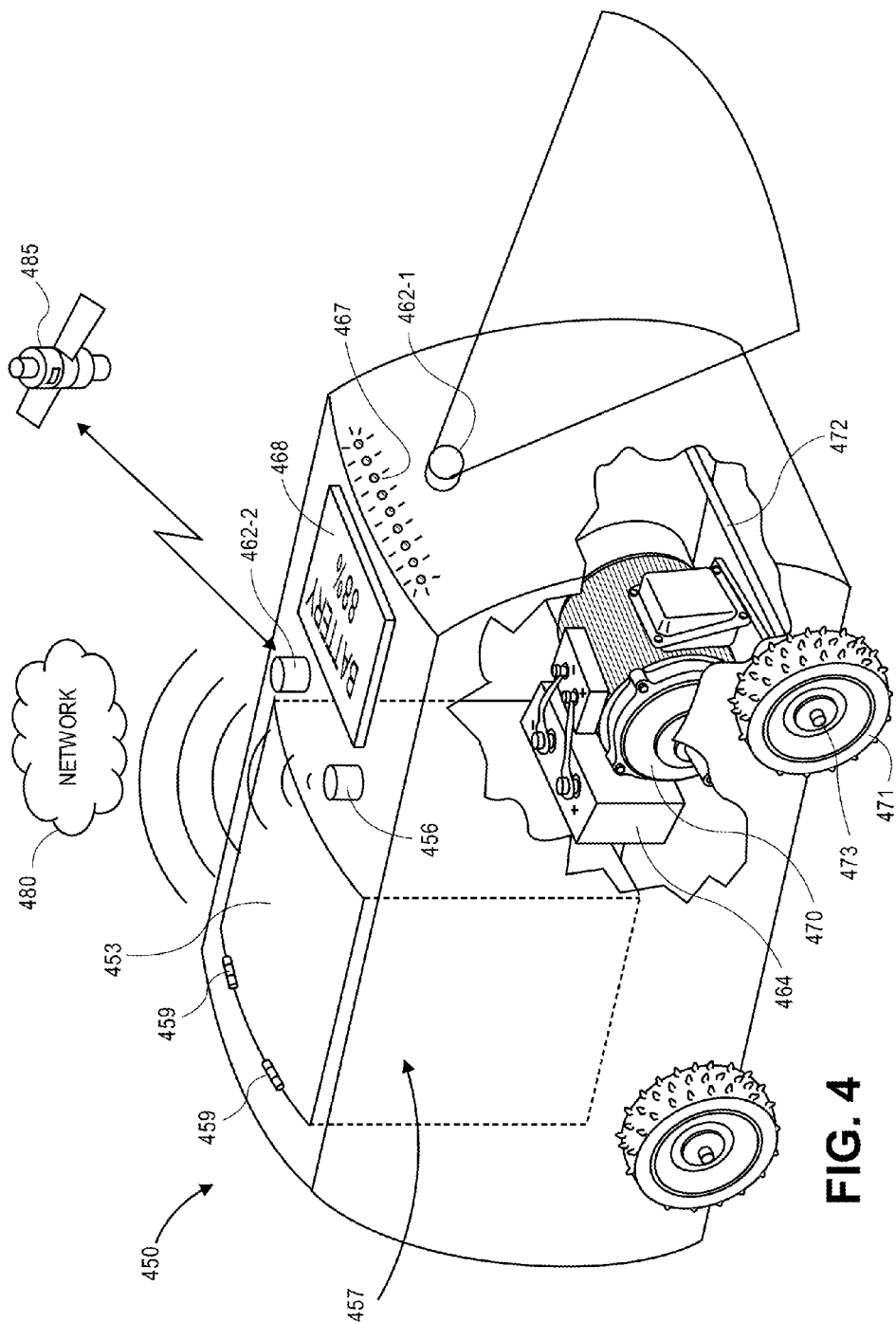
FIG. 4 is a view of one autonomous ground vehicle for distributing or retrieving inventory or materials in accordance with embodiments of the present disclosure.

One example of an autonomous ground vehicle that may be used in the distribution or retrieval of inventory or materials in response to known, observed or predicted demand is shown in FIG. 4. Referring to FIG. 4, a view of one autonomous ground vehicle 450 for distributing or retrieving inventory or materials in accordance with embodiments of the present disclosure is shown. Except where otherwise noted, reference numerals preceded by the number "4" in FIG. 4 refer to elements that are similar to elements having reference numerals preceded by the number "2" in FIG. 2A or FIG. 2B or by the number "1" shown in FIGS. 1A through 1H.

As is shown in FIG. 4, the autonomous ground vehicle 450 includes a frame 452, a storage compartment 457, a pair of axles 471 and a plurality of wheels 472 joined to the axles 471. A front surface of the frame 452 includes an imaging device 462-1 having a field of view aligned in a forward direction or orientation with respect to the autonomous ground vehicle 450 and an array of lights 467. In some embodiments, the autonomous ground vehicle 450 may include any number of imaging devices 462-1, with fields of view that may be permanently or adjustably aligned in any direction or orientation with respect to the autonomous ground vehicle 450. In some embodiments, the autonomous ground vehicle 450 may include any number of lights, on any surface thereof, and one or more of the lights may include light emitting diodes (LEDs) or other light sources.

An upper surface of the frame 452 includes a door 453 providing access to the storage compartment 457 is rotatably connected by a pair of hinges 459. The door 453 may include any number of manual or automatic features for causing the opening or closing thereof, and may include any suitable dimensions with respect to the dimensions of the storage compartment 457. In some embodiments, the autonomous ground vehicle 450 may include doors 453 on any surface thereof, and any number of storage compartments 457 of any size or shape. The upper surface of the frame 452 further includes a transceiver 456, as well as a GPS receiver 462-2, which may receive geolocation data from or transmit geolocation data to a GPS network 485. In some embodiments, the transceiver 456 may include a WiFi transmitter and/or receiver for communicating with a network 480, which may include the Internet in whole or in part, as well as any other transmitters and/or receivers for communicating in any other manner or fashion, or according to any other protocols. In some embodiments, the transceiver 456 may be configured to transmit and/or receive one or more codes or other information or data in one or more radio frequency (or "RF") waves or signals, at any frequencies or power levels. In some embodiments, the transceiver 456 may be configured to transmit and/or receive radio frequency identification (or "RFID") signals, near-field communication (or "NFC") signals, Bluetooth® signals, or any other type of wireless signals. Additionally, the upper surface of the frame 452 further includes a user interface 468 which may receive manual interactions from a human user, or display information to the human user, as appropriate. For example, the user interface 468 may be a touchscreen display. In some embodiments, the GPS receiver 462-2, the user interface 468 and/or the user interface 468 may be provided on any other surface of the frame 452.

As is shown in FIG. 4, the autonomous ground vehicle 450 may include a power module 464 (e.g., a battery), a motor 470 (e.g., a DC electric motor operating at twelve to forty-eight volts) and a steering component 472 (e.g., one or more racks or pinions for automatically changing a direction of travel of the autonomous ground vehicle 450 and/or an orientation of one or more of the axles 471 or the wheels 473. The motor 470 may be configured to operate at any speed or have any power rating, and to cause the autonomous ground vehicle 450 to travel in a forward direction of travel, a reverse direction of travel or in any other direction of travel as determined by the steering component 472. Additionally, the axles 471 and wheels 473 of the autonomous ground vehicle 450 may also have any dimension. For example, the wheels 473 may have bores or axle pads for accommodating axles 471 of any diameter or thickness, and any number of spokes or other extensions for supporting a rim having any desired spacings or offsets for accommodating tires or other coverings. Each of the axles 471 may be joined to and configured to rotate any number of wheels 473, which may include tires or other coverings of any suitable material, including but not limited to rubbers and/or plastics. The wheels 473 or tires thereon may feature any number of belts, walls, treads or other components, and may be pneumatic or solid, or take any other form.

In some embodiments, the autonomous ground vehicle 450 may include an automated fabricator such as a 3D printer, having any type or form of tooling equipment (not shown), e.g., within the storage compartment 457 or elsewhere aboard the autonomous ground vehicle 450. Such fabricators and/or tooling equipment may include any machines or components for manipulating materials (e.g., stock materials loaded onto the autonomous ground vehicle 450, or materials obtained from items, waste products generated by such items, or remnants or scraps of such items that are no longer desired) to form an end product therefrom. For example, the fabricators and/or tooling equipment may include one or more filaments, heads, blades, nozzles, motors, rollers, heat sources, radiation sources or other elements for molding, shaping, forming, curing, solidifying or depositing layers of one or more of materials, or otherwise manipulating the materials, and forming an end product therefrom. The materials may be any liquid, gaseous or solid materials that may be accessible to the tooling equipment and molded, shaped, formed, cured, solidified or deposited into an end product. For example, the materials may be maintained or stored in one or more vats, vessels, tanks, bins, platforms or other storage spaces within a chamber of the autonomous ground vehicle 450, or accessible thereto. In some embodiments, the materials may include thermoplastic materials including but not limited to acrylonitrile-butadiene-styrene, nylon, high density polyethylene, polycarbonate, polyetherimide, polyether ether ketone, polylactic acid, poly(meth)acrylate, polyphenylene sulphone, polystyrene, as well as one or more polymers, copolymers or ionomers thereof, or combinations of any of such materials. In some embodiments, the materials may include aluminum, antimony, barium, bismuth, cesium, gold, lead, iodine, steel, tantalum, tin or tungsten, or one or more oxides, nitrides or alloys thereof. In some embodiments, the materials may include not only liquids, gases or solids but also gels, resins, plasmas or any other types or classes of materials.

According to some embodiments, autonomous vehicles of the present disclosure, such as the autonomous ground vehicle 450 of FIG. 4, may be configured for travel throughout an area or environment, such as travel on traditional transportation and non-traditional transportation infrastructure provided within the area or environment. The autonomous ground vehicle 450 may select a path or route based on geospatial data regarding physical features in an area or environment including but not limited to topographical data regarding the composition and surface features within the area or environment, as well as elevations of points within the area or environment, which may be identified or determined from satellite or ground-based imagery, GIS data, or any other information or data obtained from any other source. Similarly, where an area or environment includes transportation infrastructure such as roads, sidewalks, crosswalks, bicycle or walking paths, bridges or trails, and also non-traditional transportation infrastructure, e.g., parks, fields, forests, lots, clearings or other spaces, the autonomous vehicle 450 may be configured for travel thereon along one or more paths or routes, which may be selected or defined based on attributes of the transportation infrastructure and other physical features within the area or environment, as well as attributes of prior travel through the area or environment. Information or data regarding prior travel that may be used to select or define a path or route within an area or environment includes, but is not limited to, one or more time stamps (e.g., times and positions of autonomous vehicles within the given area at such times), elapsed times between departures and arrivals, net speeds, courses, angles of orientation (e.g., a yaw, a pitch or a roll), levels of traffic congestion, sizes or dimensions of any payloads carried, environmental conditions or any other information or data that describes or represents instances of prior travel by autonomous vehicles within the area or environment.

One example of the use of autonomous vehicles to distribute or forward-deploy inventory to regions or locations where demand for such items is known, observed or predicted, or to redistribute or re-deploy such inventory, using autonomous ground vehicles is shown in FIGS. 5A through 5H. Referring to FIGS. 5A through 5H, views of aspects of one system 500 for distributing or retrieving inventory or materials using autonomous vehicles in accordance with embodiments of the present disclosure is shown. Except where otherwise noted, reference numerals preceded by the number "5" in FIGS. 5A through 5H refer to elements that are similar to elements having reference numerals preceded by the number "4" in FIG. 4, by the number "2" in FIG. 2A or FIG. 2B or by the number "1" shown in FIGS. 1A through 1H.

Figure 5A:
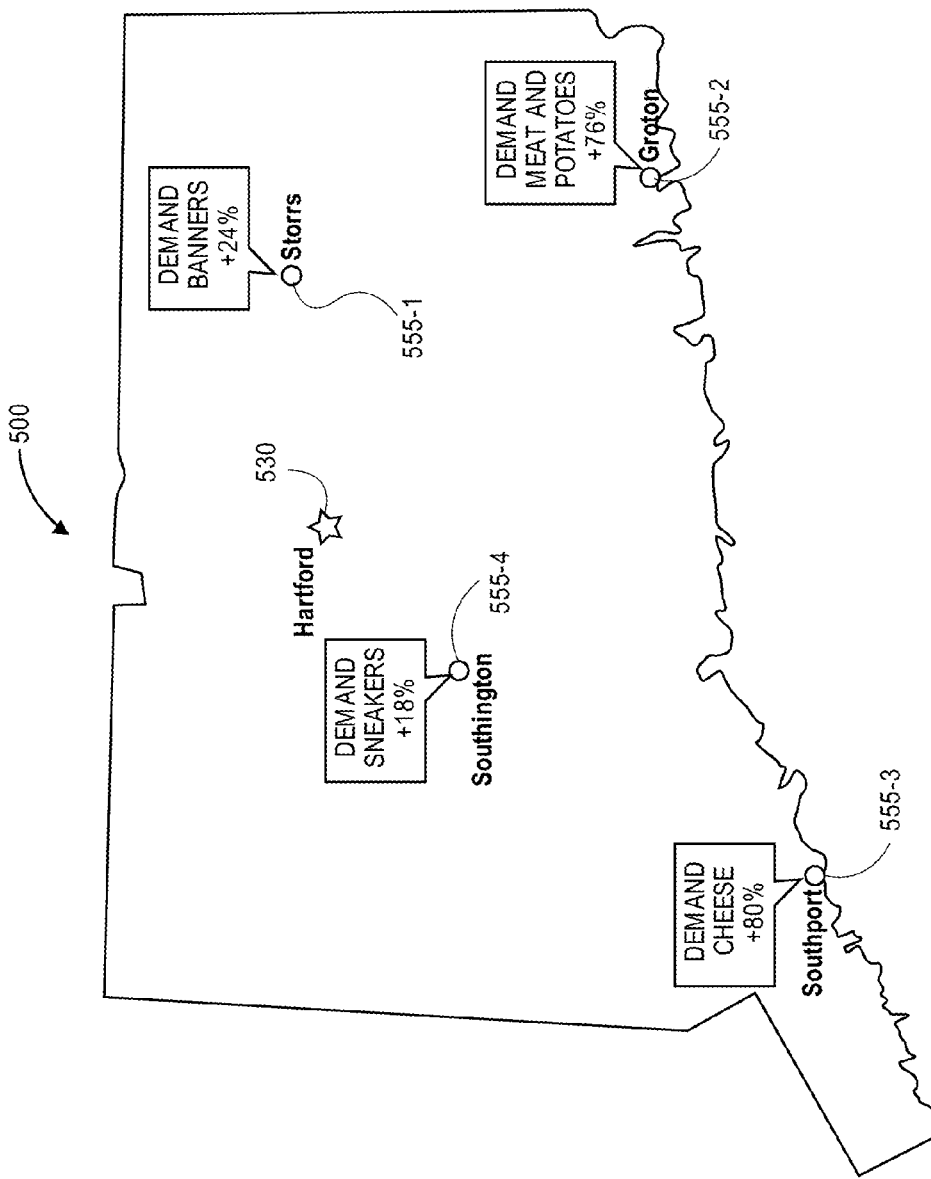
FIGS. 5A through 5H are views of aspects of one system for distributing or retrieving inventory or materials using autonomous vehicles in accordance with embodiments of the present disclosure.

As is shown in FIG. 5A, the system 500 includes a fulfillment center 530 in a centralized location (viz., Hartford, Conn.) and a number of areas 555-1, 555-2, 555-3, 555-4 where locally high levels of demand for specific items are known or have been observed. For example, in the region 555-1 (viz., Storrs, Conn.), demand for banners is twenty-four percent (24%) greater than normal. In the area 555-2 (viz., Groton, Conn.), demand for meat and potatoes is seventy-six percent (76%) greater than normal. In the area 555-3 (viz., Southport, Conn.), demand for cheese is eighty percent (80%) greater than normal. In the area 555-4 (viz., Southington, Conn.), demand for sneakers is eighteen percent (18%) greater than normal.

Figure 5B:
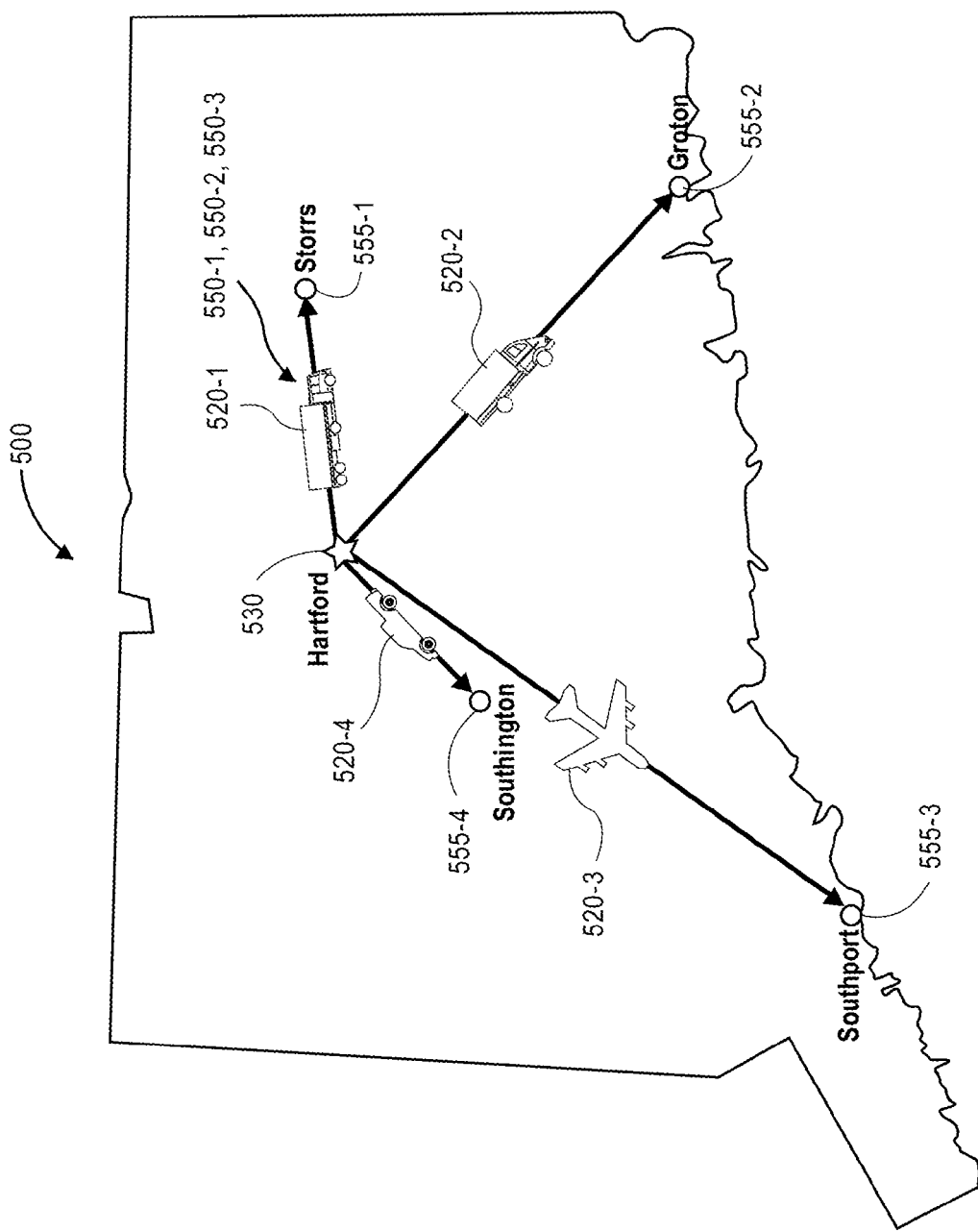

As is discussed above, and in accordance with some embodiments of the present disclosure, items may be distributed or forward-deployed to regions based on the known, predicted or observed demand for such items. As is shown in FIG. 5B, carrier vehicles 520-1, 520-2, 520-3, 520-4 depart from the fulfillment center 530 with one or more autonomous ground vehicles thereon. For example, the carrier vehicle 520-1 (viz., a tractor-trailer) departs from the fulfillment center 530 for the area 555-1 with a plurality of autonomous ground vehicles 550-1, 550-2, 550-3 having banners stored therein. Likewise, the carrier vehicle 520-2 (viz., a van), the carrier vehicle 520-3 (viz., an airplane) and the carrier vehicle 520-4 (viz., a truck) depart from the fulfillment center 530 for the areas 555-2, 555-3, 555-4 with respective pluralities of autonomous ground vehicles (not shown) having meat and potatoes, cheese and sneakers, respectively, therein.

Figure 5C:
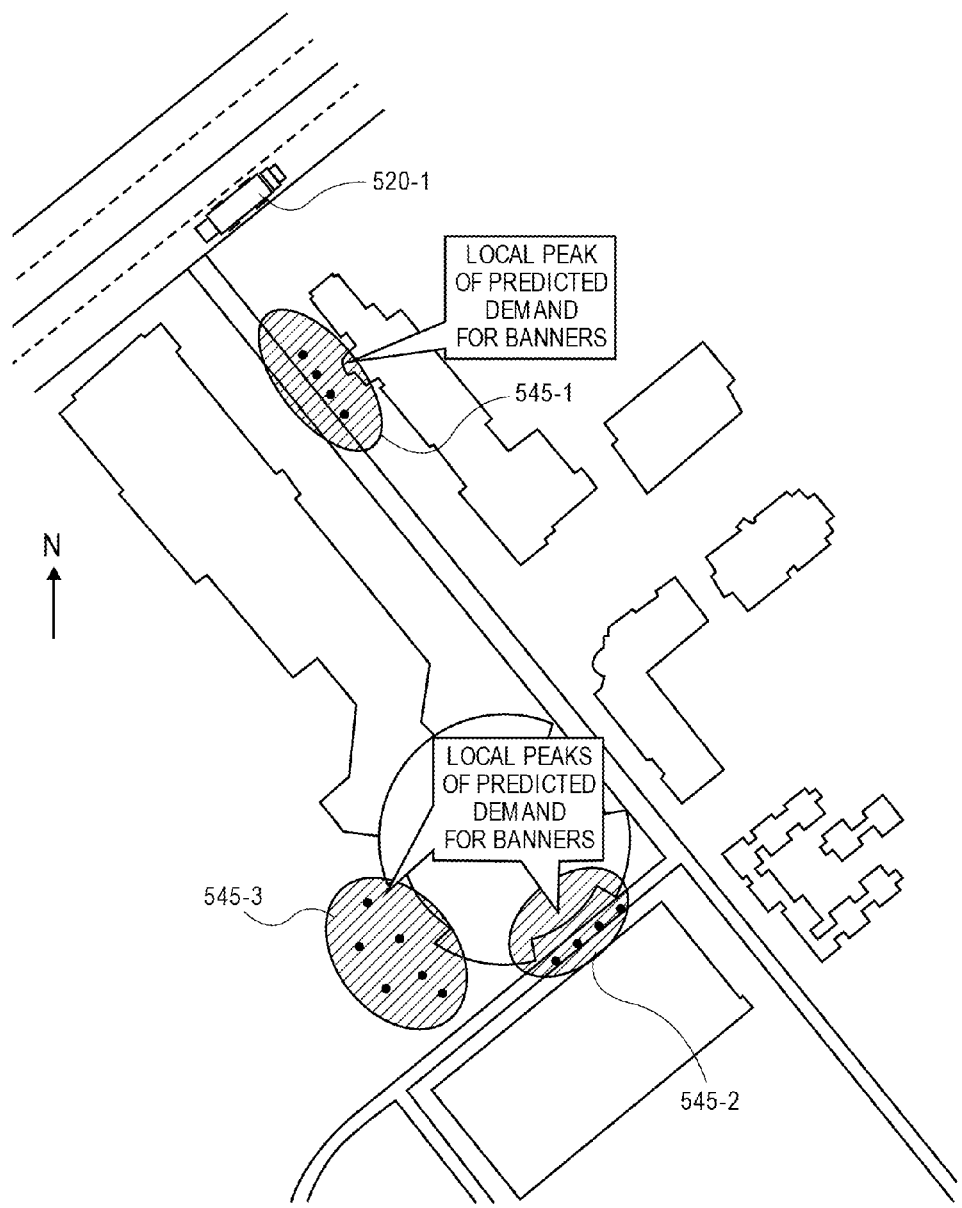
Figure 5D:
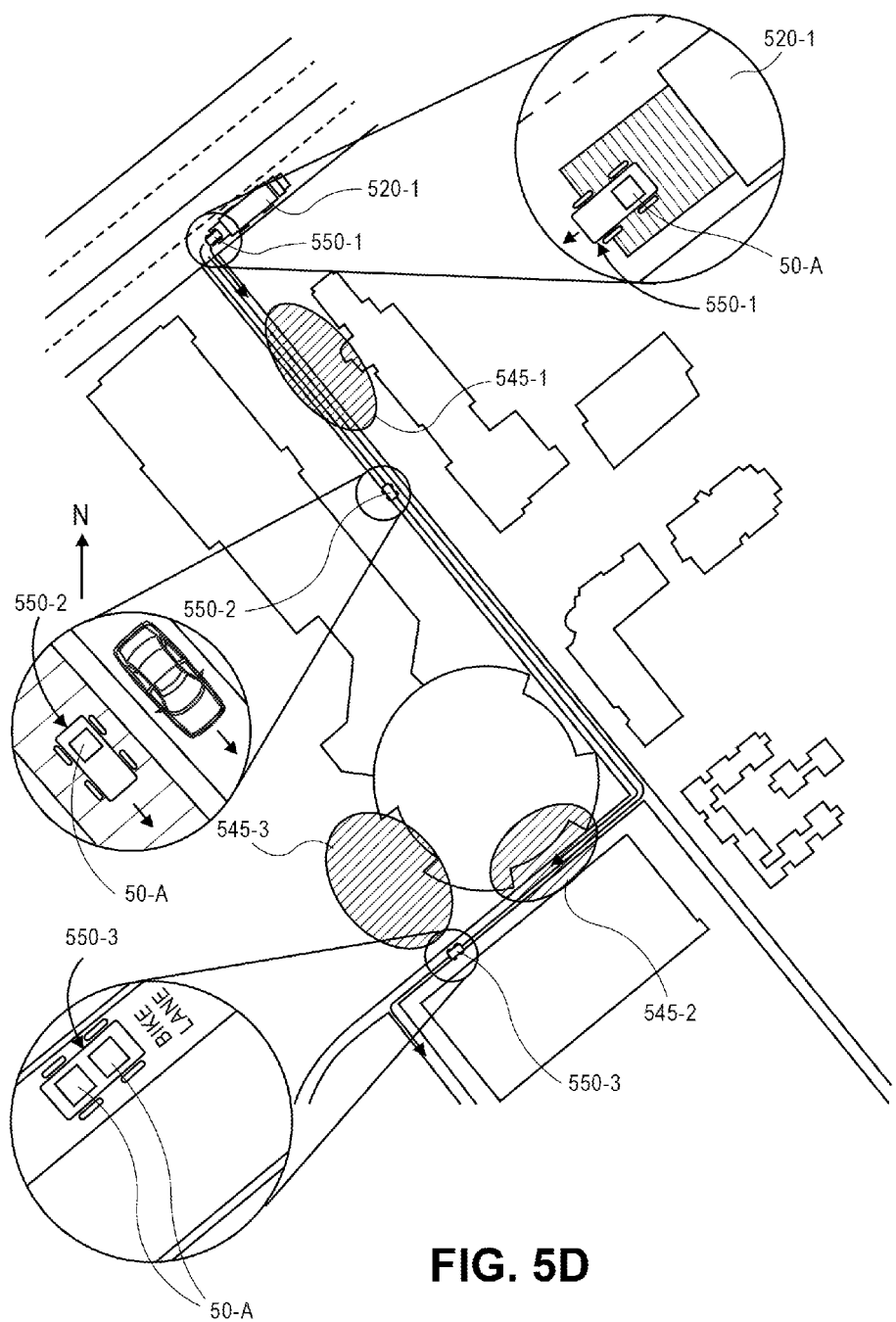

The carrier vehicles and the autonomous vehicles may be transported as close as is possible or feasible under the respective circumstances to specific regions where demand for items stored therein is known. As is shown in FIG. 5C and FIG. 5D, upon its arrival at the area 555-1, the carrier vehicle 520-1 may be parked within range of regions 545-1, 545-2, 545-3 where demand for the items 50-A (viz., banners) within the autonomous vehicles 550-1, 550-2, 550-3 is known, observed or predicted to be locally high. The autonomous vehicles 550-1, 550-2, 550-3 may disembark from the carrier vehicle 520-1 and travel to the regions 545-1, 545-2, 545-3, or to within vicinities of such regions, where the autonomous vehicles 550-1, 550-2, 550-3 may await the receipt of one or more orders for the items 50-A from customers in such regions, or from customers elsewhere in the area 555-1. For example, as is shown in FIG. 5D, the autonomous vehicles 550-1, 550-2, 550-3 may disembark from the carrier vehicle 520-1 and travel toward the regions 545-1, 545-2, 545-3 on one or more roads, sidewalks, crosswalks, bicycle or walking paths, bridges or trails, or through parks, fields, forests, lots, clearings or other spaces between the carrier vehicle 520-1 and such regions 545-1, 545-2, 545-3. When orders for delivery of the items 50-A to one or more of the regions 545-1, 545-2, 545-3, or to nearby locations, the orders may be assigned to one or more of the autonomous vehicles 550-1, 550-2, 550-3, which may then fulfill such orders by delivering the items 50-A to locations specified by the customers, e.g., to home addresses, business addresses, storage lockers or other destinations or facilities within the area 555-1.

Figure 5E:
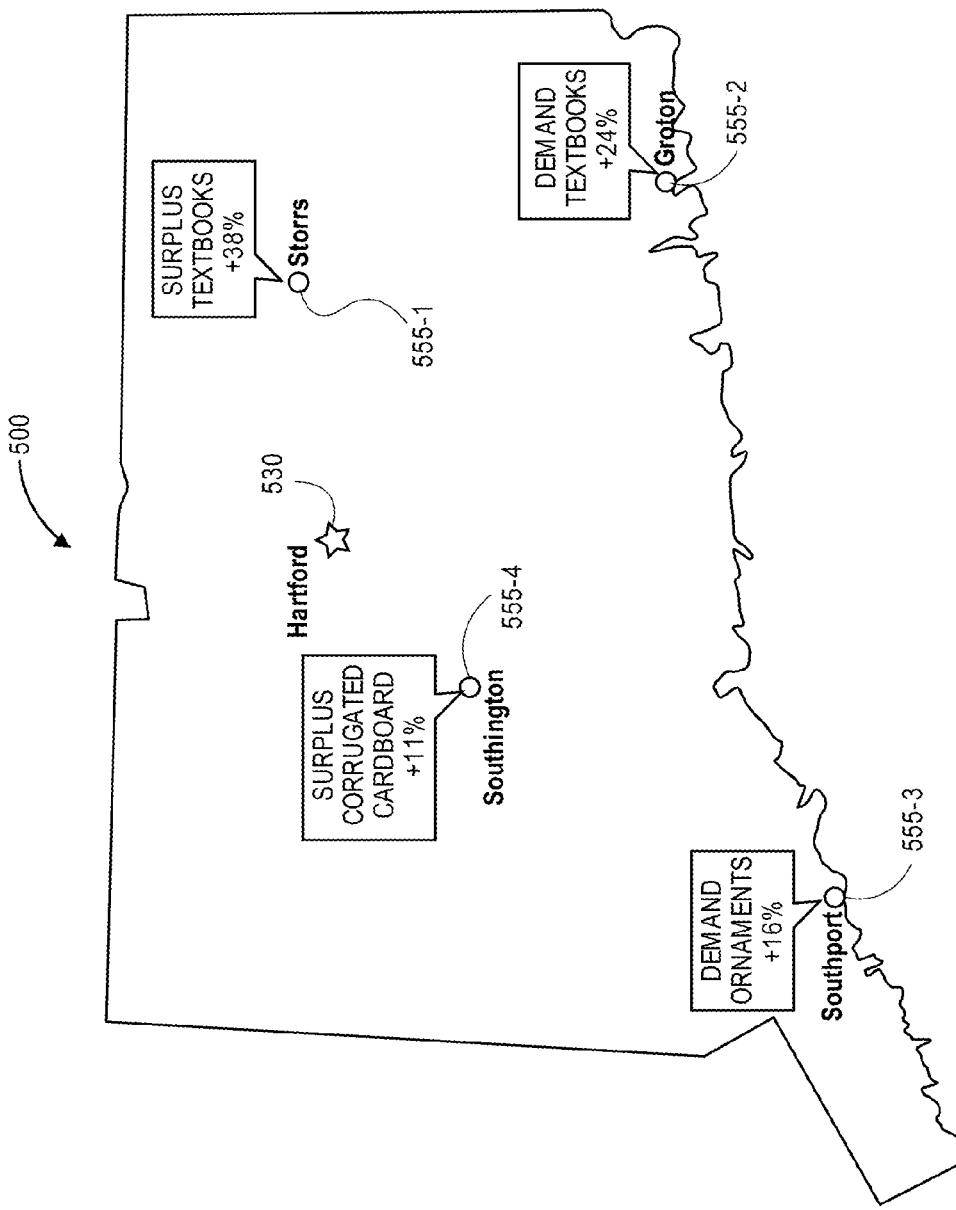

As is also discussed above, the systems and methods of the present disclosure are also configured to respond to changes in demand and/or levels of distributed or forward-deployed inventory using autonomous ground vehicles, in whole or in part. As is shown in FIG. 5E, the areas 555-1, 555-2, 555-3, 555-4 report changes in the levels of actual or predicted demand and inventory levels for specific items. For example, as is shown in FIG. 5E, in the region 555-1, there is a surplus of textbooks that is thirty-eight percent (38%) greater than normal, while in the region 555-2, there is a demand for textbooks that is twenty-four percent (24%) greater than normal. In the region 555-3, demand for ornaments is sixteen percent (16%) greater than normal, while in the region 555-4, a surplus of corrugated cardboard is eleven percent (11%) greater than normal.

Figure 5F:
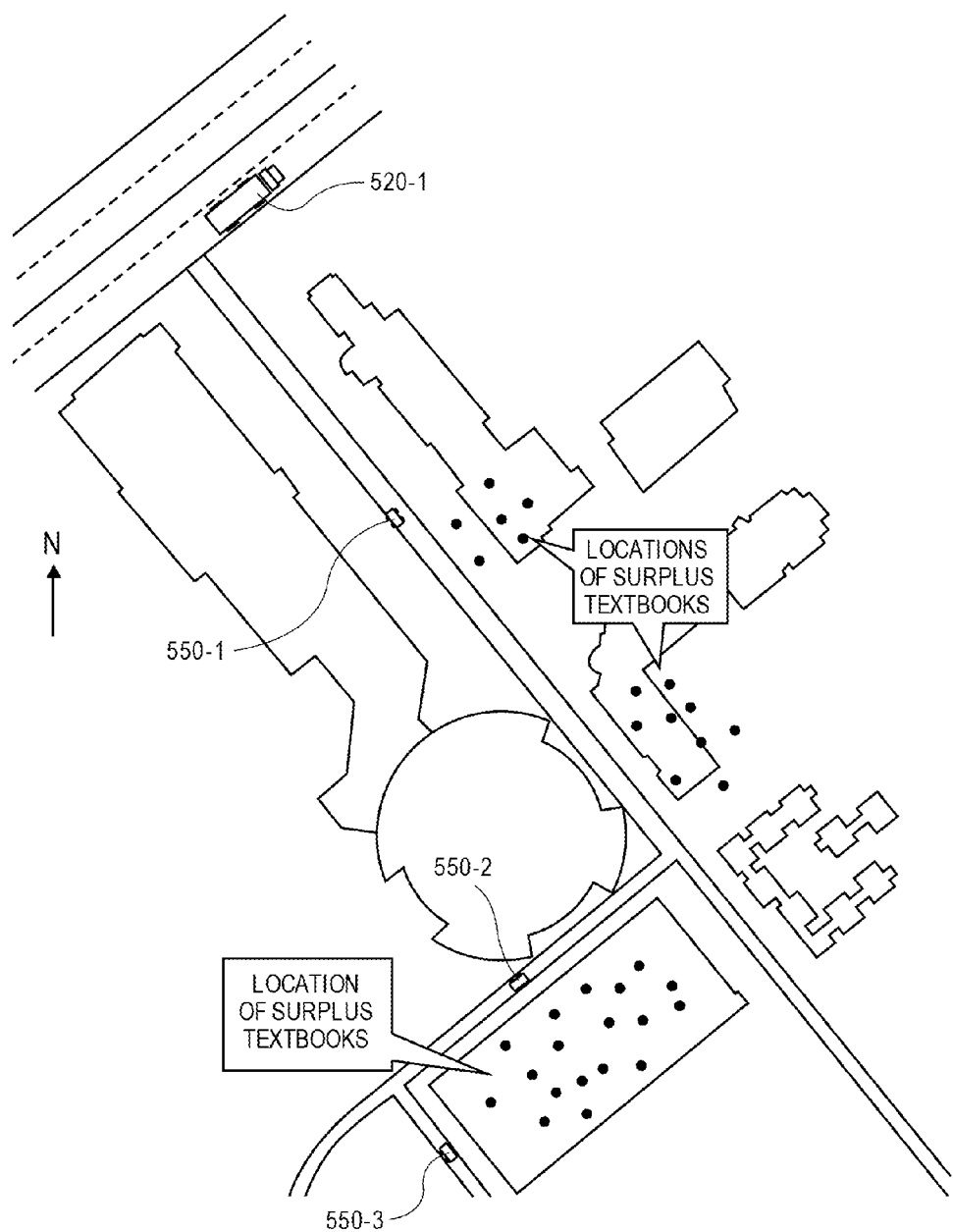
Figure 5G:
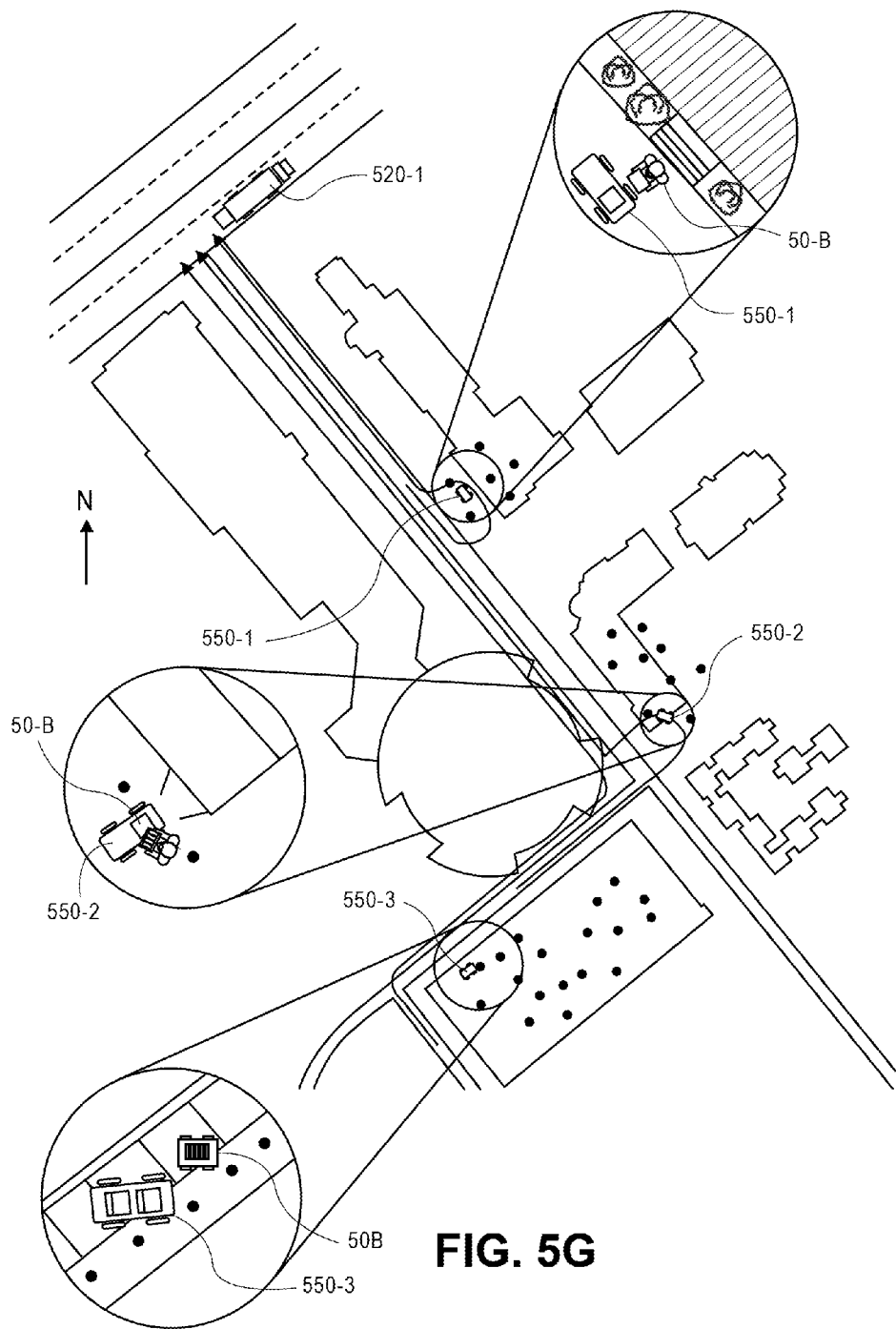
Figure 5H:
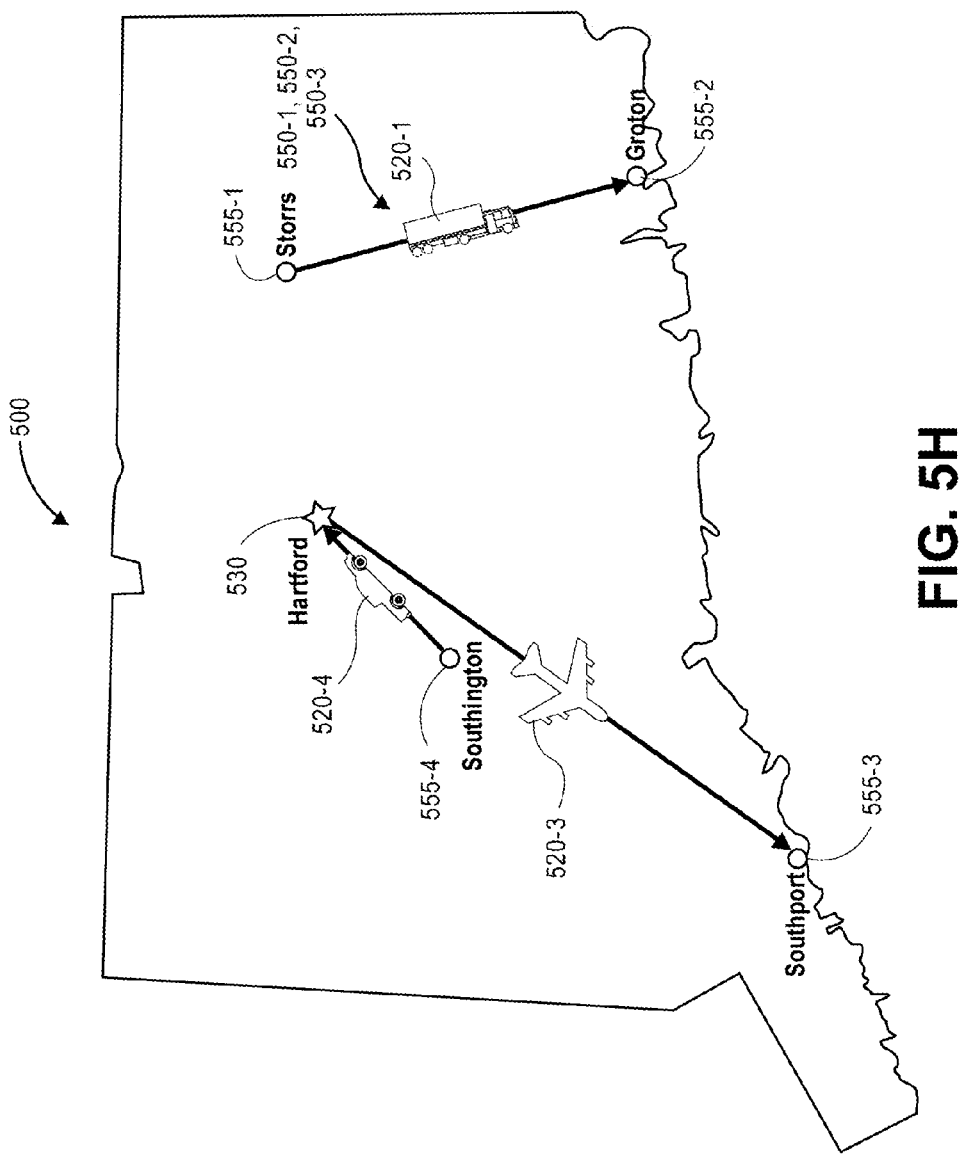

The observed surpluses and demands for items within the system 500 may be addressed by deploying inventory to areas of high or elevated demand, and removing inventory from areas of low or reduced demand, using autonomous vehicles. As is shown in FIG. 5F, and in response to the increased surplus of textbooks within the area 555-1 as shown in FIG. 5E, regions 545-4, 545-5, 545-6 where surplus textbooks are known to be located, or are believed to be located, are identified. As is shown in FIG. 5G, the autonomous vehicles 550-1, 550-2, 550-3, which were previously loaded with the items 50-A and transported to the area 555-1 by the carrier vehicle 520-1, may then be instructed to travel to such regions 545-4, 545-5, 545-6, where the autonomous vehicles 550-1, 550-2, 550-3 may retrieve one or more of the items 50-B (viz., textbooks) from users in such regions. For example, upon identifying the regions 545-4, 545-5, 545-6 having locations where the items 50-B are available, an online marketplace or other automatic or human-based systems may initiate contact with one or more owners of the items 50-B in the area 555-1 in general, or in the regions 545-4, 545-5, 545-6 in particular, and offer to purchase or otherwise obtain the items 50-B from the owners who are located there. The autonomous vehicles 550-1, 550-2, 550-3 may then be instructed to receive the items 50-B from such owners, to store the items 50-B therein, and to return to the carrier vehicle 520-1, where the vehicles 550-1, 550-2, 550-3 may be loaded thereon.

Thereafter, the autonomous ground vehicles 550-1, 550-2, 550-3, and the textbooks stored therein, may be transported to locations where demand for textbooks is particularly high, viz., the region 555-2. Simultaneously, or at different times, the carrier vehicle 520-3 may transport autonomous vehicles (not shown) having ornaments stored therein from the fulfillment center 530 to the area 555-3, to address the increased level of demand for such items that was known, predicted or observed in the area 555-3. Meanwhile, the carrier vehicle 520-4 may return from the area 555-4 to the fulfillment center 530 (or another destination) with autonomous vehicles (not shown) carrying corrugated cardboard retrieved from regions or locations in the area 555-4, in response to the surplus of corrugated cardboard that was known, predicted or observed there.

In accordance with embodiments of the present disclosure, autonomous vehicles of the present disclosure may be transported from one location to another in any manner. In some embodiments, autonomous vehicles may travel between any two or more locations under their own power. For example, autonomous vehicles may be instructed to travel with a plurality of items from a fulfillment center or other centralized location to regions where demand for the items is known, observed or predicted, e.g., on roads, sidewalks, crosswalks, bicycle or walking paths, bridges or trails, or through parks, fields, forests, lots, clearings or other spaces, such as at night or during other periods when vehicle and/or foot traffic are expected to be low. Alternatively, as is shown in FIGS. 5B, 5C, 5D, 5G and 5H, autonomous vehicles may be transported via a ground-based carrier vehicle, which may, in some embodiments, be a truck and/or trailer (e.g., a tractor-trailer or similarly sized or configured vehicle), a van, a car, a cart or another like vehicle, as well as another autonomous ground vehicle. The transportation of autonomous vehicles is not limited to ground-based modes of transit, however.

Referring to FIG. 6, a view of aspects of one system 600 for distributing or retrieving inventory or materials using autonomous vehicles in accordance with embodiments of the present disclosure is shown. Except where otherwise noted, reference numerals preceded by the number "6" in FIG. 6 refer to elements that are similar to elements having reference numerals preceded by the number "5" in FIGS. 5A through 5H, by the number "4" in FIG. 4, by the number "2" in FIG. 2A or FIG. 2B or by the number "1" shown in FIGS. 1A through 1H.

As is shown in FIG. 6, the system 600 includes a carrier vehicle 620 (e.g., a cargo aircraft) traveling over a region 645 where demand for one or more items is known, observed or predicted. The carrier vehicle 620 is seen deploying a plurality of autonomous vehicles 650-1, 650-2, 650-3, each of which is carrying one or more of the items that are in demand within the region 645. As is shown in FIG. 6, each of the autonomous vehicles 650-1, 650-2, 650-3 is equipped with a retractable parachute or other system enabling the autonomous vehicles 650-1, 650-2, 650-3 to disembark from the carrier vehicle 620 and land safely within the region 645. The carrier vehicle 620 may include one or more air-to-ground delivery systems for deploying the autonomous vehicles 650-1, 650-2, 650-3 therefrom, in any manner, including but not limited to a free-drop, a high-velocity airdrop, a low-velocity airdrop, or a low-altitude extraction. Alternatively, the autonomous vehicles 650-1, 650-2, 650-3 may be delivered to the region 645 using any other type or form of aerial vehicle, including but not limited to aircraft that are powered by jets, propellers or wind, such as unmanned aerial vehicles (or drones), helicopters, gliders or the like.

The deployment of inventory using autonomous vehicles that are delivered by air, such as is shown in FIG. 6, may be utilized at any time and in any location, and are particularly advantageous at times or in locations where delivery of autonomous vehicles via traditional transportation modes, such as highways, thruways, parkways, roads or streets, are unavailable for travel via vehicles such as cars, trucks, vans or trailers. For example, following a natural disaster, when one or more routes may be blocked or inaccessible, delivering autonomous vehicles via air, such as is shown in FIG. 6, may be particularly effective. Once the autonomous vehicles 650-1, 650-2, 650-3 have landed within the region 645, the autonomous vehicles 650-1, 650-2, 650-3 may determine their respective positions, e.g., using a GPS receiver, and execute one or more instructions to travel to specific locations within the region 645 where demand for the respective items carried aboard the autonomous vehicles 650-1, 650-2, 650-3 is particularly high, or to fulfill one or more orders for such items that were placed by customers within the region 645, or ordered for delivery to the region 645.

Figure 7:
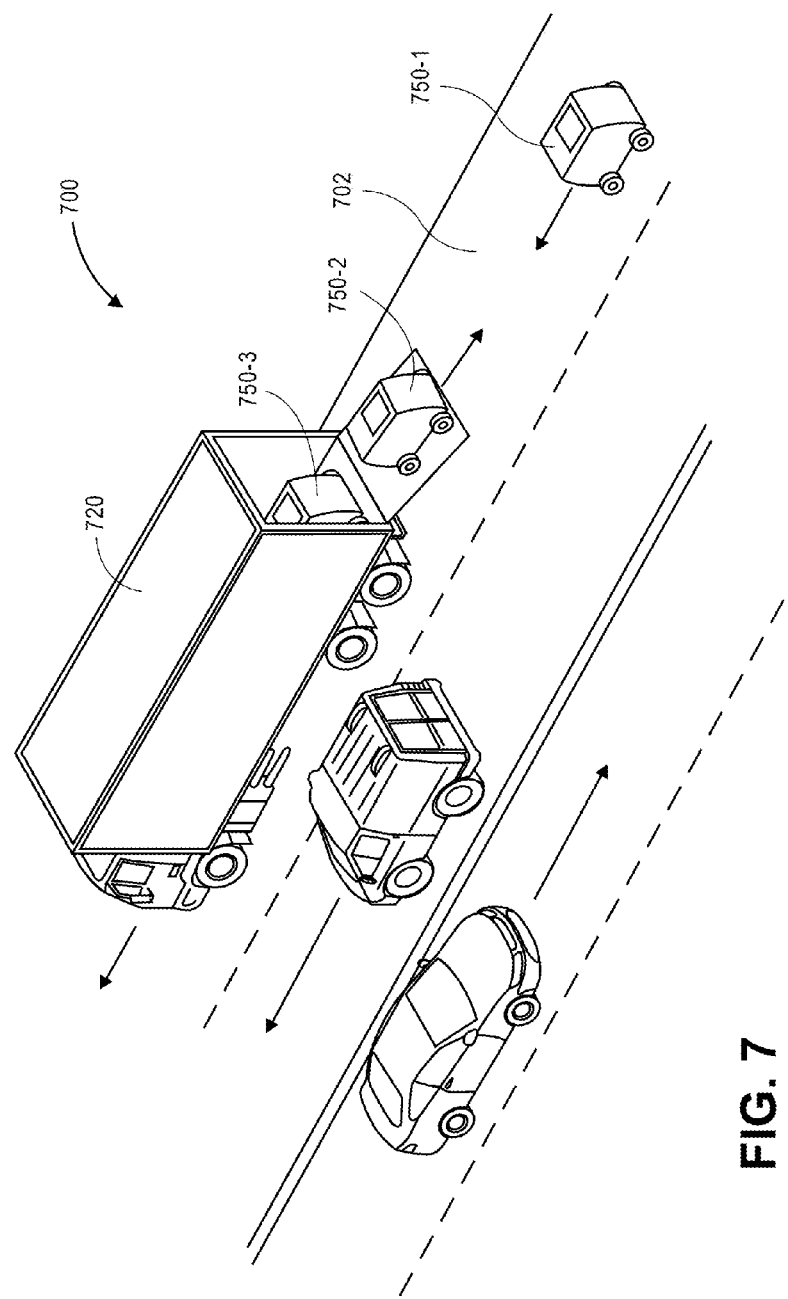
FIG. 7 is a view of aspects of one system for distributing or retrieving inventory or materials using autonomous vehicles in accordance with embodiments of the present disclosure.

Additionally, autonomous vehicles may return from a location in any manner, such as under their own power, or by boarding a ground-based carrier vehicle that is at rest, such as the carrier vehicle 520-1 shown in FIG. 5G. Autonomous vehicles may also be delivered or retrieved using ground-based carrier vehicles that are in motion. Referring to FIG. 7, a view of aspects of one system 700 for distributing or retrieving inventory or materials using autonomous vehicles in accordance with embodiments of the present disclosure is shown. Except where otherwise noted, reference numerals preceded by the number "7" in FIG. 7 refer to elements that are similar to elements having reference numerals preceded by the number "6" in FIG. 6, by the number "5" in FIGS. 5A through 5H, by the number "4" in FIG. 4, by the number "2" in FIG. 2A or FIG. 2B or by the number "1" shown in FIGS. 1A through 1H.

As is shown in FIG. 7, the system includes a carrier vehicle 720 (e.g., a tractor-trailer) traveling on a road 702 among traffic. A ramp 723 or other feature is extended from the carrier vehicle 720 to the road 702, and ends at a sufficiently low distance above the road 702. A plurality of autonomous ground vehicles 750-1, 750-2, 750-3 are also shown as having traveled on the road 702. Each of the autonomous ground vehicles 750-1, 750-2, 750-3 may enter or depart from a storage compartment or other area of the carrier vehicle 720, by autonomously aligning with a rear door of the carrier vehicle 720, and ultimately exceeding or falling below the velocity of the carrier vehicle 720, or otherwise establishing a positive or a negative relative velocity with respect to the carrier vehicle 720, until the autonomous ground vehicles 750-1, 750-2, 750-3 travel up the ramp 723 and entering the carrier vehicle 720, or roll off the ramp 723 and depart from the carrier vehicle 720. Within the carrier vehicle 720, any number of maintenance or servicing operations may be conducted on any of the autonomous ground vehicles 750-1, 750-2, 750-3, including but not limited to restocking or replacing inventory, recharging any power modules, repairing any damage, or like operations. Subsequently, the carrier vehicle 720 may retrieve or deposit one or more of the autonomous ground vehicles 750-1, 750-2, 750-3 at any other locations, including locations where demand for items stored therein is known, observed or predicted, or where the acquisition of any items, waste products generated by such items, or remnants or scraps of such items may be desired.

As is discussed above, items or materials may be autonomously transferred by or between one or more autonomous vehicles, when such vehicles are collaborating on the performance of one or more tasks or the execution of one or more functions. For example, when one or more items or materials are to be delivered to a customer or another destination, a first autonomous vehicle carrying the items or materials may travel to a rendezvous point and meet a second autonomous vehicle there. The items or materials may be transferred from the first autonomous vehicle to the second autonomous vehicle at the rendezvous point, and the second autonomous vehicle may continue to deliver the items or materials to the customer or the predetermined destination. Alternatively, where an item is to be generated from one or more materials according to multiple steps of a manufacturing or production process, a first autonomous vehicle that is equipped with tooling equipment or other components for executing some of the steps of the manufacturing or production process may execute such steps prior to transferring the item or materials in a partially completed state to a second autonomous vehicle that is configured to execute other steps and to complete the manufacturing or production process. The second autonomous vehicle may then complete the manufacturing or production process while en route to a customer or destination for the manufactured item, and deliver the item when the manufacturing or production process is complete. Any number of autonomous vehicles may collaborate with any number of other autonomous vehicles when performing any task or executing any function in accordance with the present disclosure.

One example of a transfer of items or materials from one autonomous vehicle to another autonomous vehicle is shown in FIGS. 8A through 8F. Referring to FIGS. 8A through 8F, aspects of one system 800 for distributing or receiving inventory or materials using autonomous vehicles in accordance with embodiments of the present disclosure are shown. Except where otherwise noted, reference numerals preceded by the number "8" in FIGS. 8A through 8F refer to elements that are similar to elements having reference numerals preceded by the number "7" in FIG. 7, by the number "6" in FIG. 6, by the number "5" in FIGS. 5A through 5H, by the number "4" in FIG. 4, by the number "2" in FIG. 2A or FIG. 2B or by the number "1" shown in FIGS. 1A through 1H.

Figure 8A:
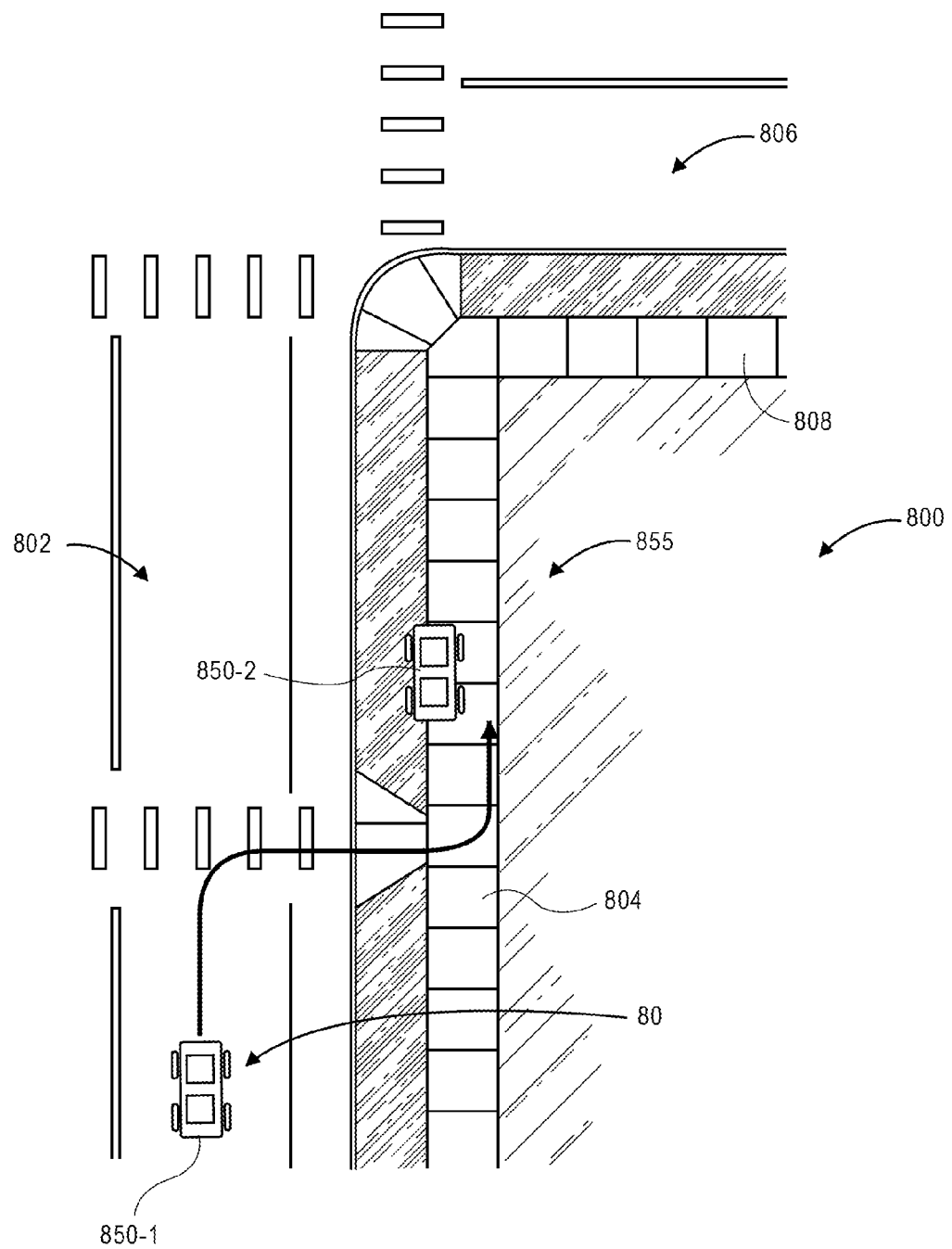
FIGS. 8A through 8F are views of aspects of one system for distributing or receiving inventory or materials using autonomous vehicles in accordance with embodiments of the present disclosure.
Figure 8B:
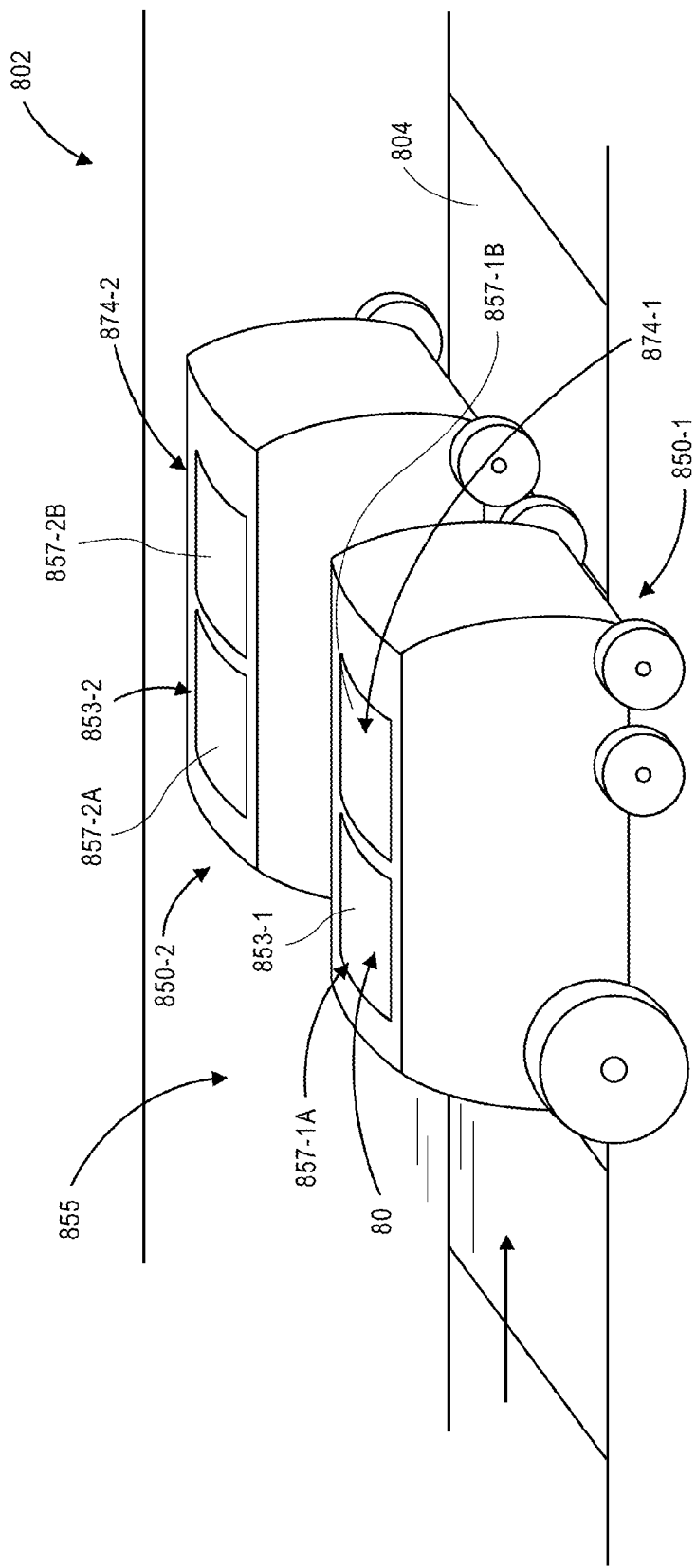

As is shown in FIG. 8A, a system includes a pair of intersecting streets 802, 806 that are lined by sidewalks 804, 808, respectively. An autonomous vehicle 850-1 carrying an item 80 travels along the road 802 and the sidewalk 804 to approach an autonomous vehicle 850-2 that is parked alongside the sidewalk 804 at a rendezvous point 855. As is shown in FIG. 8B, each of the autonomous vehicles 850-1, 850-2 includes a storage compartment 853-1, 853-2 having a door 857-1A, 857-2A (or hatch, or like covering) 857-1A, 857-2A that may be opened or secured in a closed condition. Each of the autonomous vehicles 850-1, 850-2 also includes an item engagement system 874-1, 874-2 having a robotic arm or other like element for engaging items or materials, as desired. The item engagement systems 874-1, 874-2 also feature doors 857-1B, 857-2B that may be opened or closed, as necessary, in order to interact with one or more items or materials. As is shown in FIG. 8B, the item 80 is within the storage compartment 853-1 of the autonomous vehicle 850-1, with the door 857-1A closed.

Figure 8C:
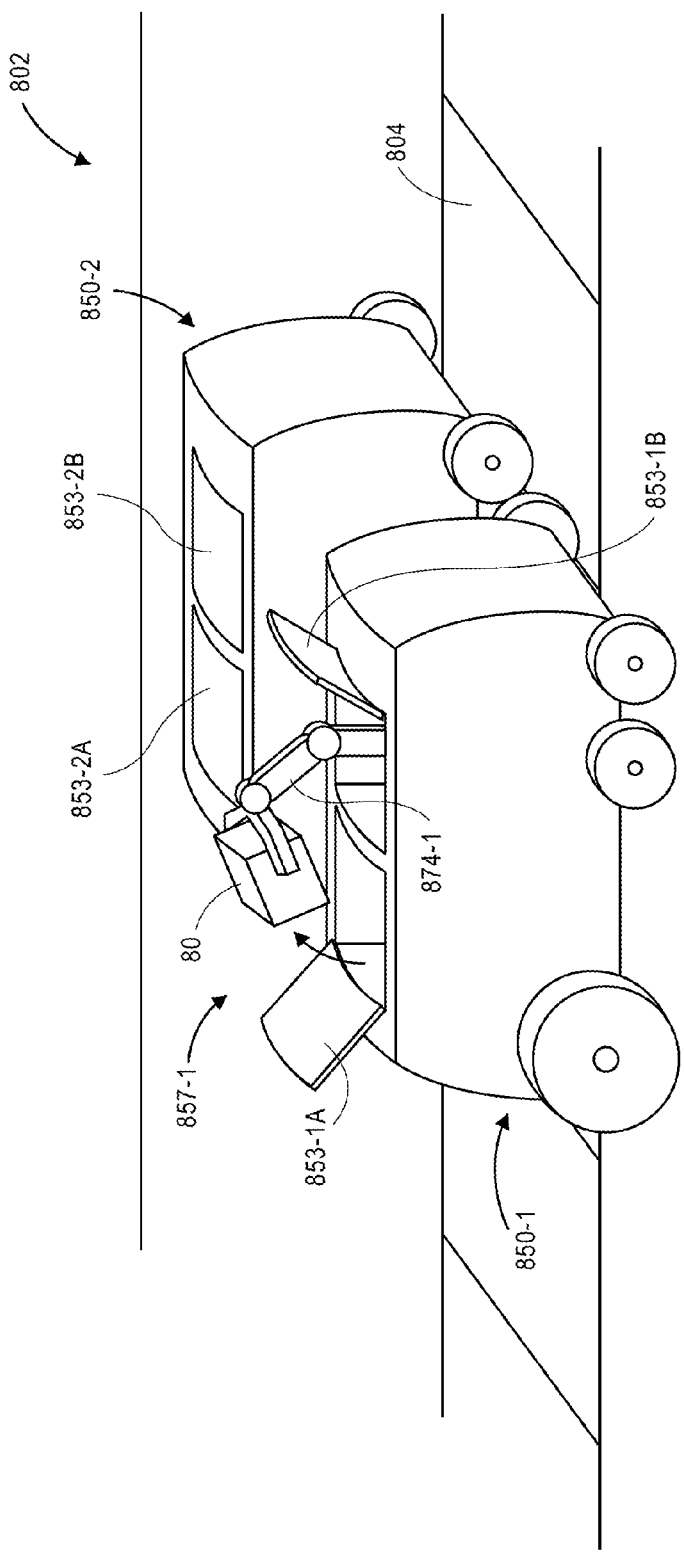
Figure 8D:
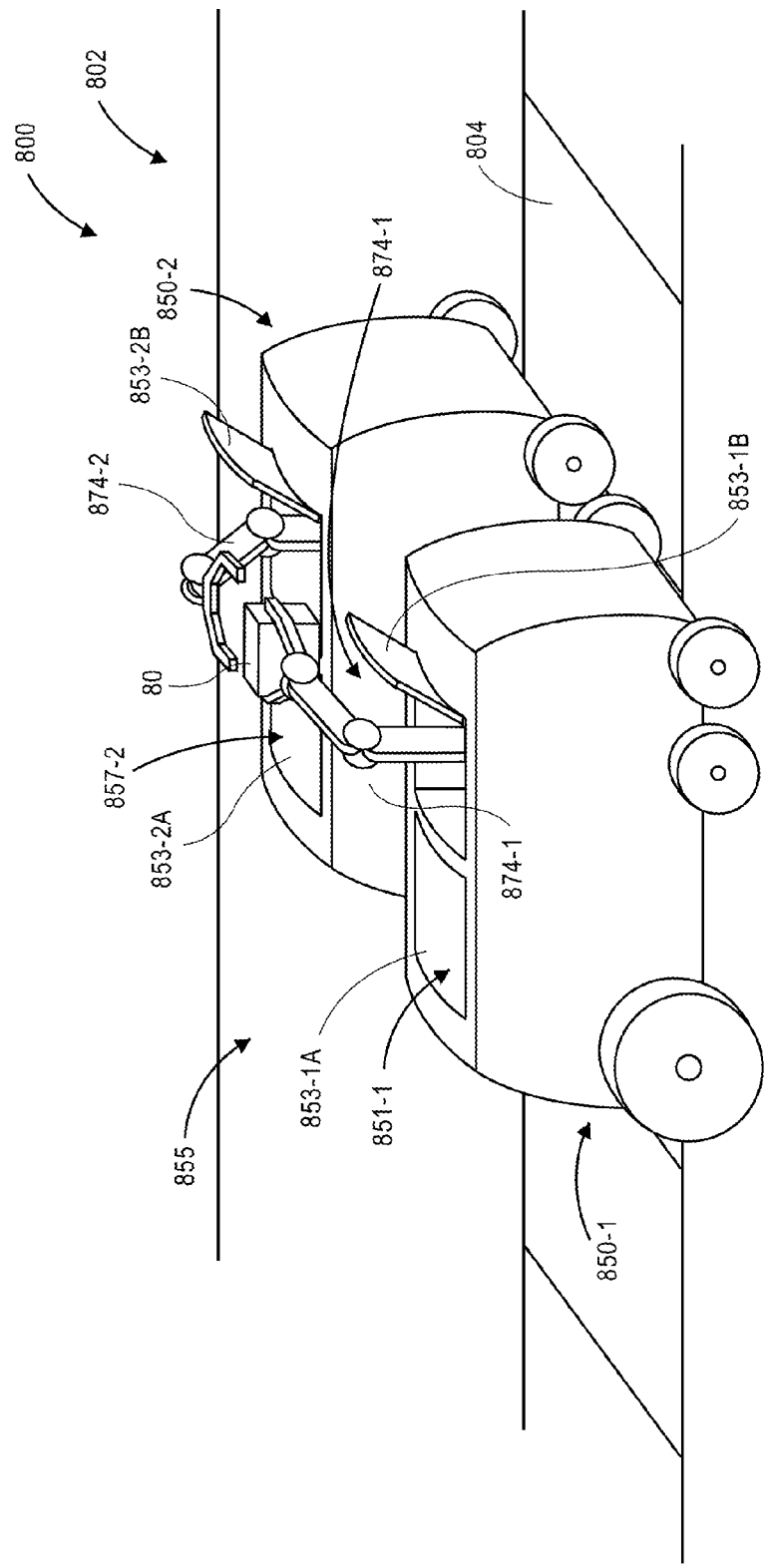

As is discussed above, items and/or materials may be transferred between autonomous vehicles or humans, machines or other vehicles, as necessary, in order to perform any task or execute any function. As is shown in FIG. 8C, the doors 853-1A, 853-1B of the autonomous vehicle 850-1, thereby enabling the item engagement system 874-1 to extend into the storage compartment 853-1 and access the item 80 therein. As is shown in FIG. 8D, after the item 80 has been removed from the storage compartment 853-1, the door 857-1A may close, and the door 857-2B of the autonomous vehicle 850-2 may open, to enable the item engagement 874-2 to extend therefrom and retrieve the item 80 from the item engagement system 874-1.

Figure 8E:
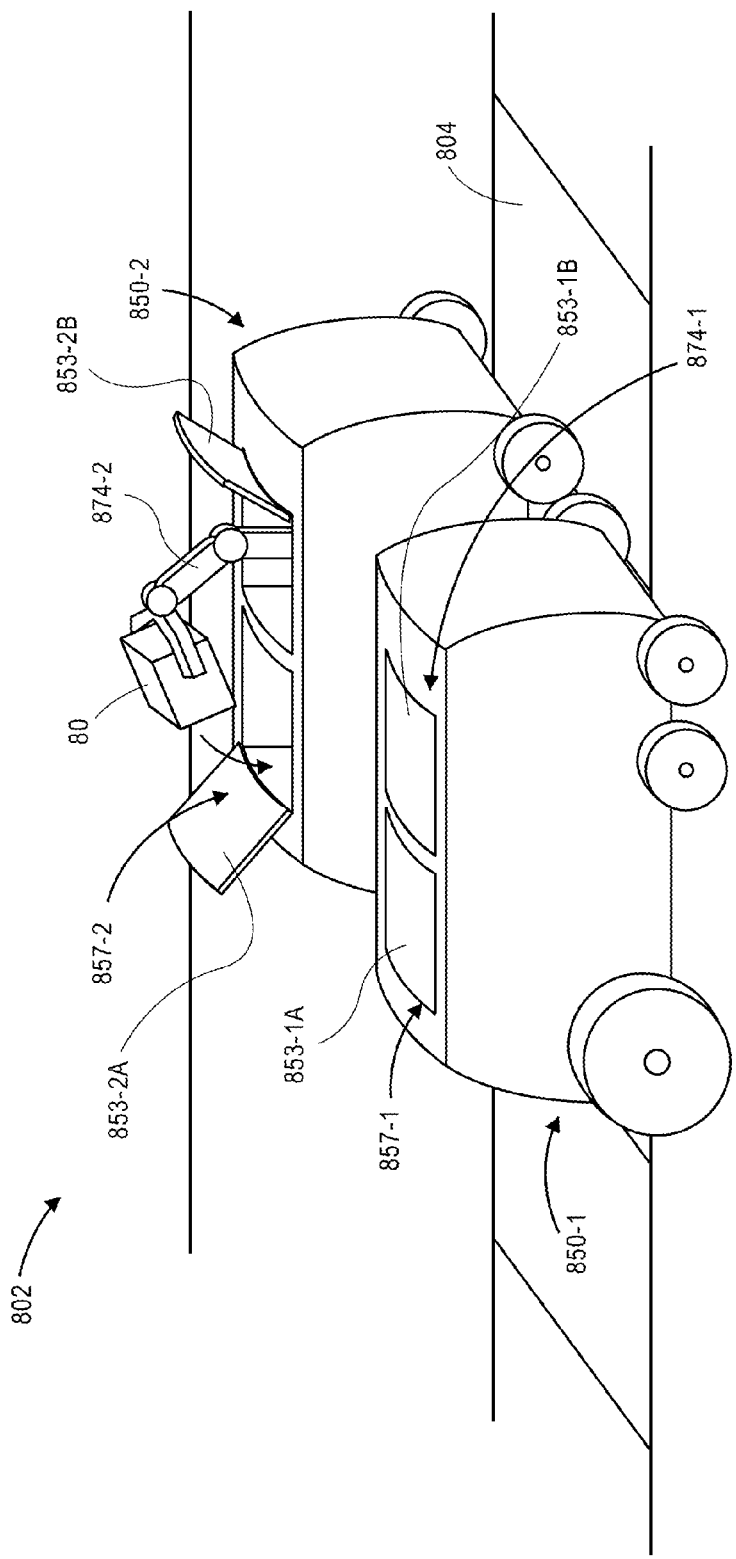
Figure 8F:
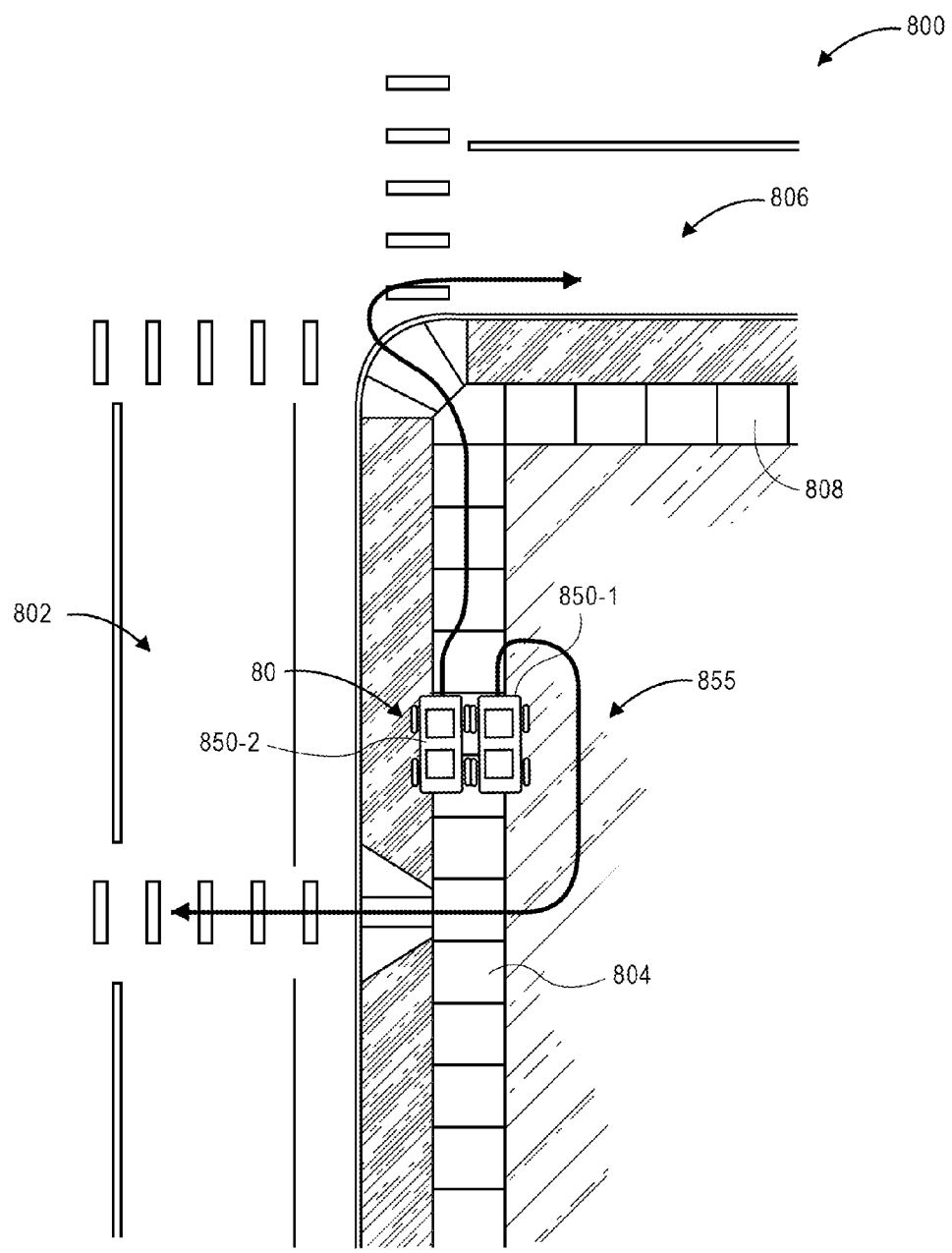

As is shown in FIG. 8E, after the item 80 has been retrieved by the item engagement system 874-2, the item engagement 874-1 may retract into the autonomous vehicle 850-1, and the door 857-1B may close. The door 857-2A may then open, thereby enabling the item engagement system 874-2 to deposit the item 80 in the storage compartment 853-2 of the autonomous vehicle 850-2. As is shown in FIG. 8F, after the item 80 has been secured within the storage compartment 853-2, the autonomous vehicle 850-2 may then depart from the rendezvous point 855 and proceed on to deliver the item 80 to a customer, to another destination, or to another vehicle (e.g., another autonomous vehicle). The autonomous vehicle 850-1 may then also depart from the rendezvous point 855 to perform another task or execute another function, such as to deliver another item or materials to a customer, another destination or another vehicle (e.g., another autonomous vehicle), or to receive another item or materials from a fulfillment center, a carrier vehicle or another vehicle (e.g., another autonomous vehicle).

Figure 9:
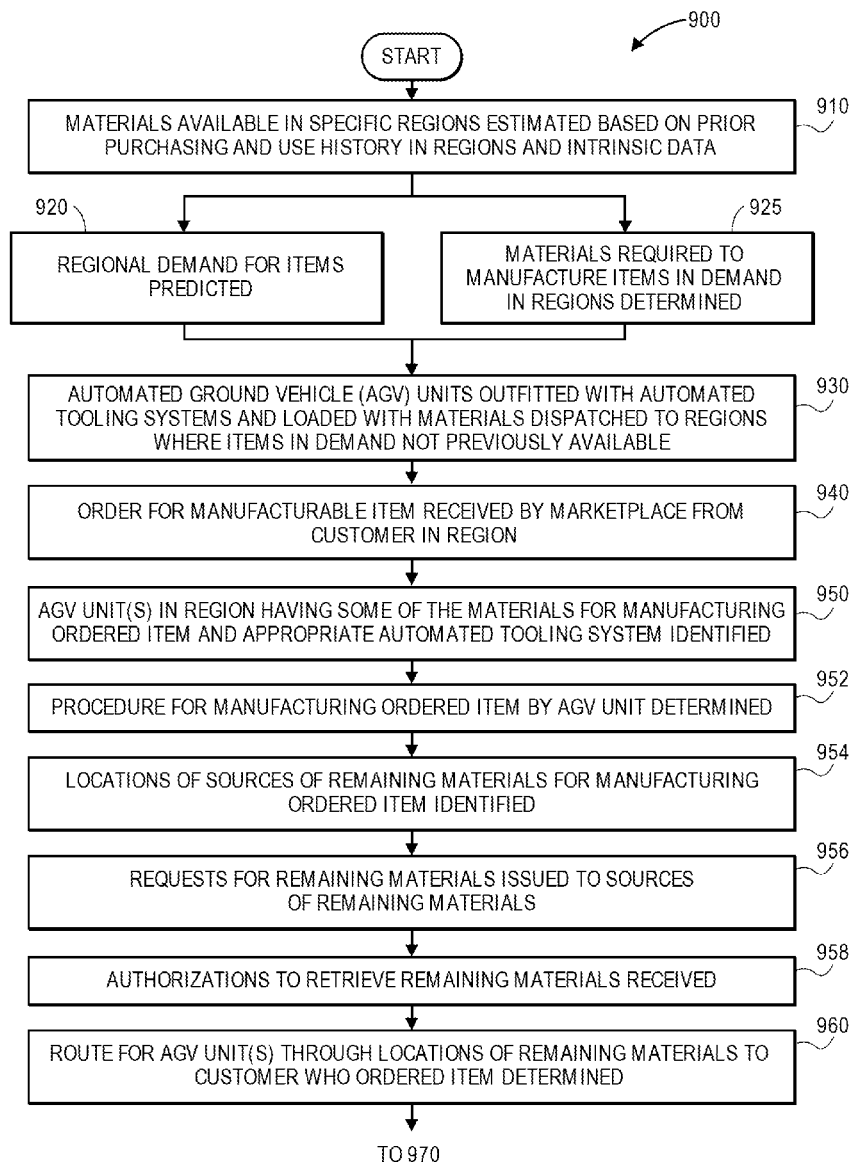
FIG. 9 is a flow chart of one process for distributing or retrieving inventory or materials using autonomous vehicles in accordance with embodiments of the present disclosure.
Figure 9:
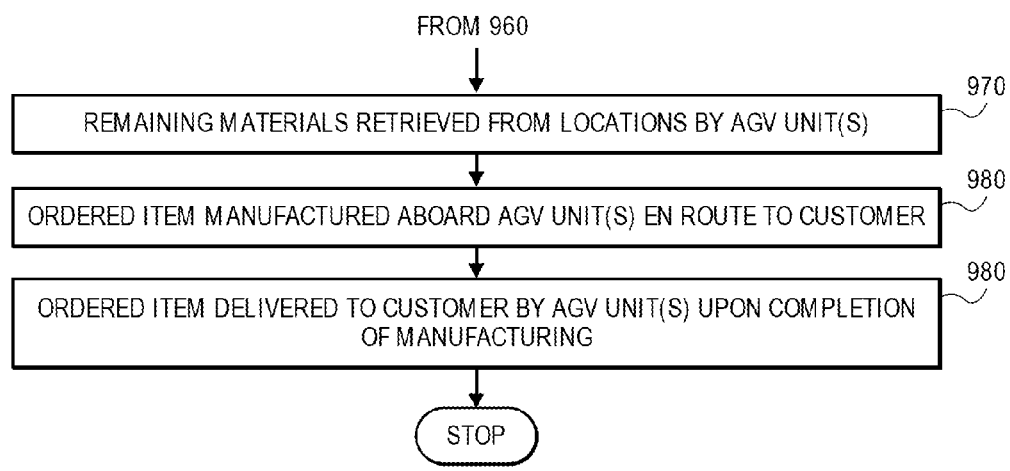

Some embodiments of the autonomous ground vehicles and carrier vehicles of the present disclosure, such as the autonomous ground vehicle 450 of FIG. 4, the carrier vehicles 620, 720 of FIGS. 6 and 7, or the autonomous ground vehicles 850-1, 850-2 of FIGS. 8A through 8F may be used to retrieve materials from locations, to manufacture or produce items from such materials and from any stock materials that may be carried aboard the autonomous ground vehicles, or to transfer items or materials between autonomous ground vehicles and/or carrier vehicles, before delivering items to a customer or a designated location. Referring to FIG. 9, a flow chart 900 of one process for distributing or retrieving inventory or materials using autonomous vehicles in accordance with embodiments of the present disclosure is shown.

At box 910, materials that are available in one or more specific regions may be estimated based on prior purchasing and use histories in the regions or, alternatively, on any other factors, such as extrinsic data. The number and type of materials that are available may be estimated on any basis. For example, where it is known that customers in a region purchased seasonal plants in plastic pots, cases of soda in aluminum cans, or any other items packed in corrugated cardboard boxes with paper dunnage, the amount of recyclable plastic, aluminum, cardboard or paper that is expected to be available in the area may be predicted based on the number and size of the plant pots, the number of soda cans, the number and size of the cardboard boxes and the volume of paper dunnage. Similarly, where it is known that customers in a given area have purchased a number of mattresses, it may be expected that such customers will need to discard their existing mattresses, which are likely of the same sizes as the mattresses that were purchased. Therefore, a number of mattresses and/or box springs, and, therefore, amounts of steel (e.g., from springs), foam (e.g., from padding), wood (e.g., from box springs) or textiles (e.g., from mattress surfaces) that may be available in the area may be estimated accordingly. Alternatively, available materials in a given area may be determined based on information or data obtained from any source. For example, postings to auction sites or online marketplaces by sellers in the area may be consulted to identify items that are available for purchase in a given area, and information or data regarding the ingredients or contents of such items may be determined from one or more electronic sources to estimate the items or materials that may be available in the area, and at what cost. Moreover, weather reports, construction reports, sales circulars, or any other available sources of information or data regarding the availability of items within the area may also be consulted to identify items, materials or costs thereof.

At box 920, regional demand for items is predicted for any number of other regions. For example, as is discussed above with regard to the flow chart 300 of FIG. 3, regional demands for items may be determined based on prior purchasing histories, demographics, attributes of the items, upcoming events, attitudes or mores, postings or comments made to social networks, online marketplaces or other networked sites, or based on any other available information or data. In parallel, and at box 925, materials that are required to manufacture or produce one or more items that are in demand in the respective regions are determined. For example, procedures for manufacturing or producing one or more items, and the ingredients or components required to manufacture or produce such items, may be determined by resort to one or more electronic sources of information or data, along with any specific resources (e.g., power, fuel, equipment or operating conditions) that may be required to manufacture or produce the items.

At box 930, autonomous ground vehicles that are outfitted with automated fabricator systems and loaded with materials are dispatched to one or more regions where items that are in demand are not presently available there. The autonomous ground vehicles may be equipped with any number or type of stock materials, and programmed with instructions for manufacturing such items from specific materials that are available in a region and/or stock materials using automated fabricator systems (e.g., 3D printers) and one or more tooling systems operating aboard the autonomous ground vehicles. The autonomous ground vehicles may report their inventory levels, material levels and/or locations, e.g., as determined by GPS or other positioning systems, to an online marketplace, a fulfillment center, a carrier vehicle, a vehicle monitoring system, one or more other autonomous ground vehicles, or to any other stationary or mobile computer system or resource while the autonomous ground vehicles are in operation.

At box 940, an order for the purchase of a manufacturable item is received by a marketplace from a customer within the region, and at box 950, one or more autonomous ground vehicle units in the region having some of the materials for manufacturing the ordered item and an appropriate fabricator unit for manufacturing the ordered item is identified. A computer system or resource operated by or in association with the marketplace may receive the order and identify the customer and/or a designated destination for the item, before identifying the autonomous ground vehicles in the vicinity of the customer or the designated destination and their respective operational capacities before selecting one or more preferred or optimal autonomous ground vehicles for manufacturing and delivering the ordered item. Such vehicles may be selected on any basis or based on any factors, including but not limited to information or data regarding aspects of traditional transportation infrastructure within the region, e.g., locations and dimensions or other attributes of roads, sidewalks, crosswalks, bicycle or walking paths, bridges or trails, or non-traditional transportation infrastructure, e.g., locations and dimensions of parks, fields, forests, lots, clearings or other spaces, as well as intrinsic or extrinsic information or data regarding the available autonomous vehicles, including but not limited to dimensions or capacities of such vehicles (e.g., heights, lengths, widths, power levels, speeds, ranges or carrying volumes or weight limits), locations of the autonomous vehicles, or environmental conditions (e.g., prevailing traffic or weather) in the region, or others.

At box 952, a procedure for manufacturing the ordered item by the one or more autonomous ground vehicles selected at box 950 is determined, and at box 954, the locations of any remaining materials that are required to manufacture the ordered item and are not then available aboard a selected autonomous ground vehicle, or two or more of such vehicles, are determined. The procedure for manufacturing the ordered item may be stored on one or more data stores onboard an autonomous ground vehicle or, alternatively, downloaded to the autonomous ground vehicle over a network connection. The locations of the remaining materials may be determined based on the estimates determined at box 910, or based on any additional information or data that may be subsequently obtained. Moreover, the task of fulfilling the order may be assigned to a single autonomous vehicle that is configured or equipped to execute each of the steps of the procedure for manufacturing the ordered item or, alternatively, to two or more autonomous vehicles, each of which may be configured or equipped to execute one or more of the steps of the procedure.

At box 956, requests for one or more of the remaining materials that are required to manufacture the ordered item are issued to one or more customers who are in possession of the materials. For example, one or more electronic communications (e.g., electronic mail messages, SMS or MMS text messages, social network messages, online marketplace messages, telephone calls or the like) may be transmitted to a customer, identifying one or more items or materials that are believed to be in the customer's possession or otherwise accessible to the customer. Such communications may indicate an intent to acquire such items or materials, which may be in a raw or processed form, and may include an offer to purchase such items in exchange for cash, credit for future purchases, or any other consideration. At box 958, authorizations to retrieve the remaining materials are received, e.g., from customers or other sources in possession of the items. Such authorizations may include acceptances of offers for purchase, invitations to retrieve the items or materials, or any other indications.

At box 960, a route for one or more selected autonomous ground vehicles from their current locations to a location of the customer who ordered the item, via the locations of the remaining materials, is determined. The route may be determined based on any factor or element, including but not limited to the time required to manufacture the ordered item using the materials that are then located aboard the selected autonomous ground vehicles and any of the remaining materials, as well as the procedure required to manufacture the ordered item from such materials and a sequence in which such materials will be utilized. In some embodiments, the route may be selected according to one or more traditional shortest path or shortest route algorithms such as Dijkstra's Algorithm, Bellman-Ford Algorithm, Floyd-Warshall Algorithm, Johnson's Algorithm or a hub labeling technique, any of which may take into consideration the times required in order to execute each of the steps of the procedure by each of the selected autonomous vehicles.

At box 970, the remaining materials are retrieved from their respective locations while one or more of the selected autonomous ground vehicles are en route to the location of the customer, and at box 980, the ordered item is manufactured aboard the autonomous ground vehicles. In accordance with some embodiments, one or more autonomous ground vehicles may manufacture the ordered items while such vehicles are in motion. Alternatively, and where necessary, one or more of the autonomous ground vehicles may stop in any secure or low-traffic locations while preparing the ordered item, in order to conserve power or other resources, to recharge power supplies, to obtain any additional materials that may be required, to wait until one or more steps of the manufacturing procedure are complete, or for any other reason. At box 990, when the manufacturing of the ordered item is complete, the ordered item is delivered to the customer, and the process ends.

Figure 10A:
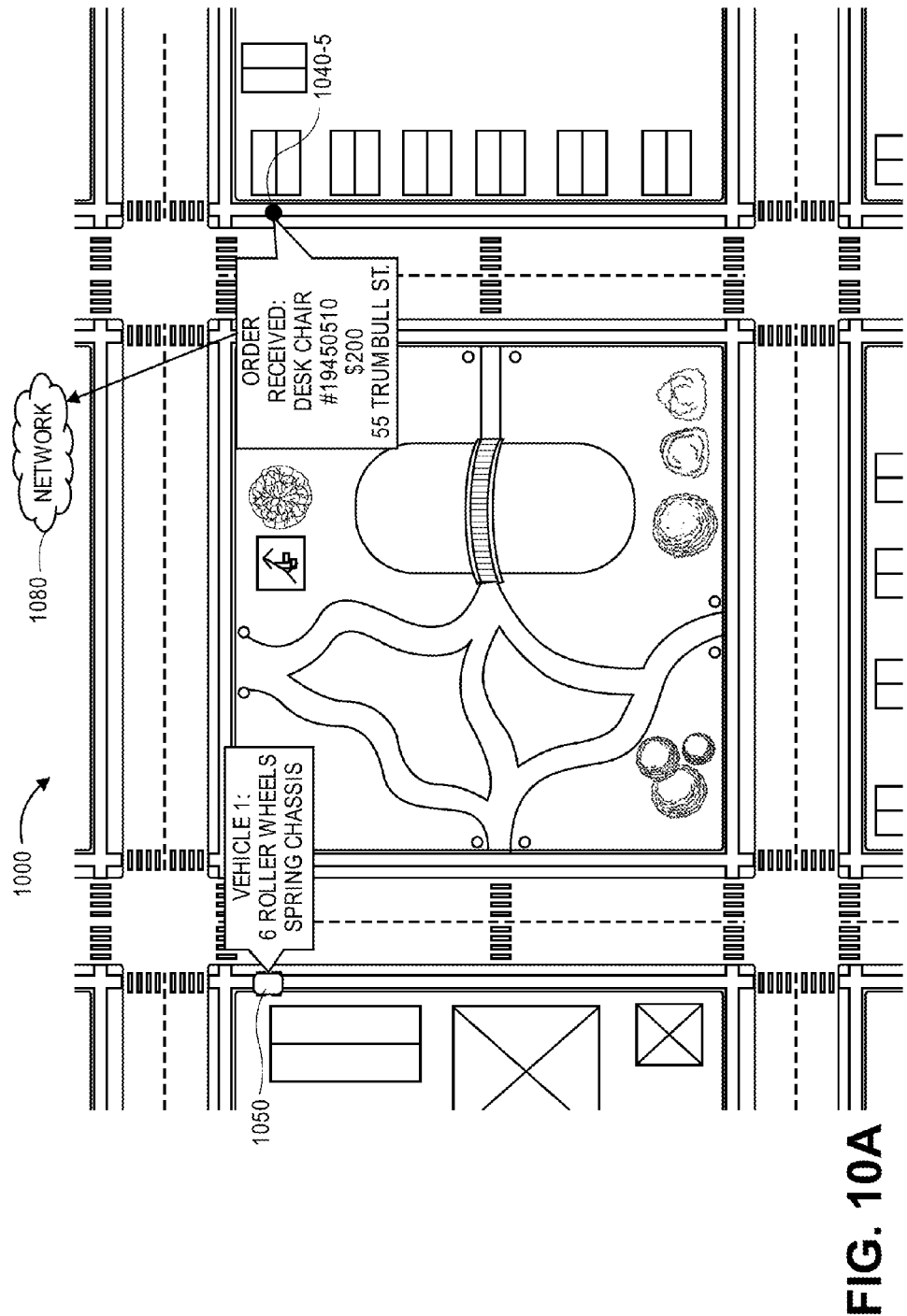
FIGS. 10A, 10B and 10C are views of aspects of one system for distributing or retrieving inventory or materials using autonomous vehicles in accordance with embodiments of the present disclosure.
Figure 10B:
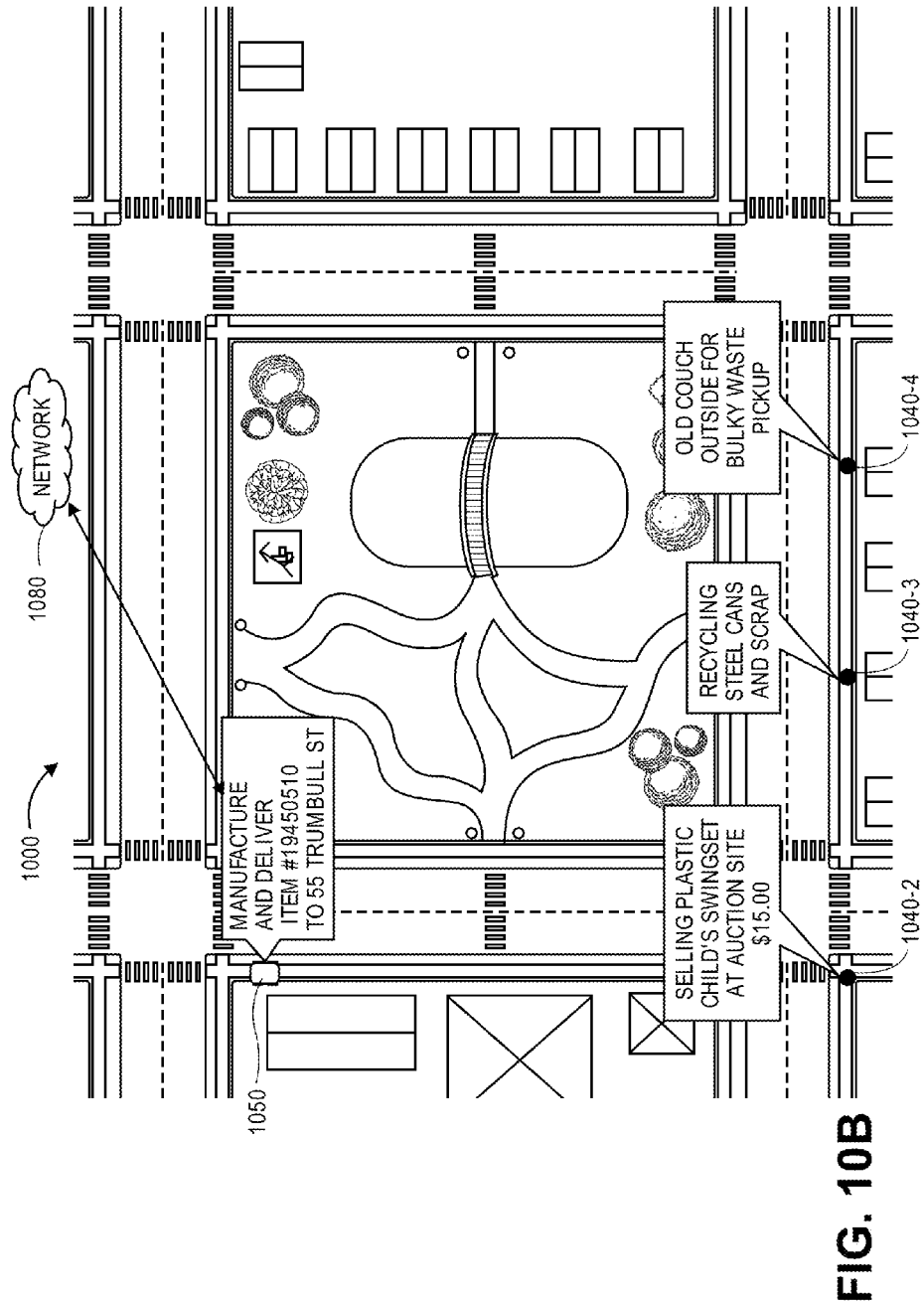
Figure 10C:
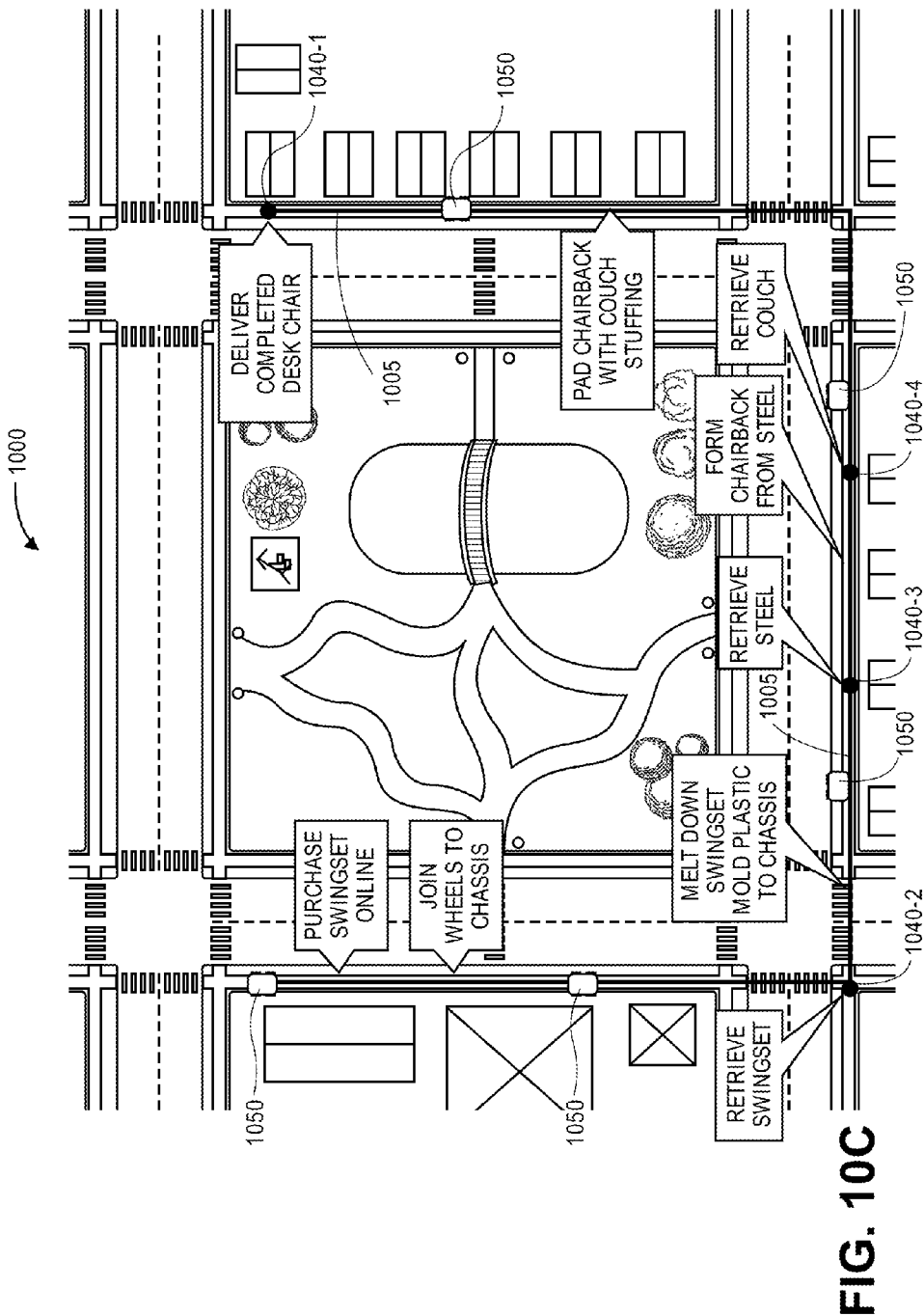

One example of the retrieval of items and/or materials by an autonomous ground vehicle and the manufacture of an ordered item using such materials is shown in FIGS. 10A through 10C. Referring to FIGS. 10A through 10C, views of aspects of one system 1000 for distributing or retrieving inventory or materials using autonomous vehicles in accordance with embodiments of the present disclosure is shown. Except where otherwise noted, reference numerals preceded by the number "10" in FIGS. 10A through 10C refer to elements that are similar to elements having reference numerals preceded by the number "8" in FIGS. 8A through 8F, by the number "7" in FIG. 7, by the number "6" in FIG. 6, by the number "5" in FIGS. 5A through 5H, by the number "4" in FIG. 4, by the number "2" in FIG. 2A or FIG. 2B or by the number "1" shown in FIGS. 1A through 1H.

As is shown in FIG. 10A, an order for the purchase and delivery of an item (viz., a desk chair) is received by an online marketplace (not shown) from a customer 1040-1 in a region 1045 over a network 1080. The customer 1040-1 may access a network site or dedicated shopping application associated with the marketplace, or communicate with the marketplace in any way, to review and evaluate one or more items for purchase and to place the order for the desk chair. As is shown in FIG. 10A, the order identifies the item by name and an identifier, as well as a price paid by the customer 1040-1 for the desk chair, and a destination to which the desk chair is to be delivered. An autonomous ground vehicle 1050 is located in the region 1045 at the time that the order is received, and is carrying one half-dozen roller wheels and a spring chassis, e.g., in one or more storage compartments aboard the autonomous ground vehicle 1050.

As is shown in FIG. 10B, an instruction to manufacture the ordered item, and to deliver the ordered item to the customer 1040-1, is provided to the autonomous ground vehicle 1050, along with information or data regarding the availability of items and/or materials within the region 1045 that may be used by the autonomous ground vehicle 1050 to manufacture the ordered item. For example, as is shown in FIG. 10B, identities and locations of a customer 1040-2 who is offering a plastic child's swingset for sale at an auction site, a customer 1040-3 who is planning to recycle steel cans and scraps, and a customer 1040-4 who is placing an old couch outside for a bulky waste pickup are obtained by the autonomous ground vehicle 1050, or otherwise provided to the autonomous ground vehicle 1050, e.g., via one or more network connections to the Internet according to any protocol, as well as one or more RF waves or signals, one or more NFC signals, one or more Bluetooth® signals, or any other type of wireless signals. The autonomous ground vehicle 1050 may also receive or obtain one or more instructions for manufacturing the ordered item from the materials.

In some embodiments, the autonomous ground vehicle 1050 may generate an optimal path 1005 for traveling from its original location to the locations of the customers 1040-1, 1040-2, 1040-3, 1040-4, and define a procedure for retrieving items and/or materials from such locations, for manufacturing the ordered item in accordance with a predetermined set of instructions while the autonomous ground vehicle 1050 is en route to the customer 1040-1, and for delivering the item to the customer 1040-1. As is shown in FIG. 10C, the autonomous ground vehicle 1050 purchases the plastic swingset that was offered for sale by the customer 1040-2, e.g., from the auction site over the Internet, and arranges to retrieve the swingset from the customer 1040-2. Additionally, while the autonomous ground vehicle 1050 is en route from its original location to the location of the customer 1040-1, the autonomous ground vehicle 1050 joins one or more of the roller wheels to the spring chassis that the autonomous ground vehicle 1050 has in stock, in accordance with directions for manufacturing the ordered item, using automated fabricators and/or tooling equipment, e.g., filaments, heads, blades, nozzles, motors, rollers, heat sources, radiation sources or other elements, that are located onboard the autonomous ground vehicle 1050.

After retrieving the plastic swingset from the customer 1040-2, the autonomous ground vehicle 1050 melts down the plastic swingset while continuing along the path 1005, and molds some or all of the plastic to the chassis while the autonomous ground vehicle 1050 is en route to the location of the customer 1040-3. Upon arriving at the location of the customer 1040-3, the autonomous ground vehicle 1050 retrieves the steel cans and other scrap from the customer 1040-3, and forms a chairback from the newly obtained steel, e.g., by bending, forging, melting, or shaping some or all of the steel into the chairback, and bolting or otherwise joining the chairback to the chassis, while continuing along the path 1005. Upon arriving at the location of the customer 1040-4, the autonomous ground vehicle 1050 retrieves the couch, and harvests stuffing and/or other textile materials from the couch, before proceeding along the path 1005 to the location of the customer 1040-1 and padding the chairback with stuffing or other materials that were obtained from the couch while en route. Upon arriving at the location of the customer 1040-1, the autonomous ground vehicle 1050 delivers the ordered item, viz., the completed desk chair, to the customer 1040-1. The autonomous ground vehicle 1050 may then execute any number of associated functions, including but not limited to reporting the manufacture of the ordered item and the delivery of the ordered item to the customer 1040-1, and reporting or updating levels of inventory in items and/or materials remaining onboard the autonomous ground vehicle 1050 after the delivery is complete. Additionally, the autonomous ground vehicle 1050 may then discard any unusable waste products, retrieve additional items or materials, execute any number of repair or maintenance evolutions, or proceed to a different location, such as a location of a fulfillment center, or another location where demand for one or more items carried aboard the autonomous ground vehicle 1050, or for items that may be manufactured by the autonomous ground vehicle 1050 using materials in its possession and/or around the region 1045, is known, observed or predicted.

As is discussed above, one or more of the steps of the procedure shown in FIG. 10C may be executed using multiple autonomous vehicles. For example, after the order is received from the customer 1040-1, a first autonomous vehicle may purchase the plastic swingset from the customer 1040-2, while a second autonomous vehicle (e.g., the autonomous ground vehicle 1050) may join the one or more roller wheels to the spring chassis before transferring the chassis and wheels to a third autonomous vehicle that may retrieve the purchased swingset, melt down the plastic, and mold the plastic to the chassis. The third autonomous vehicle may then transfer the molded plastic chassis and wheels to a fourth autonomous vehicle that may obtain the steel cans and scrap, shape the metal from the cans and scrap into the chairback, and bolt or join the chairback to the chassis. The fourth autonomous vehicle may then transfer the chairback and chassis unit to a fifth autonomous vehicle that may process the couch to harvest the stuffing and textile materials therefrom, and to pad the chairback with the stuffing and materials. The fifth autonomous vehicle may then transfer the completed desk chair to a sixth autonomous vehicle for delivery to the customer 1040-1. Any number of autonomous vehicles may perform any number of the steps associated with fulfilling the order of the desk chair on behalf of the customer 1040-1 in accordance with the present disclosure.

The capacity to obtain items or materials remotely using one or more autonomous vehicles of the present disclosure, or to manufacture or produce items from such materials aboard one or more of such vehicles, may greatly simplify any number of commercial processes by which items may be delivered to customers, or to destinations specified by customers. In some embodiments, autonomous vehicles of the present disclosure may aid in the distribution of items having high sales velocities or short shelf lives or periods of relevance. For example, in a region where blueberries have a short growing season, autonomous vehicles may be utilized to distribute or forward-deploy bushels of blueberries in cardboard or plastic containers and to deliver such containers to regions where blueberries are in demand. After the blueberries have been sold, autonomous vehicles may also be utilized to accelerate the processes by which blueberries are sold to customers, by retrieving the plastic containers from customers who previously purchased blueberries at a later time, such as after the shelf lives or expiration times of the blueberries (e.g., typically two to three days for blueberries maintained at room temperature, or five to ten days for blueberries maintained under refrigeration), and returning such containers to a farm from which the blueberries were harvested, so that such containers may be washed and refilled with fresh blueberries. The containers may then be loaded onto the autonomous vehicles and distributed or forward-deployed to regions where blueberries remain in demand. Alternatively, an autonomous vehicle may be utilized to identify locations where cardboard and/or plastic materials are prevalent, e.g., recycling stations or the like, and to produce cardboard or plastic containers from such materials, and to deliver such containers to the farm, where such containers may be filled, loaded onto the autonomous vehicle, and distributed or forward-deployed to regions where blueberries remain in demand.

Figure 11:
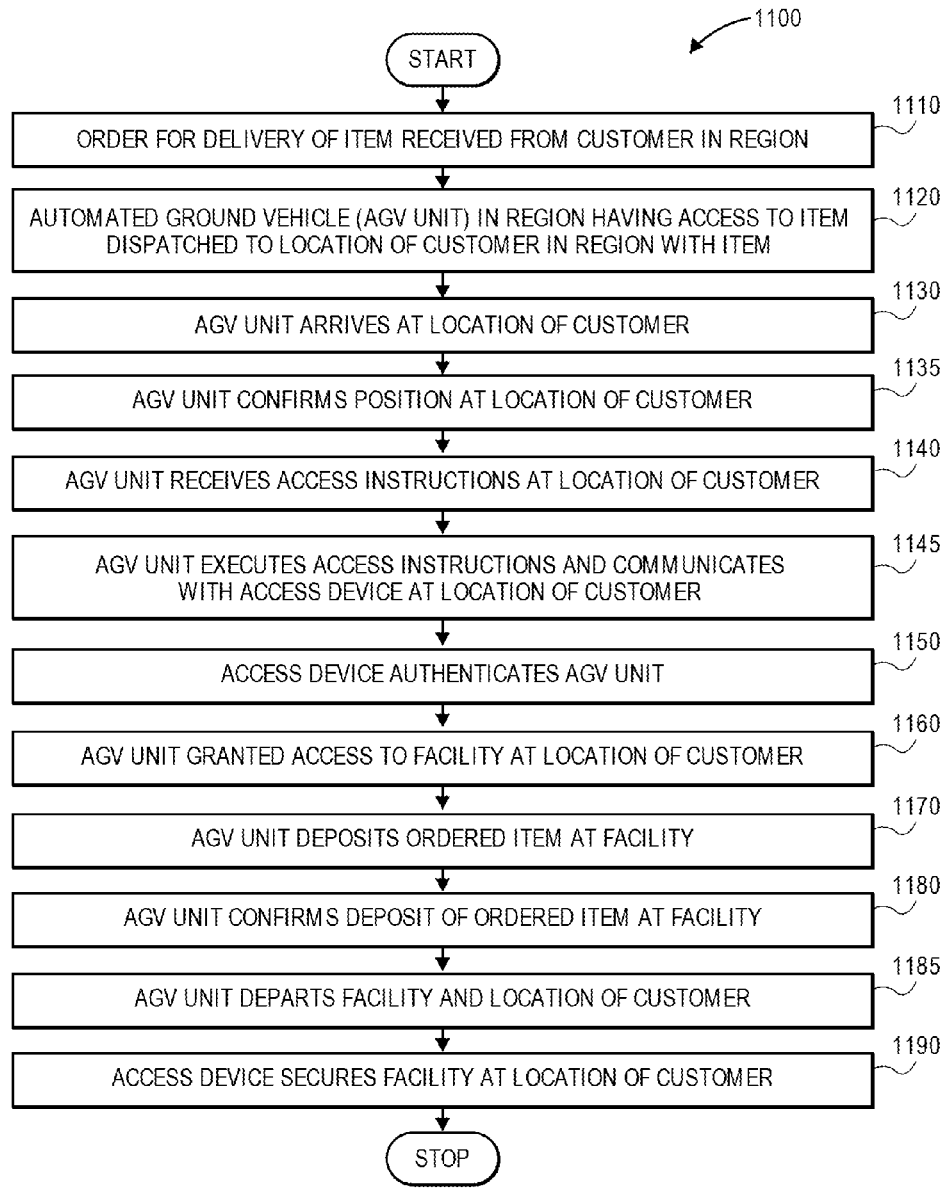
FIG. 11 is a flow chart of one process for distributing or retrieving inventory or materials using autonomous vehicles in accordance with embodiments of the present disclosure.

Some embodiments of the autonomous ground vehicles of the present disclosure may also be configured to automatically access one or more structures or enclosures such as dwellings, office buildings, garages or other like structures, in order to deliver one or more items to customers or other recipients, or to retrieve items or materials therefrom. Referring to FIG. 11, a flow chart 1100 of one process for distributing or retrieving inventory or materials using autonomous vehicles in accordance with embodiments of the present disclosure is shown.

At box 1110, an order for the delivery of an item is received from a customer residing in a given region. The order may be received via a network site or a dedicated shopping application associated with an online marketplace or in any other manner, e.g., by telephone or in person. At box 1120, an autonomous ground vehicle unit in the region having access to the item ordered by the customer is dispatched with the item to the location of the customer. For example, an autonomous ground vehicle may be identified based on one or more records of the positions of autonomous ground vehicles, or the inventory stored thereon, and determine which of a fleet of such vehicles is best suited to deliver the ordered item to the customer. Alternatively, a fulfillment center or other source of items within or near the region may load the ordered item onto an autonomous ground vehicle and instruct the autonomous ground vehicle, or two or more autonomous ground vehicles, to deliver the ordered item to the customer.

At box 1130, the autonomous ground vehicle unit arrives at the location of the customer, and at box 1135, the autonomous ground vehicle unit confirms its position at the location of the customer. For example, referring again to FIG. 4, the autonomous ground vehicle 450 may receive and interpret GPS signals using the GPS receiver 462-2, determine a position based on the interpreted GPS signals, and report its position to an online marketplace, a fulfillment center, a vehicle monitoring system, or any other computer device or resource associated with the fulfillment of the order placed by the customer.

At box 1140, after confirming its position at the location of the customer, the autonomous ground vehicle unit receives instructions for accessing the location of the customer, and at box 1145, the autonomous ground vehicle unit executes the instructions and communicates with an access device at the location of the customer. For example, the instructions may call for the transmission of one or more signals including electronic data by an autonomous ground vehicle to one or more wirelessly activated systems within one or more structures at the location. In some embodiments, such systems may include wireless door openers (e.g., standard doors equipped with keyless access systems, as well as garage doors, pet doors or other access doors), wireless doorbells, or any other systems (e.g., feedback devices of any kind). In other embodiments, the instructions may call for the transmission of one or more electronic messages to one or more systems within a structure at the location of the customer, or to a computer device or resource associated with the customer or the location. For example, the instructions may require an autonomous ground vehicle to transmit an electronic message (e.g., electronic mail messages, SMS or MIMS text messages, social network messages, online marketplace messages, telephone calls or the like) to an access device such as a security system at the location, or to a computer device or resource associated with the customer, a resident at the location, or any other authorized personnel, e.g., a smartphone, a tablet, a laptop, a desktop or other computer device or resource. Signals or messages may be transmitted by an autonomous ground vehicle to one or more systems over any communications network and in accordance with any protocol, including but not limited to WiFi or any radio frequency waves or signals, at any frequencies or power levels, such as RFID signals, NFC signals, Bluetooth® signals, or any other type of wireless signals.

At box 1150, the access device authenticates the autonomous ground vehicle unit, and at box 1160, the autonomous ground vehicle unit is granted access to one or more facilities at the location of the customer. For example, in response to the execution of the instructions, the access device may automatically confirm that the autonomous ground vehicle unit is authorized to access the facility at the location, which may be a dwelling, an office building, a garage or another like structure, and may open, or permit the authorized unit to open, one or more doors, access ports or other entryways at the facility. Such doors, ports, or entryways may include, but are not limited to, one or more garage doors, pet doors, or the like. Alternatively, in some embodiments, the facility to which the autonomous ground vehicle unit is granted access may be a car, a truck, a trailer, a ship, an aerial vehicle or any other type or form of vehicle, and access may be granted by causing a door, a trunk, a hood, a sunroof, a window or another entry point to automatically open in response to the execution of the access instructions and the authentication of the autonomous ground vehicle unit. In such embodiments, the access device may be or comprise all or a portion of an automobile security system, or like system for securing or monitoring access to one or more other vehicles. Additionally, in some other embodiments, the facility may be or include an unbounded porch, portico, set of steps or other area, and the access granted may be a temporary right to access the area to deposit the item. In still other embodiments, the access device may be a wireless doorbell or other device for providing feedback to one or more personnel within the facility, in the form of audio, visual (e.g., lights), haptic or other feedback, thereby informing such personnel that the autonomous ground vehicle unit has arrived, and inviting such personnel to exit the facility and receive the ordered item.

At box 1170, the autonomous ground vehicle unit deposits the ordered item at the facility, and at box 1180, the autonomous ground vehicle unit confirms the deposit of the ordered item at the facility. For example, one or more item engagement systems or devices, e.g., a robotic arm, of an autonomous ground vehicle may retrieve the ordered the item from a storage compartment, and deposit the ordered item in a predetermined location at the facility. Alternatively, the customer or a designated representative may access the cargo bay or other storage compartment upon the selected vehicle's arrival, and manually retrieve the ordered item therefrom. An ordered item may be removed from the autonomous ground vehicle and deposited at the facility in any manner in accordance with the present disclosure. Moreover, upon depositing the ordered item at the facility, the autonomous ground vehicle may further communicate with an access device at the location, or with one or more other computer devices or resources over a network, e.g., one or more computer systems associated with an online marketplace, a fulfillment center, a carrier vehicle, another autonomous ground vehicle or the customer, and report that the item has been deposited there. After the depositing of the ordered item has been confirmed, the autonomous ground vehicle unit departs the facility and the location at box 1185, and the access device secures the facility at the location of the customer at box 1190, before the process ends.

Although the process represented in the flow chart 1100 of FIG. 11 involves depositing an item at a location specified by a customer, those of ordinary skill in the pertinent arts would recognize that a similar process might be executed in order to obtain access to a location in order to retrieve items, waste products generated by such items, or remnants or scraps of such items therefrom, in accordance with one or more embodiments of the present disclosure. Moreover, any number of autonomous vehicles may be utilized to access a location or a facility at the location, and may perform one or more of the steps of the process in the flow chart 1100, in accordance with the present disclosure.

One example in which an automated vehicle automatically obtains access to a facility at a location specified by a customer is shown in FIGS. 12A through 12H. Referring to FIGS. 12A through 12H, views of aspects of one system 1200 for distributing or retrieving inventory or materials using autonomous vehicles in accordance with embodiments of the present disclosure are shown. Except where otherwise noted, reference numerals preceded by the number "11" in FIGS. 12A through 12H refer to elements that are similar to elements having reference numerals preceded by the number "10" in FIGS. 10A through 10C, by the number "8" in FIGS. 8A through 8F, by the number "7" in FIG. 7, by the number "6" in FIG. 6, by the number "5" in FIGS. 5A through 5H, by the number "4" in FIG. 4, by the number "2" in FIG. 2A or FIG. 2B or by the number "1" shown in FIGS. 1A through 1H.

Figure 12A:
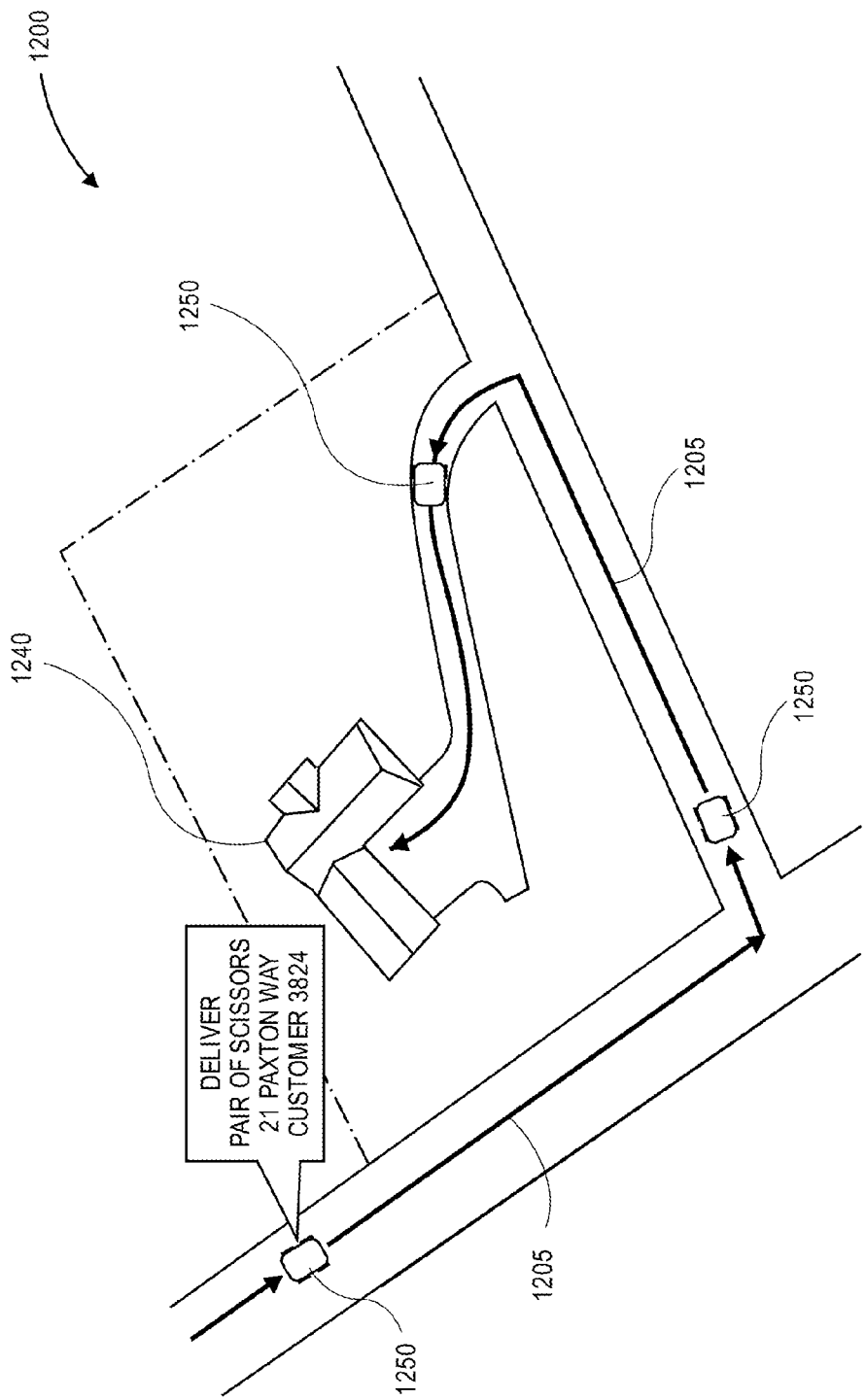
FIGS. 12A through 12H are views of aspects of one system for distributing or retrieving inventory or materials using autonomous vehicles in accordance with embodiments of the present disclosure.

As is shown in FIG. 12A, an order for a delivery of an item (e.g., a pair of scissors) to a location 1240 is placed by a customer. The order identifies the item and the customer (e.g., by a customer number or other identifier), and an address of the location 1240 to which delivery of the ordered item is desired. An autonomous ground vehicle 1250 delivers the ordered item from a fulfillment center or other source (not shown) to the location 1240 specified in the order via an optimal path 1205 that may be determined on any basis and according to any formula or technique.

Figure 12B:
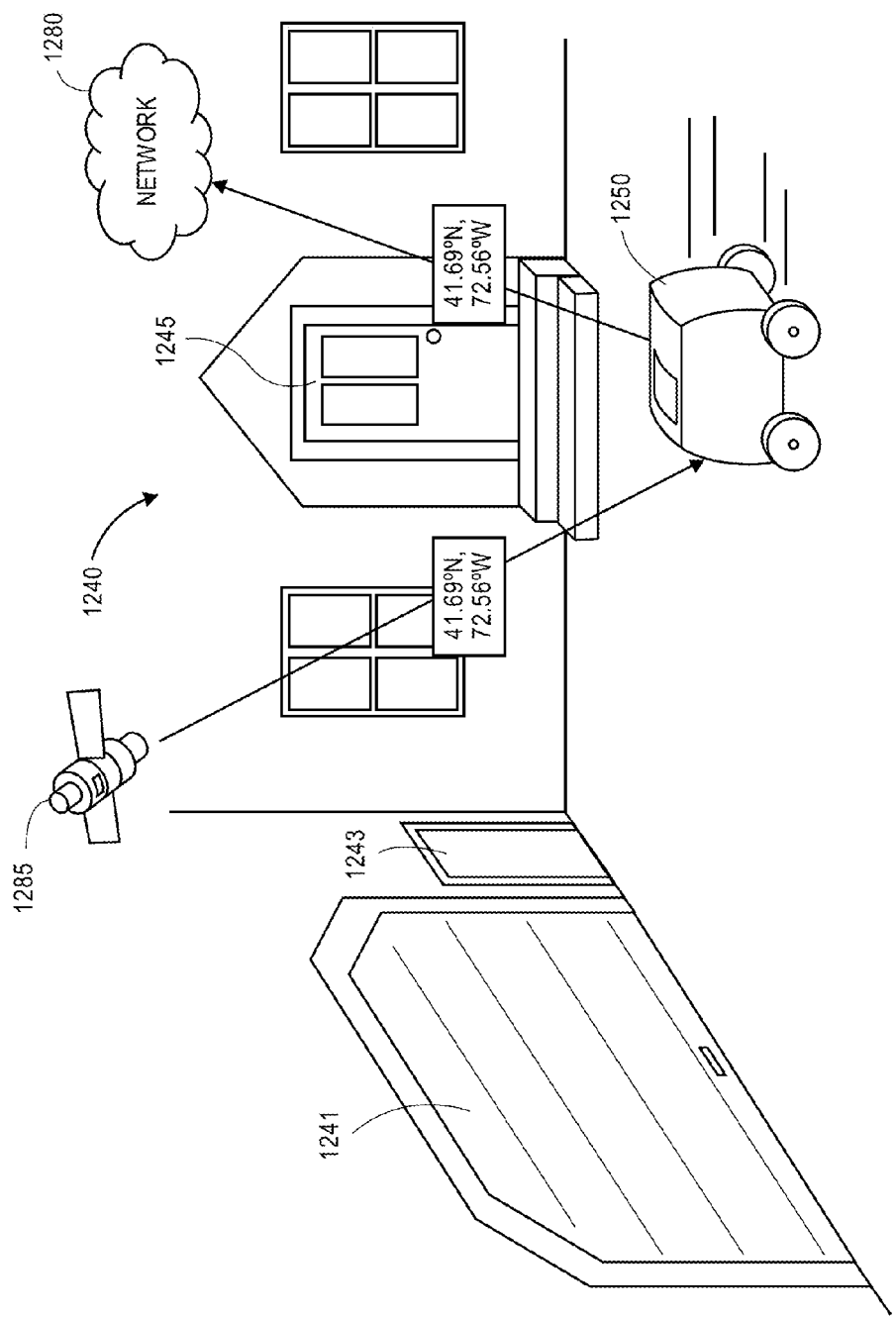

As is shown in FIG. 12B, the autonomous ground vehicle 1250 confirms its position at the location 1240 based on signals received from a GPS network 1285, and reports its position to an external computer device or resource (not shown) via a network 1280. The location 1240 includes a plurality of access points, including a garage door 1241, a pet door 1243 and a front door 1245. The pet door 1243 may be any entry way that is substantially smaller than a traditional door ordinarily accessed by humans, and need not be actually accessed by or accessible to pets. In some embodiments, the pet door 1243 may be specifically sized to accommodate or enable access to the location 1240 by one or more autonomous ground vehicles, instead of or in addition to pets. Access to each of the garage door 1241, the pet door 1243 and the front door 1245 may be restricted by one or more access devices and/or wirelessly activated security systems (not shown).

Figure 12C:
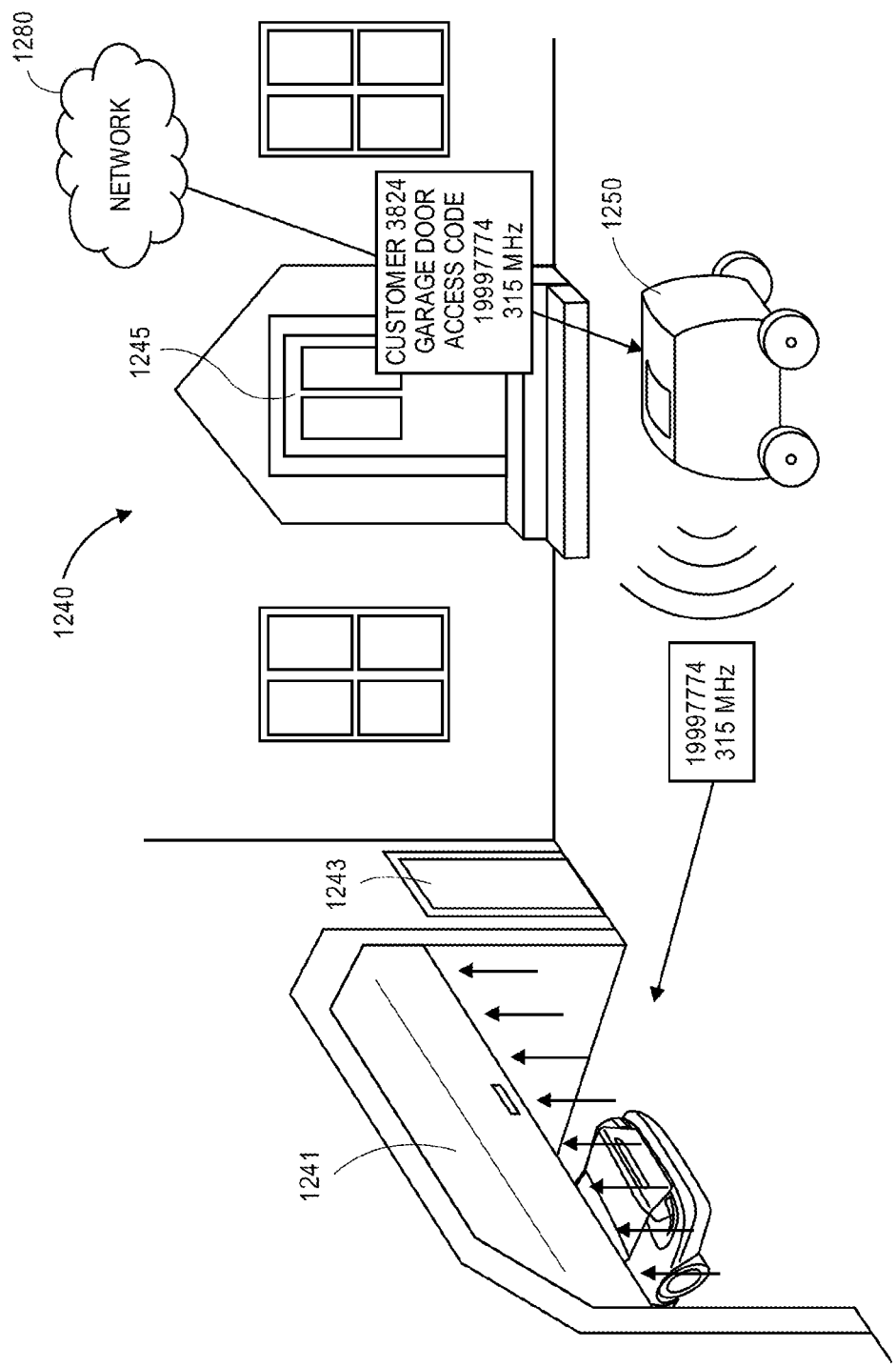

After confirming its position at the location 1240, the autonomous ground vehicle 1250 may be granted access to deposit the ordered item at the location 1240 in any number of ways. As is shown in FIG. 12C, the autonomous ground vehicle 1250 may access the location 1240 by wirelessly activating the garage door 1241 from outside of the location 1240. For example, the autonomous ground vehicle 1250 may receive an access code associated with the garage door 1241 from one or more external computer devices or resources over the network 1280, e.g., from computer devices associated with an online marketplace from which the order was placed, or from a smartphone or other computer device associated with the customer. Upon receiving the access code, an identifier of the garage door 1241, and a frequency at which the access code should be transmitted (e.g., a radio frequency signal typically within a range of approximately three hundred to four hundred megahertz, or MHz), the autonomous ground vehicle 1250 may transmit the code in a direction of the garage door 1241, thereby causing the garage door 1241 to open. The autonomous ground vehicle 1250 may then enter the location 1240 via the garage door 1241 and deposit the ordered item there, e.g., either in the garage, or in or adjacent to one or more vehicles stored therein and/or retrieve one or more items or materials therefrom. In some embodiments, the access code may be permanently associated with the garage door 1241, or ordinarily used to operate the garage door 1241 for any purpose. Alternatively, the access code may be temporary in nature, and may be invalidated after access to the location 1240 by the autonomous ground vehicle 1250 has been obtained for a specific purpose. Additionally, in some embodiments, the autonomous ground vehicle 1250 may transmit another code (e.g., the access code, again) after depositing the item, thereby causing the garage door 1241 to close.

Figure 12D:
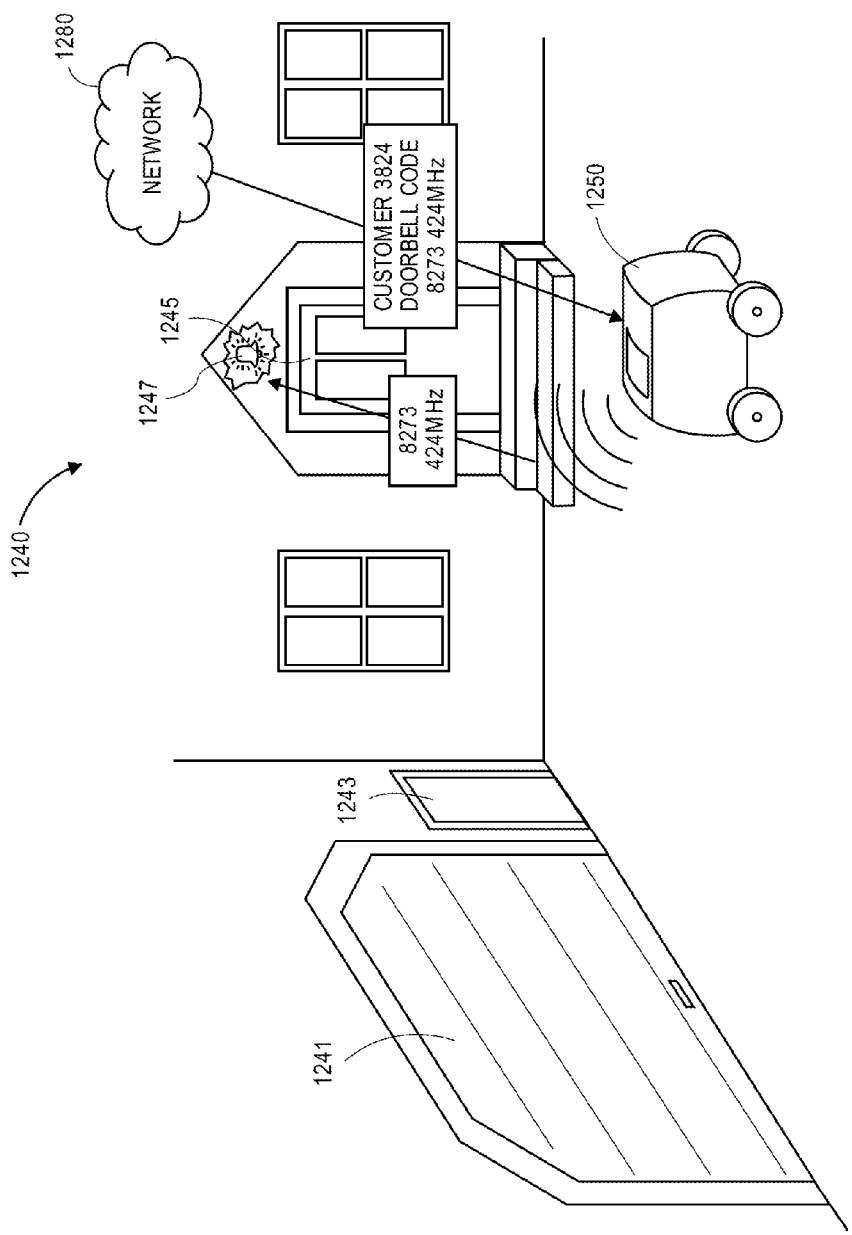

As another example, the autonomous ground vehicle 1250 may access the location 1240 by wirelessly activating a doorbell 1247 or other feedback device from outside of the location 1240. As is shown in FIG. 12D, the autonomous ground vehicle 1250 may receive an access code associated with the doorbell 1247 or other feedback device within the location 1240 from one or more external computer devices or resources over the network 1280. Upon receiving the access code, an identifier of the doorbell 1247 and a frequency at which the access code should be transmitted (e.g., a radio frequency signal typically within a range of approximately three hundred to five hundred megahertz, or MHz), the autonomous ground vehicle 1250 may wirelessly transmit the access code in a direction of the front door 1245 to cause the doorbell 1247 to sound, thereby signaling to any personnel within the location 1240 that the autonomous ground vehicle 1250 is outside of the location 1240 and prepared to deliver an ordered item or deposit the ordered item there. In the event that one or more individuals are inside the location 1240 and within an acoustic range of the doorbell 1247, one or more of such individuals may exit the location 1240 and retrieve the ordered item from a storage compartment within the autonomous ground vehicle 1250. In the event that no one is available to obtain the ordered item, however, the autonomous ground vehicle 1250 may wait for a predetermined period of time before depositing the ordered item outside of the location 1240, or returning to a fulfillment center or other location (e.g., a neighbor, a temporary storage facility such as a storage locker, or any other location) with the ordered item for delivery on a later day.

Figure 12E:
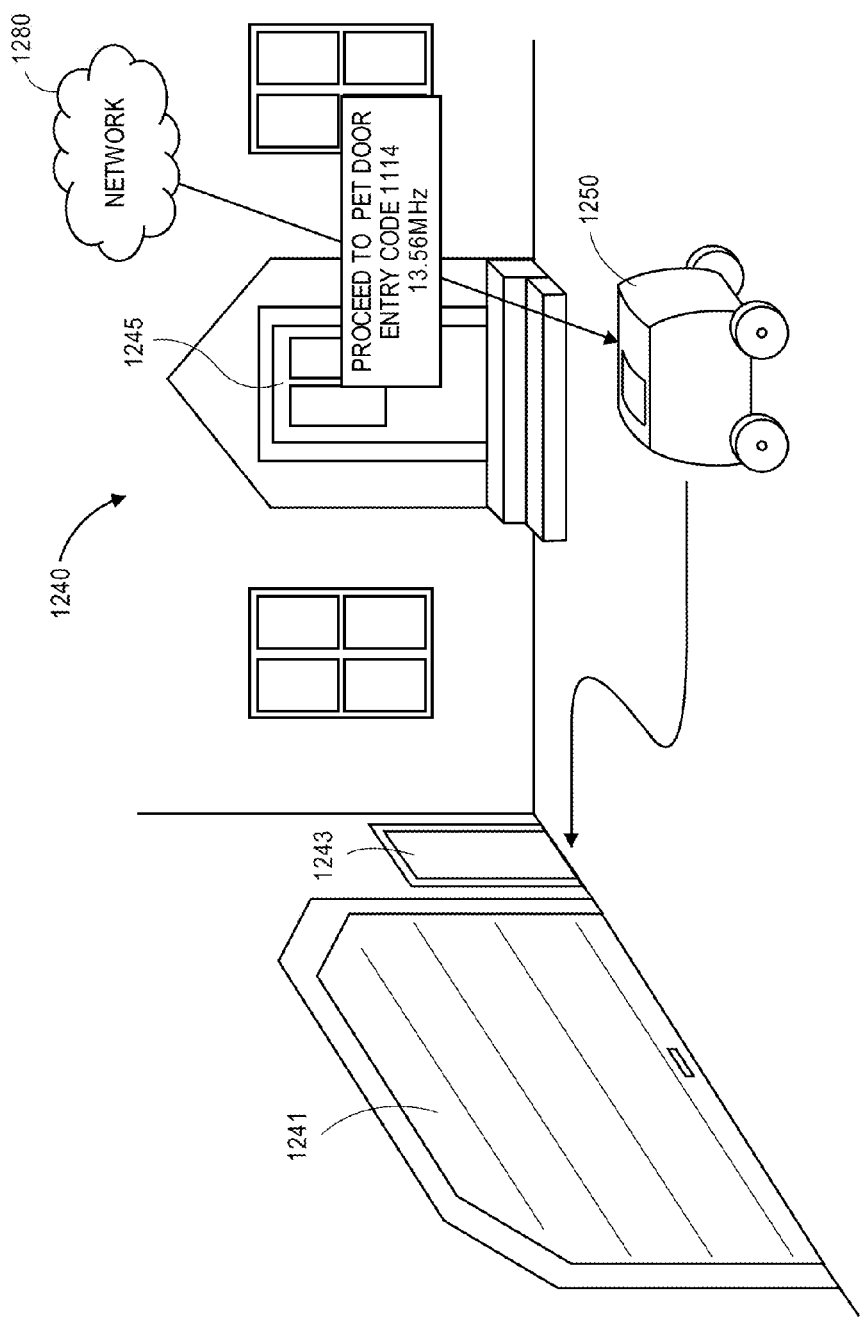
Figure 12F:
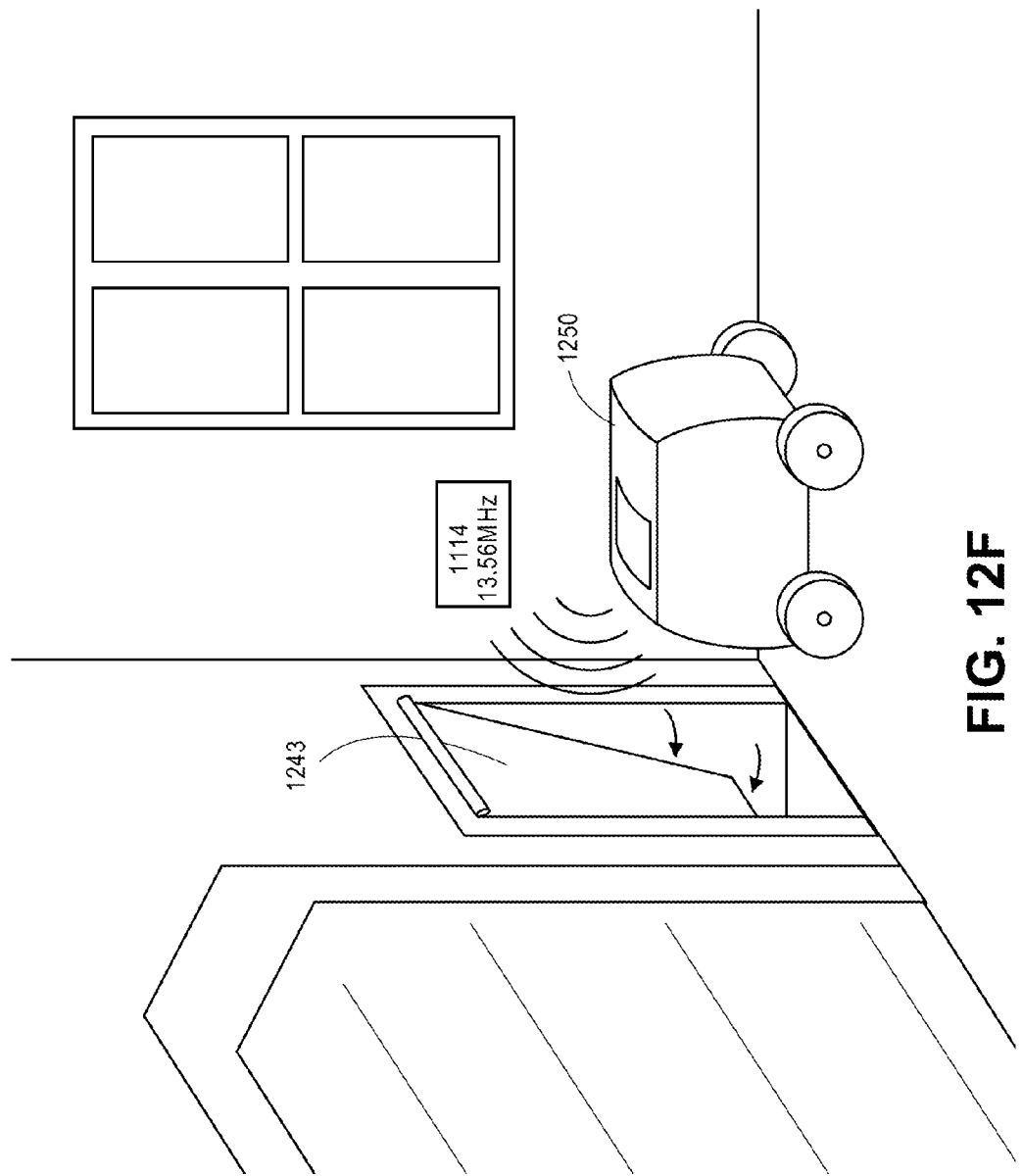

As another example, and as is shown in FIG. 12E and FIG. 12F, the autonomous ground vehicle 1250 may access the location 1240 by wirelessly opening the pet door 1243 via NFC or Bluetooth® communications. For example, the autonomous ground vehicle 1250 may receive an access code associated with the pet door 1243 from one or more external computer device or resources over the network 1280. Upon receiving the access code, the autonomous ground vehicle 1250 may approach to within a very short range of the pet door 1243, e.g., approximately one-and-one-half inches for NFC communications, and transmit the code to a wireless system associated with the pet door 1243 (e.g., a high frequency or RFID signal typically within a range of approximately 13.56 megahertz, or MHz), and may deposit the ordered item therein, or retrieve items or materials therefrom. Alternatively, a Bluetooth® signal may be transmitted at greater distances (e.g., at a frequency of approximately 2.4 gigahertz, or GHz). The location 1240 and/or the pet door 1243 may be further configured with one or more guidance systems that may interactively communicate with and/or between the autonomous ground vehicle 1250, and provide one or more instructions for guiding the autonomous ground vehicle 1250 through the pet door 1243. Additionally, in some embodiments, the autonomous ground vehicle 1250 may transmit another code (e.g., the access code, again) after depositing the item, thereby causing the pet door 1243 to close.

Figure 12G:
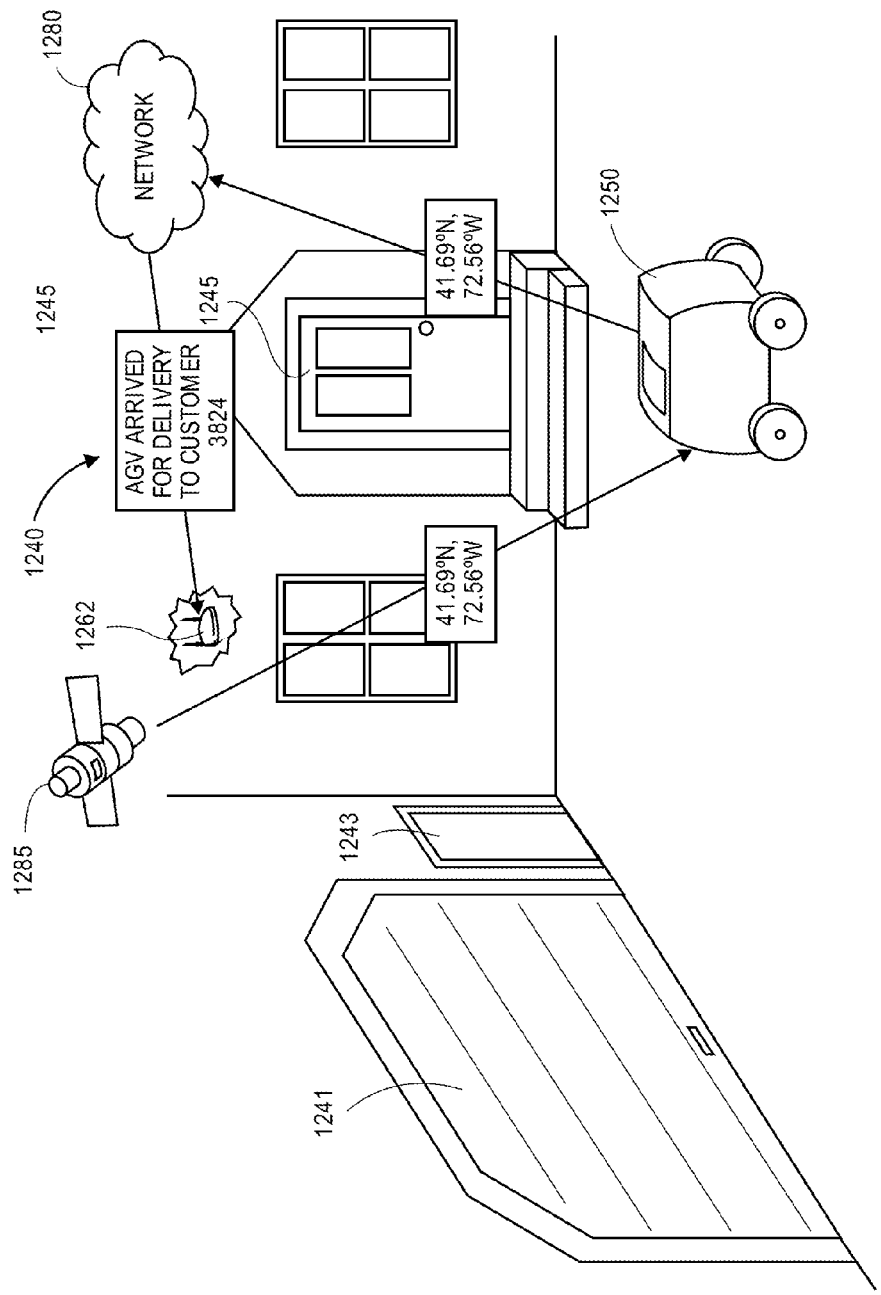
Figure 12H:
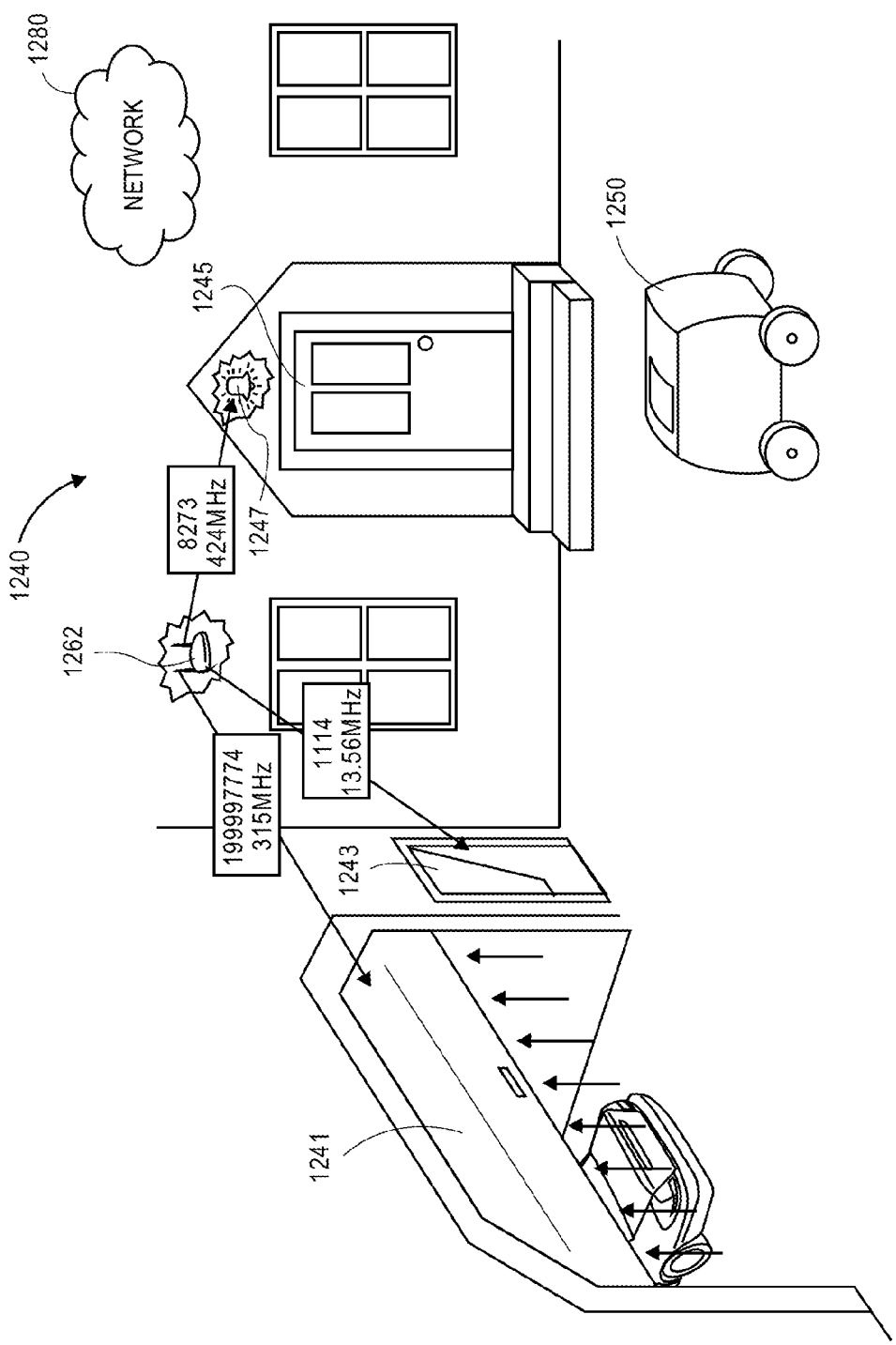

As yet another example, and as is shown in FIG. 12G and FIG. 12H, the autonomous ground vehicle 1250 may be temporarily granted access to the location 1240 by an intermediary device 1262, which may include one or more processors, memory components, transceivers and/or other systems that are specifically programmed by a customer, a resident or other personnel at the location 1240 to grant access thereto under limited circumstances. As is shown in FIG. 12G, and upon confirming its position at the location 1240 based on signals received from the GPS network 1285, the autonomous ground vehicle 1250 may report its position to an external computer device or resource (not shown) via the network 1280. The external computer device or resource may then transmit an instruction to the intermediary device 1262 via the network 1280, indicating that the autonomous ground vehicle 1250 has arrived for delivery of an item to the customer and requesting access to the location.

As is shown in FIG. 12H, and upon receiving the instruction, the intermediary device 1262 may confirm that the autonomous ground vehicle 1250 is authorized to access the location 1240, e.g., by validating the instruction. The intermediary device 1262 may then grant access to the autonomous ground vehicle 1250 in any number of ways. For example, the intermediary device 1262 may wirelessly activate the garage door 1241, the pet door 1243 and/or the doorbell 1247 by transmitting one or more access codes at predetermined frequencies. The use of the intermediary device 1262 enables the customer, the resident or the other personnel at the location 1240 to grant or deny access to the location 1240 without divulging any access codes, passwords, authenticators, keys, tokens or similar information to any external computer devices or resources, e.g., the autonomous ground vehicle 1250 or any devices or resources available over the network 1280, or without having to reprogram or redefine such codes, passwords, authenticators, keys or tokens after the autonomous ground vehicle 1250 has departed from the location 1240.

Although some of the autonomous vehicles disclosed herein are depicted as autonomous ground vehicles, those of ordinary skill in the pertinent arts will recognize that the systems and methods of the present disclosure are not so limited. Rather, the autonomous vehicles of the present disclosure may be any type of vehicle that is configured to transport items from one location (e.g., a fulfillment center or any other type of location) to another location where demand for such items is known, observed or predicted, as well as any type of vehicle that is configured to retrieve items, waste products generated by such items, or remnants or scraps of such items that are no longer desired, or materials included in such items, from other locations, to manufacture items from stock materials or from materials that are retrieved from such locations, or to automatically access a location where items are to be delivered or from which items are to be retrieved. The autonomous vehicles of the present disclosure may further include any type of vehicles that are configured to transfer items or materials to a human, a machine or another vehicle, or to receive items or materials from a human, a machine or another vehicle, as necessary. In this regard, the autonomous vehicles of the present disclosure may include vehicles that are configured to travel by air, by sea, or across outer space, as well as on land.

Furthermore, although some of the embodiments of the present disclosure depict the distribution or forward-deployment of inventory of items that are made available to customers through online marketplaces, those of ordinary skill in the pertinent arts will recognize that the systems and methods of the present disclosure are not so limited. Rather, autonomous vehicles may be used to distribute or forward-deploy inventory that may be made available through traditional commercial channels, e.g., by telephone or in one or more bricks-and-mortar stores, and delivered to customers or designated locations rapidly in response to orders for such items. Moreover, although some of the embodiments of the present disclosure depict autonomous ground vehicles that are small in size, those of ordinary skill in the pertinent arts will recognize that the systems and methods of the present disclosure are not so limited. Rather, autonomous vehicles may be of any size or shape, and may be configured or outfitted with features that enable the distribution, delivery, retrieval or manufacture of items of any type or kind, and of any size or shape, in accordance with the present disclosure.

Although some embodiments of the present disclosure show the distribution or forward deployment of items that are available for purchase from an online marketplace to one or more locations based on known, observed or predicted demand using autonomous ground vehicles, the retrieval of items or materials by autonomous ground vehicles and the construction of items therefrom on behalf of an online marketplace using autonomous ground vehicles that are en route to destinations, the systems and methods of the present disclosure are not so limited. Rather, the systems and methods of the present disclosure may be utilized in any environment where the improved distribution of items, the efficient retrieval and reuse of items or materials, or rapid in situ manufacturing of items in given locations or regions is desired. For example, in some embodiments, the autonomous ground vehicles may be utilized in trash hauling or recycling systems, and may be used to sort trash or recyclable materials based on their content while en route to a dump or transfer station, or to recognize and extract valuable materials from discarded items.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 9 or 11, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A computer-implemented method comprising:
   receiving an order for a delivery of a first item from a customer by at least one server over a computer network, wherein the order specifies a facility located in a geographic region to which the first item is to be delivered;
   determining that the first item is located in a storage compartment of an autonomous ground vehicle within the geographic region by the at least one computer server, wherein the autonomous ground vehicle comprises:
      the storage compartment;
      a plurality of wheels;
      an electric motor;
      at least one wireless transceiver;
      an item engagement system;
      a Global Positioning System receiver; and
      at least one computer processor;
   transmitting a first instruction to deliver the first item to the facility to the autonomous ground vehicle by the at least one server over the computer network;
   receiving an electronic message from the autonomous ground vehicle by the at least one server over the computer network, wherein the electronic message identifies a position of the autonomous ground vehicle determined by the Global Positioning System receiver;
   determining that the position of the autonomous ground vehicle is consistent with the location of the facility by the at least one computer server;
   transmitting a second instruction to the autonomous ground vehicle by the at least one server over the computer network, wherein the second instruction comprises an instruction to access the facility via a secure entryway, to retrieve the first item from the storage compartment by the item engagement system and to deposit the first item within a vicinity of the location of the facility, and wherein the second instruction comprises a wireless access code for accessing the facility via the secure entryway and at least one of a transmission mode or a transmission frequency for the wireless access code;
   causing, by the at least one wireless transceiver of the autonomous ground vehicle, a first transmission of the wireless access code via the transmission mode or at the transmission frequency to an access device at the facility, wherein the access device is configured to cause the secure entryway to open upon receiving the first transmission;
   accessing, by the autonomous ground vehicle, the facility via the secure entryway;
   delivering, by the autonomous ground vehicle, the first item to the facility;
   determining that the first item was delivered to the facility; and
   in response to determining that the first item was delivered to the facility,
      transmitting, over the computer network, a third instruction to the autonomous ground vehicle,
   wherein the third instruction is an instruction to retrieve a second item from the facility by the item engagement system and to deposit the second item within the storage compartment.

2. The computer-implemented method of claim 1, further comprising:
   causing, by the at least one wireless transceiver of the autonomous ground vehicle, a second transmission of the wireless access code via the transmission mode or at the transmission frequency to the access device, wherein the access device is configured to cause the secure entryway to close upon receiving the second transmission; and
   invalidating the wireless access code by the at least one computer server.

3. The computer-implemented method of claim 1, wherein the secure entryway comprises a wireless-activated garage door, and
   wherein the transmission frequency is within a range of three hundred to four hundred megahertz.

4. The computer-implemented method of claim 1,
   wherein delivering the first item to the facility comprises:
      retrieving, by the item engagement system, the first item from the storage compartment; and
      depositing, by the item engagement system, the first item at the location of the facility, and
   wherein the method further comprises:
      retrieving, by the item engagement system, the second item from the facility; and
      depositing, by the item engagement system, the second item into the storage compartment.

5. A computer-implemented method comprising:
   identifying a task to be performed at a secured facility by at least one computer server, wherein the task comprises a delivery of a first item to the secured facility and a retrieval of a second item from the secured facility;
   selecting one of a plurality of autonomous ground vehicles to perform the task, wherein the selected autonomous ground vehicle comprises:
      a storage compartment;
      a plurality of wheels;
      an electric motor powered by at least one battery;
      an item engagement system;
      at least one wireless transceiver;
      a Global Positioning System receiver; and
      at least one computer processor;
   transmitting, over a computer network, a first instruction to the autonomous ground vehicle, wherein the first instruction comprises an instruction to travel to the secured facility;
   receiving, over the computer network, a position of the selected autonomous ground vehicle from the autonomous ground vehicle;

determining that the position of the selected autonomous ground vehicle is consistent with a location of the secured facility;

in response to determining that the position of the selected autonomous ground vehicle is consistent with the location of the secured facility, transmitting, over the computer network, a second instruction to the autonomous ground vehicle, wherein the second instruction comprises an instruction to access the secured facility, an instruction to retrieve the first item from the storage compartment by the item engagement system and an instruction to deposit the first item within a vicinity of the location of the secured facility;

enabling the selected autonomous ground vehicle to access the secured facility to perform the task; and determining that the autonomous ground vehicle has deposited the first item within the vicinity of the location of the secured facility;

in response to determining that the first item was deposited within the vicinity of the location of the secured facility, transmitting, over the computer network, a third instruction to the autonomous ground vehicle, wherein the third instruction comprises an instruction to retrieve the second item from the secured facility by the item engagement system and to deposit the second item within the storage compartment; and in response to determining that the autonomous ground vehicle has deposited the second item within the storage compartment, causing the selected autonomous ground vehicle to be restricted from accessing the secured facility.

6. The computer-implemented method of claim 5, wherein enabling the selected autonomous ground vehicle to access the secured facility to perform the task comprises:

transmitting, over the computer network, a fourth instruction to an intermediary device associated with the secured facility, wherein the fourth instruction comprises an instruction to grant access to the secured facility to the autonomous ground vehicle, and wherein the intermediary device is configured to validate the instruction to grant access to the secured facility and, in response to validating the instruction, transmit a predetermined access code at a predetermined frequency to a secure entryway having a wireless receiver configured to open or close the secure entryway upon receiving the predetermined access code at the predetermined frequency.

7. The computer-implemented method of claim 5, wherein the one of the plurality of autonomous ground vehicles is selected based at least in part on at least one of:

a prerequisite of the task;

a location of the selected autonomous ground vehicle;

a maximum speed rating of the selected autonomous ground vehicle;

at least one item within the storage compartment of the selected autonomous ground vehicle;

an operating range of the selected autonomous ground vehicle;

a charge level of the at least one battery of the selected autonomous ground vehicle; or an environmental condition at the secured facility.

8. The computer-implemented method of claim 5, wherein the secured facility comprises at least one of a dwelling, a commercial structure or a garage.

9. The computer-implemented method of claim 5, wherein the second instruction further comprises an instruction to transmit an access code by the at least one wireless transceiver within a vicinity of the location of the secured facility.

10. The computer-implemented method of claim 9, further comprising:

in response to determining that the autonomous ground vehicle has deposited the second item within the storage compartment, causing the access code to be invalidated.

11. The computer-implemented method of claim 9, wherein the second instruction identifies at least one of the access code and a frequency at which the access code is to be transmitted by the at least one wireless transceiver.

12. The computer-implemented method of claim 11, wherein the secured facility further comprises a secure entryway having a wireless receiver configured to open or close the secure entryway upon receiving the access code at the frequency.

13. The computer-implemented method of claim 11, wherein the secured facility further comprises a feedback device having a wireless receiver configured to generate feedback within the secured facility upon receiving the access code at the frequency, and wherein the feedback is one of audio feedback, visual feedback or haptic feedback.

14. A computer-implemented method comprising:

receiving, over a computer network, an order for a delivery of a first item to a facility;

causing an autonomous ground vehicle to deliver the first item to the facility by at least one computer server, wherein the autonomous ground vehicle comprises:

a storage compartment;

a plurality of wheels;

an electric motor powered by at least one battery;

an item engagement system;

at least one wireless transceiver;

a Global Positioning System receiver; and at least one computer processor;

receiving, over the computer network, a position of the autonomous ground vehicle;

determining that the autonomous ground vehicle is within a vicinity of a secure entryway at the facility based at least in part on the position of the autonomous ground vehicle;

in response to determining that the autonomous ground vehicle is within the vicinity of the secure entryway, transmitting, over the computer network, a first instruction to the autonomous ground vehicle, wherein the first instruction comprises an instruction to access the facility via the secure entryway, an instruction to retrieve the first item from the storage compartment by the item engagement system and an instruction to deposit the first item within the facility;

causing the secure entryway to open for not more than a predetermined period of time over the computer network; and confirming that the autonomous ground vehicle has deposited the first item within the facility over the computer network; and in response to determining that the autonomous ground vehicle has deposited the first item within the facility, transmitting, over the computer network, a second instruction to the autonomous ground vehicle, wherein the second instruction comprises an instruction to retrieve a second item from the facility by the item engagement system and an instruction to deposit the second item within the storage compartment; and determining that the autonomous ground vehicle has deposited the second item within the storage compartment; and in response to determining that the autonomous ground vehicle has retrieved the second item within the facility, causing, over the computer network, the secure entryway to close.

15. The computer-implemented method of claim 14, wherein causing the autonomous ground vehicle to deliver the item to the facility comprises:

in response to receiving the order for the delivery of the item to the facility, identifying a plurality of autonomous ground vehicles having access to at least one of the item;

determining, over the computer network, at least one attribute of at least some of the plurality of autonomous ground vehicles, wherein the at least one attribute is at least one of:

a location within a geographic area in which the facility is located;

a charge level of the at least one battery;

a predetermined speed range;

a number of the item in the at least one storage compartment;

an environmental condition in the geographic area; and selecting one of the at least some of the plurality of autonomous ground vehicles to deliver the item to the facility based at least in part on the at least one attribute.

16. The computer-implemented method of claim 14, wherein causing the secure entryway to open for not more than a predetermined period of time comprises:

transmitting, over the computer network, an access code and a frequency to the autonomous ground vehicle; and transmitting, by the at least one wireless transceiver, the access code at the frequency to a wireless access device associated with the secure entryway, wherein the wireless access device is configured to cause the secure entryway to open for not more than the predetermined period of time in response to receiving the access code at the frequency.

17. A computer-implemented method comprising:

identifying a task to be performed at a secure facility by at least one computer server, wherein the task comprises a retrieval of a first item from the secured facility;

selecting one of a plurality of autonomous ground vehicles to perform the task, wherein the selected autonomous ground vehicle comprises:

a storage compartment;

a plurality of wheels;

an electric motor powered by at least one battery;

an item engagement system;

at least one wireless transceiver;

a Global Positioning System receiver;

a 3D printer; and at least one computer processor;

transmitting, over a computer network, a first instruction to the autonomous ground vehicle, wherein the first instruction comprises an instruction to travel to the secured facility;

receiving, over the computer network, a position of the selected autonomous ground vehicle from the autonomous ground vehicle;

determining that the position of the selected autonomous ground vehicle is consistent with at least one of the location of the secured facility or the task;

in response to determining that the position of the selected autonomous ground vehicle is consistent with the at least one of the location of the secured facility or the task, transmitting, over the computer network, a second instruction to the autonomous ground vehicle, wherein the second instruction is an instruction to access the secured facility, to retrieve the first item from the secured facility by the item engagement system and to deposit the first item within the storage compartment;

enabling the selected autonomous ground vehicle to access the secured facility to perform the task; and determining that the autonomous ground vehicle has retrieved the first item from the secured facility;

in response to determining that the first item was retrieved from the secured facility, transmitting, over the computer network, a third instruction to the autonomous ground vehicle, wherein the third instruction is an instruction to extract the at least one ingredient from the first item and to manufacture the second item by the 3D printer using the at least one ingredient; and causing the selected autonomous ground vehicle to be restricted from accessing the secured facility.

* * * * *